United States Patent
Garrity et al.

(10) Patent No.: US 9,251,548 B1
(45) Date of Patent: *Feb. 2, 2016

(54) OBJECT TRANSFORMATION FOR OBJECT TREES UTILIZED WITH MULTIPROCESSOR SYSTEMS

(71) Applicant: The MathWorks, Inc., Natick, MA (US)

(72) Inventors: Michael P. Garrity, Lexington, MA (US); Mario S. Guimaraes, Bellevue, WA (US)

(73) Assignee: The MathWorks, Inc., Natick, MA (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/897,965

(22) Filed: May 20, 2013

Related U.S. Application Data

(63) Continuation-in-part of application No. 13/617,562, filed on Sep. 14, 2012, now Pat. No. 8,446,425, which is a continuation of application No. 12/059,319, filed on Mar. 31, 2008, now Pat. No. 8,300,060.

(51) Int. Cl.
   *G06T 17/00* (2006.01)
   *G09G 5/02* (2006.01)
   *G09G 5/00* (2006.01)
   *G06T 1/00* (2006.01)

(52) U.S. Cl.
   CPC .................................. *G06T 1/00* (2013.01)

(58) Field of Classification Search
   CPC . G06T 11/206; G06T 15/005; G06T 2210/52; G06T 2210/61; G09G 5/363
   See application file for complete search history.

(56) References Cited

U.S. PATENT DOCUMENTS

| | | | |
|---|---|---|---|
| 6,734,853 B2 | 5/2004 | Heim et al. | |
| 7,050,955 B1 | 5/2006 | Carmel et al. | |
| 7,184,038 B2 | 2/2007 | Sowizral et al. | |
| 7,386,792 B1 * | 6/2008 | Bascom et al. | 715/205 |
| 8,300,060 B1 | 10/2012 | Garrity et al. | |
| 2005/0140694 A1 | 6/2005 | Subramanian et al. | |
| 2006/0106591 A1 | 5/2006 | Bordes et al. | |
| 2009/0024683 A1 | 1/2009 | Beckman et al. | |

OTHER PUBLICATIONS

Henry Sowizral et al., "The Java 3D API Specification, Second Edition", Jun. 2000, Addison-Wesley, pp. 160, 161, 389, 390, 408 and 409.

Co-pending patent U.S. Appl. No. 13/617,562, titled "Object Transformation for Object Trees Utilized with Multiprocessor Systems", filed Sep. 14, 2012, 104 pages.

* cited by examiner

*Primary Examiner* — Kee M Tung
*Assistant Examiner* — Sing-Wai Wu
(74) *Attorney, Agent, or Firm* — Harrity & Harrity, LLP

(57) ABSTRACT

A system may include a memory that stores instructions and a processor to execute the instructions to store a first set of objects in a first data structure, where the first set of objects describe a graphical scene. The processor may create a group of commands and add a command for at least one object, of the first set of objects, to the group of commands. The processor may combine the group of commands into a composite command, where the group of commands includes the added command. The processor may create a second set of objects in a second data structure based on the first set of objects in the first data structure and the composite command. The processor may also modify the second set of objects and provide the modified second set of objects to a browser for rendering the graphical scene.

20 Claims, 48 Drawing Sheets

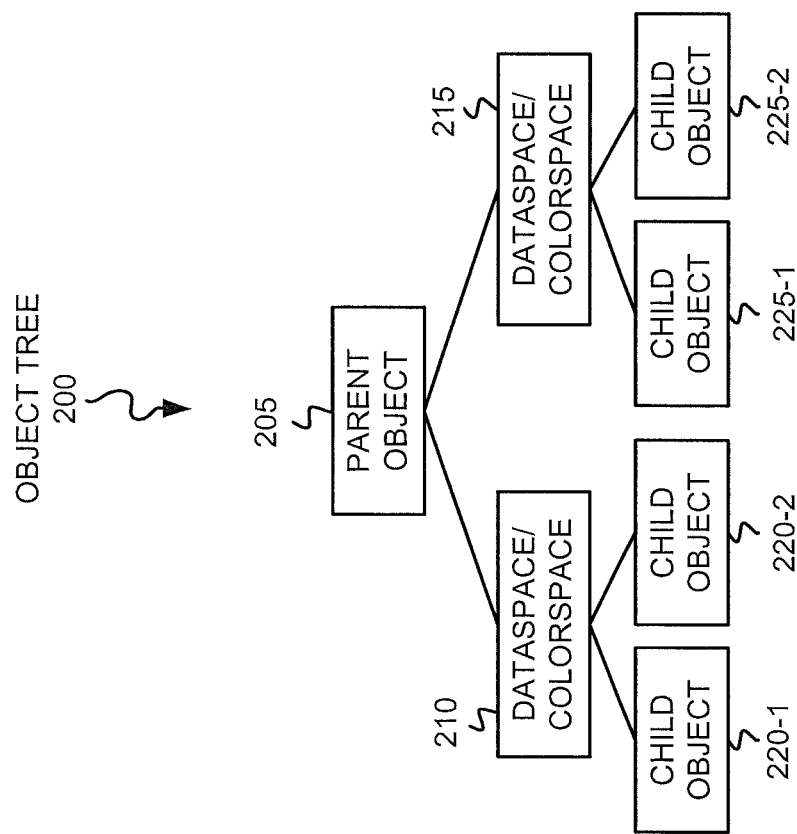

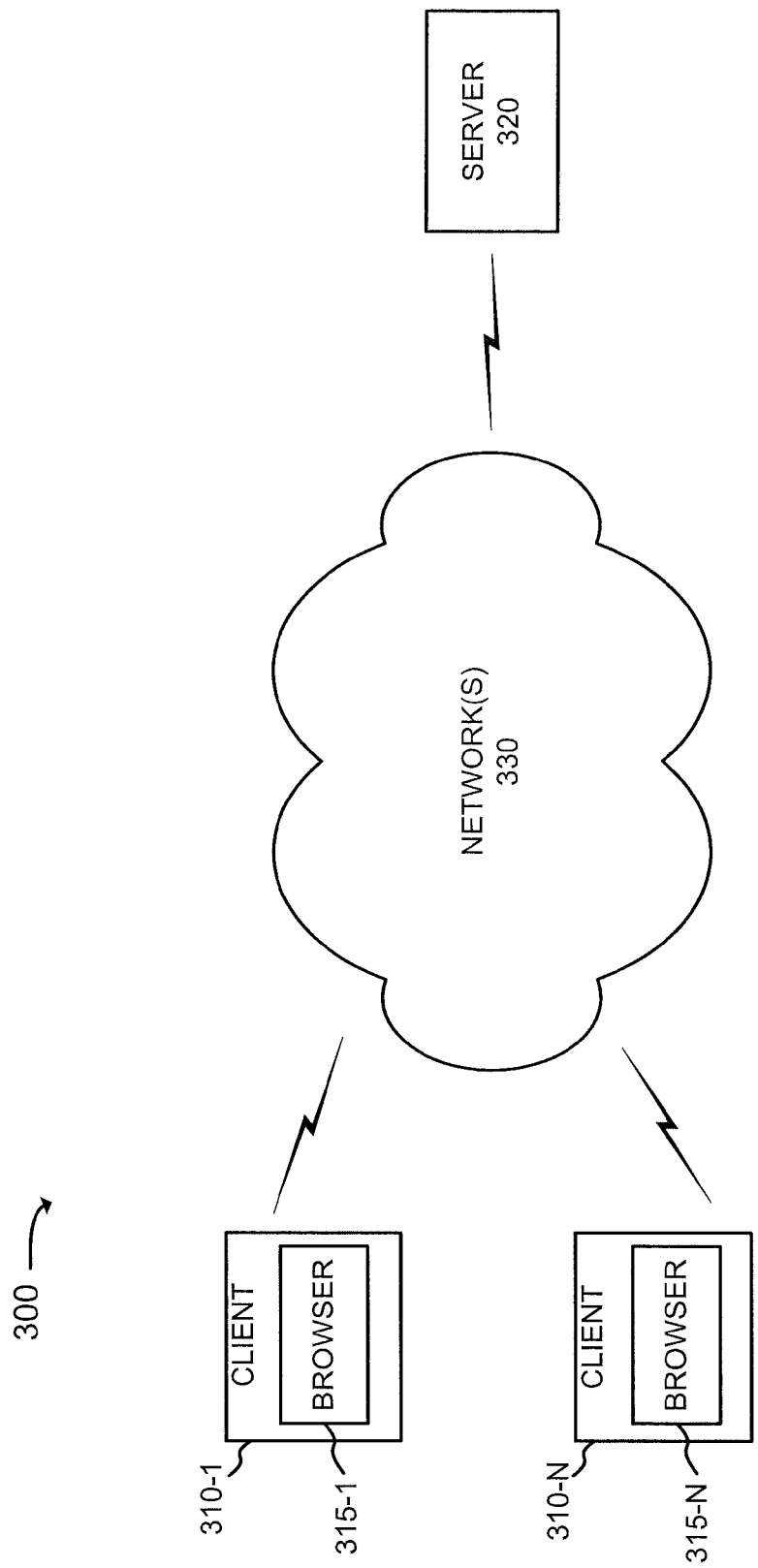

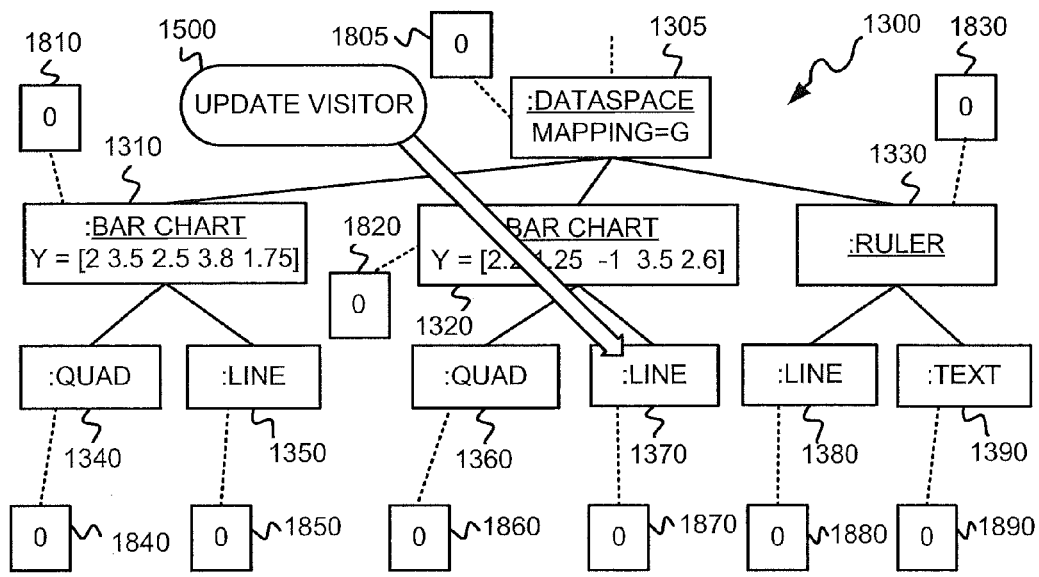
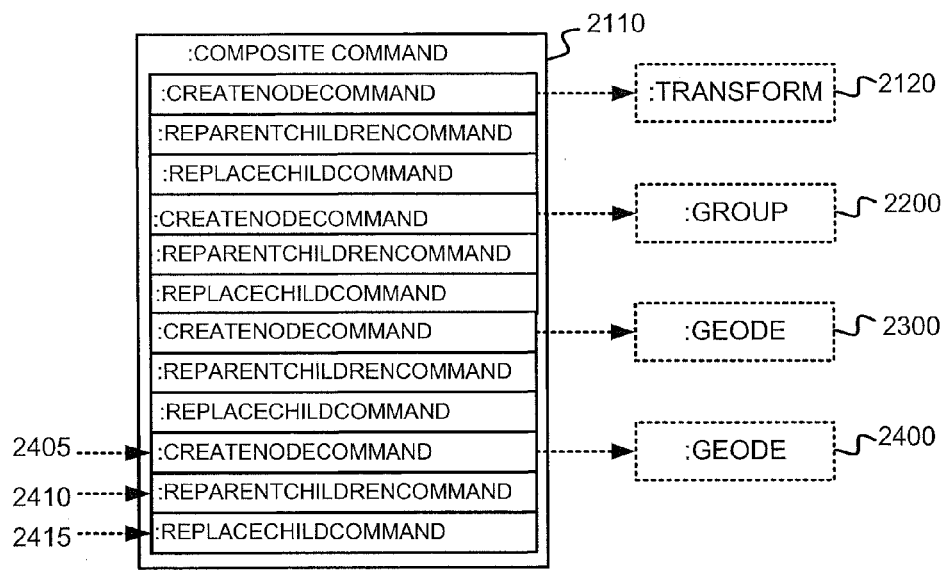
FIG. 24

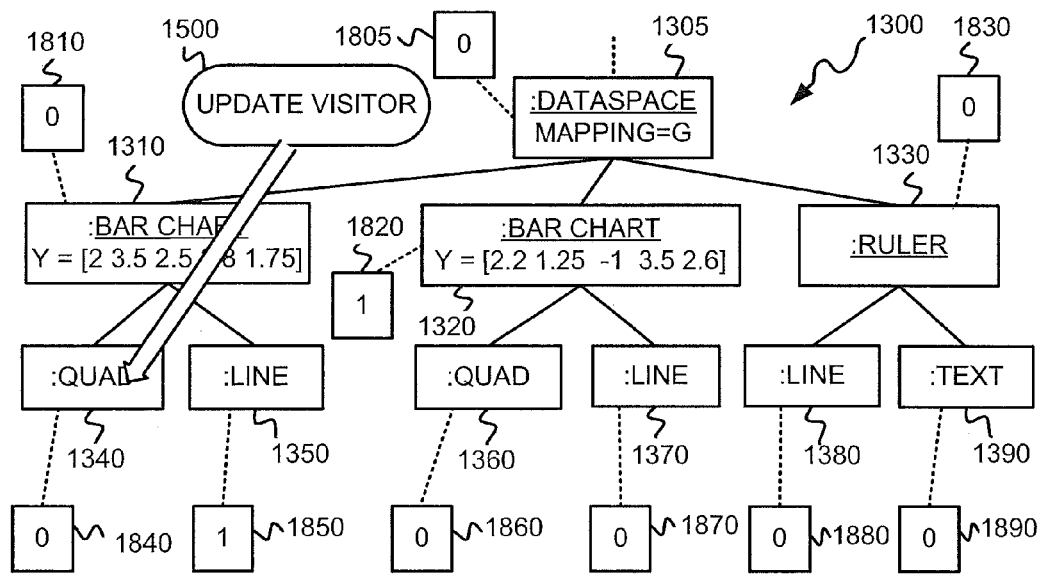
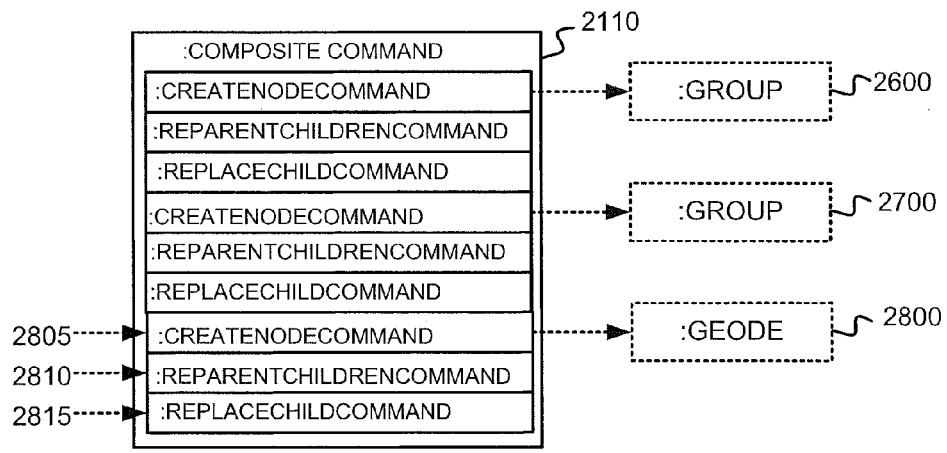
FIG. 28

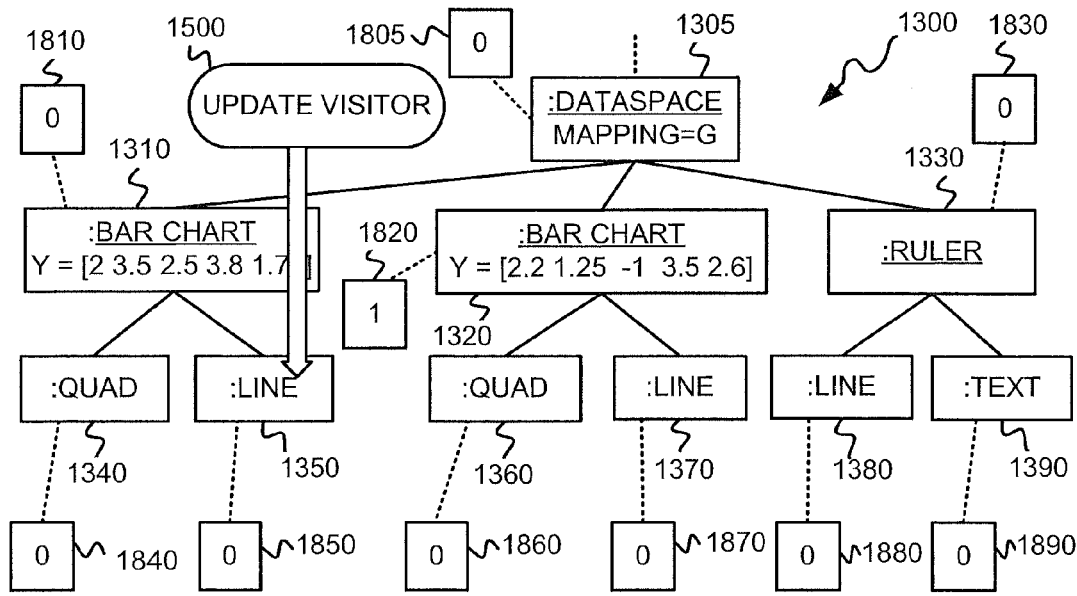
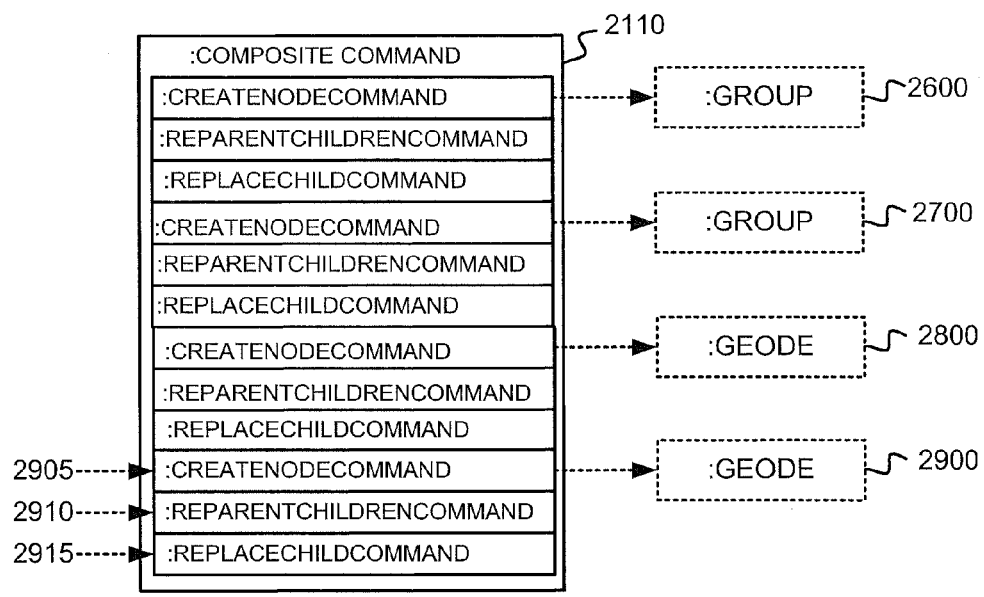
FIG. 29

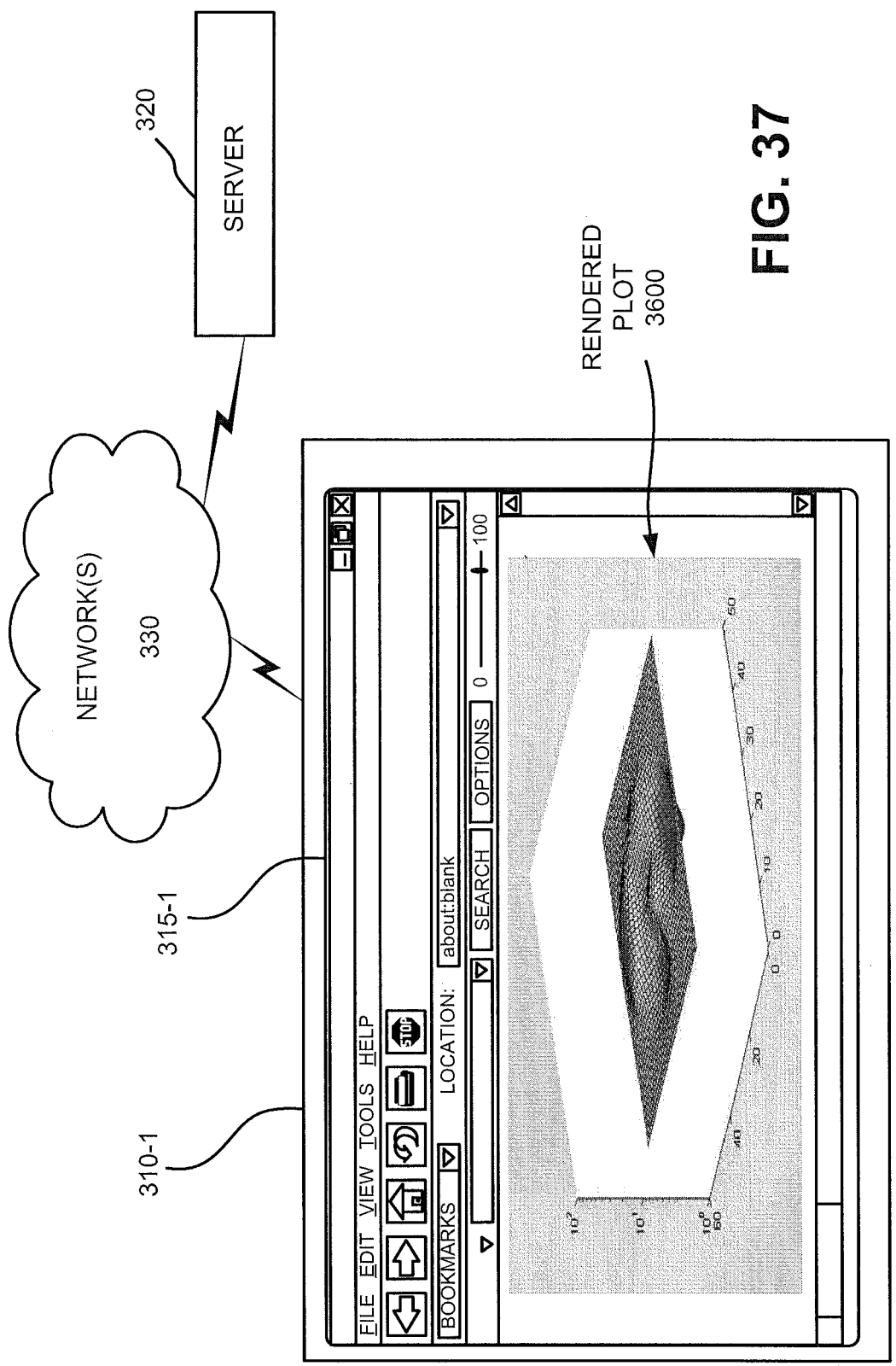

OBJECT TRANSFORMATION FOR OBJECT TREES UTILIZED WITH MULTIPROCESSOR SYSTEMS

RELATED APPLICATION

This application claims priority from and is a continuation-in-part (CIP) of U.S. patent application Ser. No. 13/617,562, filed Sep. 14, 2012, entitled "OBJECT TRANSFORMATION FOR OBJECT TREES UTILIZED WITH MULTIPROCESSOR SYSTEMS," which is a continuation of U.S. patent application Ser. No. 12/059,319, filed Mar. 31, 2008 (now U.S. Pat. No. 8,300,060). The contents of these applications are incorporated herein by reference.

BACKGROUND

Contemporary computer systems typically include multiprocessor systems, where one of the processors includes a general purpose processor (e.g., a central processing unit (CPU)) and another one of the processors includes a specialized processing unit. The specialized processing unit may include a dedicated processing unit designed to perform a specific function, and is typically used to offload time consuming tasks from the general purpose processor. The specialized processing unit is usually designed to perform the offloaded tasks more efficiently than the general purpose processor. Specialized processing units may include, for example, graphics processing units (GPUs), physics processing units (PPUs), or digital signal processors (DSPs). A GPU is one example of a specialized processing unit typically used in a multiprocessor system which includes a dedicated graphics rendering device that is designed to be efficient at manipulating and displaying computer graphics.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

FIGS. 2A and 2B are diagrams depicting an overview of the use of dataspace or colorspace objects for transforming object tree coordinates, colors and/or data types/formats from a first coordinate system(s), color space(s) and/or data type/format(s) to a different coordinate system(s), color space(s) and/or data type/format(s) for association with a graphics rendering tree;

FIG. 3 is a diagram of a network according to an exemplary implementation;

FIGS. 21-29 graphically depict examples of blocks 1930 and 1940 of FIG. 19;

FIG. 37 illustrates another example of a graphics plot rendered using a graphics rendering tree.

DETAILED DESCRIPTION

Figure 1A:
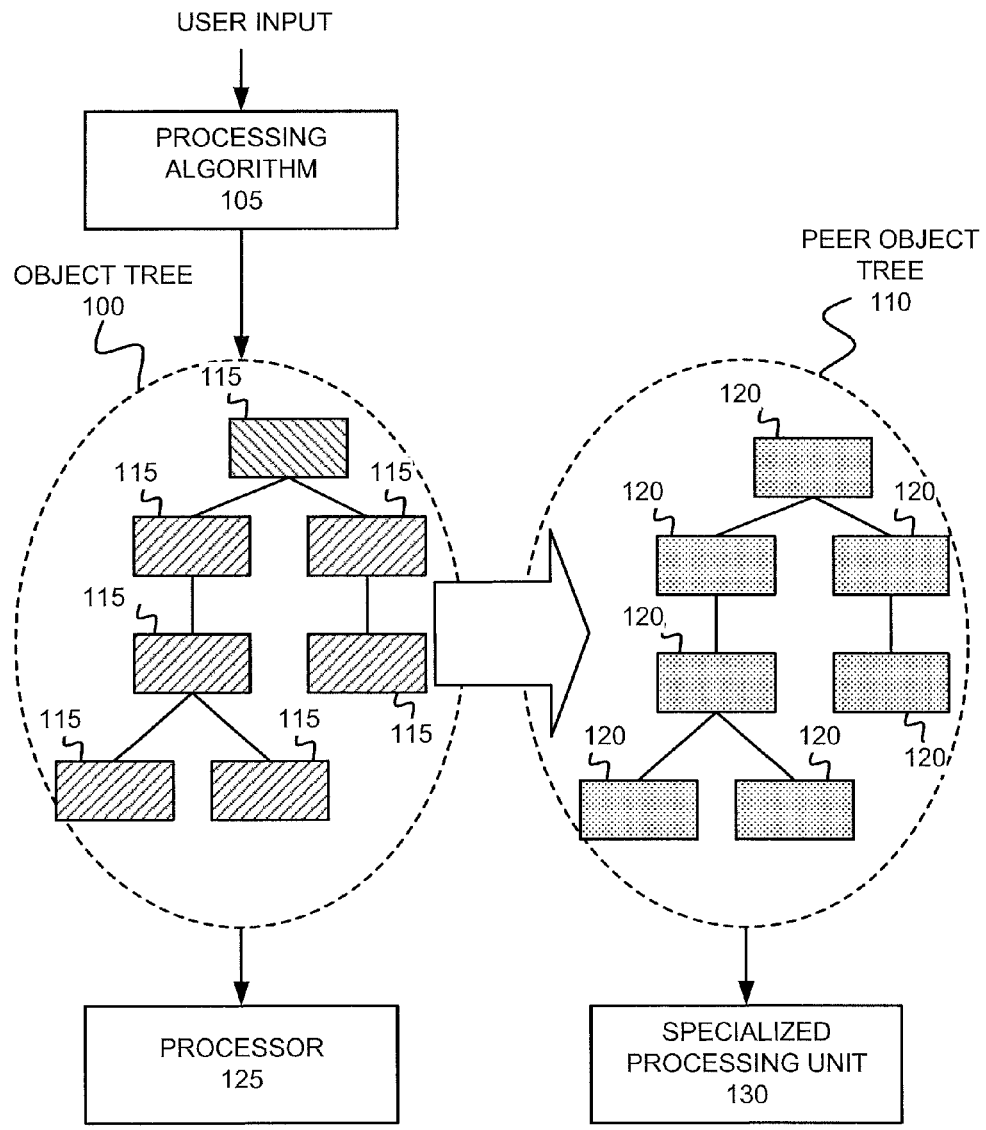
FIGS. 1A and 1B are diagrams depicting an overview of exemplary embodiments described herein.

The following detailed description refers to the accompanying drawings. The same reference numbers in different drawings may identify the same or similar elements. Also, the following detailed description does not limit the invention.

Specialized processing units may utilize certain organizations, types and/or formats of data better than other organizations, types or formats of data. For example, a specialized processing unit may efficiently handle code objects having a certain organization. Code objects (hereinafter "objects")

may include pieces of software that are made up of modularized code, where the modules are referred to as "objects." An "object" as the term is used herein refers to a self-contained entity that may consist of both data and manipulation procedures (e.g., functionality). An "object" is a basic building block of programs in object-oriented programming. Data associated with a given object may be set as properties of that object.

In object oriented programming, an object is a piece of code that accepts information and/or makes information available that is compliant with a known or published format (e.g., compliant with a published input or output interface). In object oriented programming, a programmer does not have to be concerned about, or have detailed knowledge of, the code that makes up a given object when the programmer wants to create other code that may use and/or interact with the object. The programmer only needs to make sure his code makes information available to the object in a compliant format and/or receives information from the object via a compliant format. Object oriented programming techniques allow complex programs (e.g., complex graphics programs) to be written by several individuals without requiring that one individual know the details of what is in an object developed by another individual.

Object oriented code may be implemented in an environment that allows objects to be arranged in formations, such as hierarchies. For example, a hierarchy may include objects arranged in a tree-like structure with branches and/or leaves, a parent object and/or child/grandchild objects, etc. As described herein, multiple object trees may be created by a processing algorithm implemented by a general purpose processor. One of the created multiple object trees may be optimized to run on a different processor from the general purpose processor, such as a specialized processing unit. The object tree may, for example, be optimized so that a desired (e.g., an optimal) performance may be achieved when the object tree is processed by the specialized processing unit. As one example, data associated with one of the multiple objects may be converted to a format that provides a desired, e.g., best, performance from the specialized processing unit.

In one exemplary embodiment where the specialized processing unit includes a GPU, a user may specify a graphical scene to be rendered and a first object tree may be created to describe the graphical scene based on the user specification. A second graphics rendering tree may be created, based on the first object tree, where the second graphics rendering tree is optimized to provide a certain performance from the GPU (e.g., a specified performance, a threshold performance, a best performance, an optimum performance, etc.). During this optimization, for example, data in the first object tree may be converted to a format that provides the certain performance from the GPU (e.g., fastest and/or most efficient graphics rendering). In one embodiment, data in each of the objects of the first object tree may be converted to a format that provides the certain performance from the GPU. The GPU may subsequently use the second graphics rendering tree for rendering the graphical scene specified by the user. Use of the optimized graphics rendering tree can enhance the speed and/or efficiency of the overall graphics rendering process. Creation of the graphics rendering tree, which is optimized to the GPU, prior to rendering the graphics, thus, eliminates "on the fly" data/object conversion which can slow down the rendering process.

For efficient execution by the GPU, objects in the graphics rendering tree may have coordinates in a three dimensional coordinate system and colors in a true color space. However, the coordinates and colors of the objects in the object tree may be in other coordinate systems or color spaces. For example, the coordinates of objects in the object tree may be in a polar coordinate system and/or another type of coordinate system. Additionally, the coordinate and color values in the object tree may be stored in various different data types and/or formats. However, the coordinate and color values in the graphics rendering tree may have to be in a specific data type and/or format to obtain the best performance from the GPU. Thus, to ensure that different objects agree on the exact conversion between the different coordinate systems and/or color spaces, "dataspace" or "colorspace" objects may be inserted into the object tree to perform data transformation/conversion for related child objects. The dataspace and colorspace objects may perform data transformation/conversion for related child objects so that the objects in the graphics rendering tree will have their data stored in the proper coordinate system, color space and/or data type/format to obtain the certain performance (e.g., best performance) from the GPU.

Optimization of the graphics rendering tree can mean that data associated with a graphics rendering tree has been converted to a format that maximizes the speed and/or efficiency of use of that data by the GPU, and/or that contents of the graphics rendering tree have been organized and/or ordered (e.g., sorted) to increase the speed and/or efficiency of graphics rendering performed by the GPU. "Certain performance" as referred to herein may include a best performance, an optimum performance, a determined or specified performance and/or a threshold performance. A best performance may mean that a speed associated with the execution of a process by a specialized processing unit (e.g., a GPU) is enhanced (e.g., maximized) relative to using an object tree that has not had its data converted to a format the maximizes the speed and/or efficiency of use of that data by the GPU, or that has not been organized and/or ordered to increase the speed and efficiency of the graphics rendering performed by the GPU.

Overview

FIG. 1A illustrates an overview of an exemplary embodiment involving the generation of multiple object trees for use by respective ones of multiple processing units, where one of the multiple processing units includes a specialized processing unit. In the exemplary embodiment of FIG. 1A, a peer tree of a first object tree is generated that is optimized to provide the certain performance (e.g., best performance) from the specialized processing unit.

As shown in FIG. 1A, a first object tree 100 may be generated based on user input received by a processing algorithm 105, where the contents of object tree 100 may then be used by a processor 125. A peer object tree 110 may be generated, based on the contents of object tree 100, where the contents of peer object tree 110 are optimized to provide the certain performance (e.g., best performance) from specialized processing unit 130. Processing algorithm 105 may include any algorithm that can receive user input and generate an object tree 100 for use by processor 125. Object tree 100 may include one or more objects 115, which may be generated from a library (not shown), a toolbox, or the like, based on the user input and processing algorithm 105. The objects 115 of object tree 100 may be used by processor 125 during algorithm execution. The objects 115 of object tree 100 are depicted as linked in a tree structure. In other implementations, however, objects 115 may be linked as an acyclic graph or any other suitable linking structure.

Processor 125 may include any general purpose processor, such as, for example, a microprocessor or central processing unit (CPU). Specialized processing unit 130 may include a dedicated processing unit designed to perform a specific function. Specialized processing units are typically used to offload time consuming tasks from a central processing unit (CPU). Specialized processing units may perform the offloaded tasks more efficiently then a general purpose CPU or microprocessor. Specialized processing unit 130 may include, for example, a graphics processing unit (GPU), a physics processing unit (PPU), a digital signal processor (DSP), or other type of specialized processing unit (e.g., field programmable gate arrays (FPGAs)). A GPU may include a dedicated graphics rendering device (e.g., for a personal computer, workstation, or game console) that is designed to be efficient at manipulating and displaying computer graphics. A PPU may include a dedicated microprocessor designed to handle physics calculations such as, for example, a physics engine of a video game. Examples of calculations involving a PPU might include rigid body dynamics, soft body dynamics, collision detection, fluid dynamics, finite element analysis, etc. A DSP may include a specialized processor designed to specifically handle digital signal processing.

Peer object tree 110 (including the contents of each object of peer object tree 110) may be generated from object tree 100 using another library (not shown) based on the contents of object tree 100. The contents of peer object tree 110, including the format of data associated with peer object tree 110, are optimized, relative to the contents of object tree 100, for providing the certain performance (e.g., best performance) from specialized processing unit 130. As shown in FIG. 1A, peer object tree 110 may include multiple objects 120. After generation of peer object tree 110, objects 120 may be used by specialized processing unit 130 during algorithm execution. The objects 120 of peer object tree 110 are depicted as linked in a tree structure. In other implementations, however, objects 120 may be linked as an acyclic graph or any other suitable linking structure.

Figure 1B:
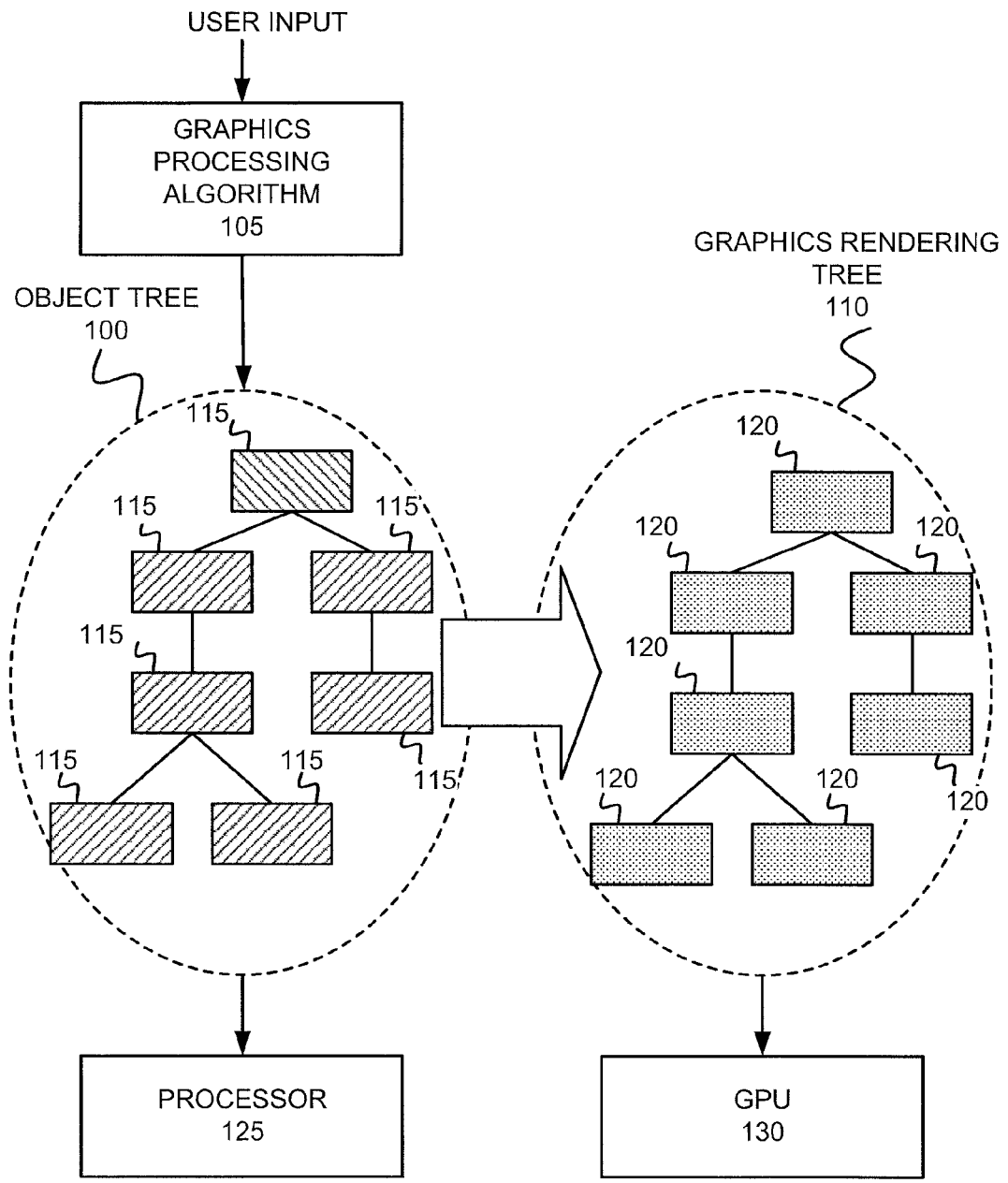

FIG. 1B illustrates an overview of another exemplary embodiment where one of the multiple processors is a GPU. As shown in FIG. 1B, object tree 100 may be generated based on user input received by a graphics processing algorithm 105. The user input received by graphics processing algorithm 105 may select the contents of a specific graphical scene to be displayed and may set the parameters of the graphical scene. A graphics rendering tree 110 may then be generated which is optimized to provide the certain performance (e.g., best performance) from GPU 130 based on the contents of object tree 100. The contents of graphics rendering tree 110, including the format of data associated with graphics rendering tree 110, are optimized, relative to the contents of object tree 100, for providing the certain performance from GPU 130.

As shown in FIG. 1B, graphics rendering tree 110 may include multiple objects 120 linked in a tree structure. In other implementations, the multiple objects 120 may be linked as an acyclic graph or any other suitable linking structure. The correspondence between objects in object tree 100 and graphics rendering tree 110 may be maintained through the use of cookies. A "cookie" as referred to herein refers to a unique identifier that identifies an object of object tree 100 or graphics rendering tree 110. Cookies may include any type of unique identifier for identifying an object of object tree 100 or graphics rendering tree 110 (e.g., numerical identifier, textual identifier, etc.). Each object in object tree 100 may have a cookie that refers to its corresponding object in graphics rendering tree 110. Furthermore, each object in graphics rendering tree 110 may have a cookie that refers to its corresponding object in object tree 100. Thus, implementations described herein may use cookies, instead of other techniques, such as pointers, for maintaining correspondences between objects of the two trees. In other implementations, other means of pointing from an object in one tree to its corresponding object in the other tree may be used. For example, pointers, a combination of cookies and pointers, or pointers and/or cookies in combination with other means of pointing may be used. After generation of graphics rendering object tree 110, objects 120 may be used by GPU 130 during graphics rendering.

Figure 2B:
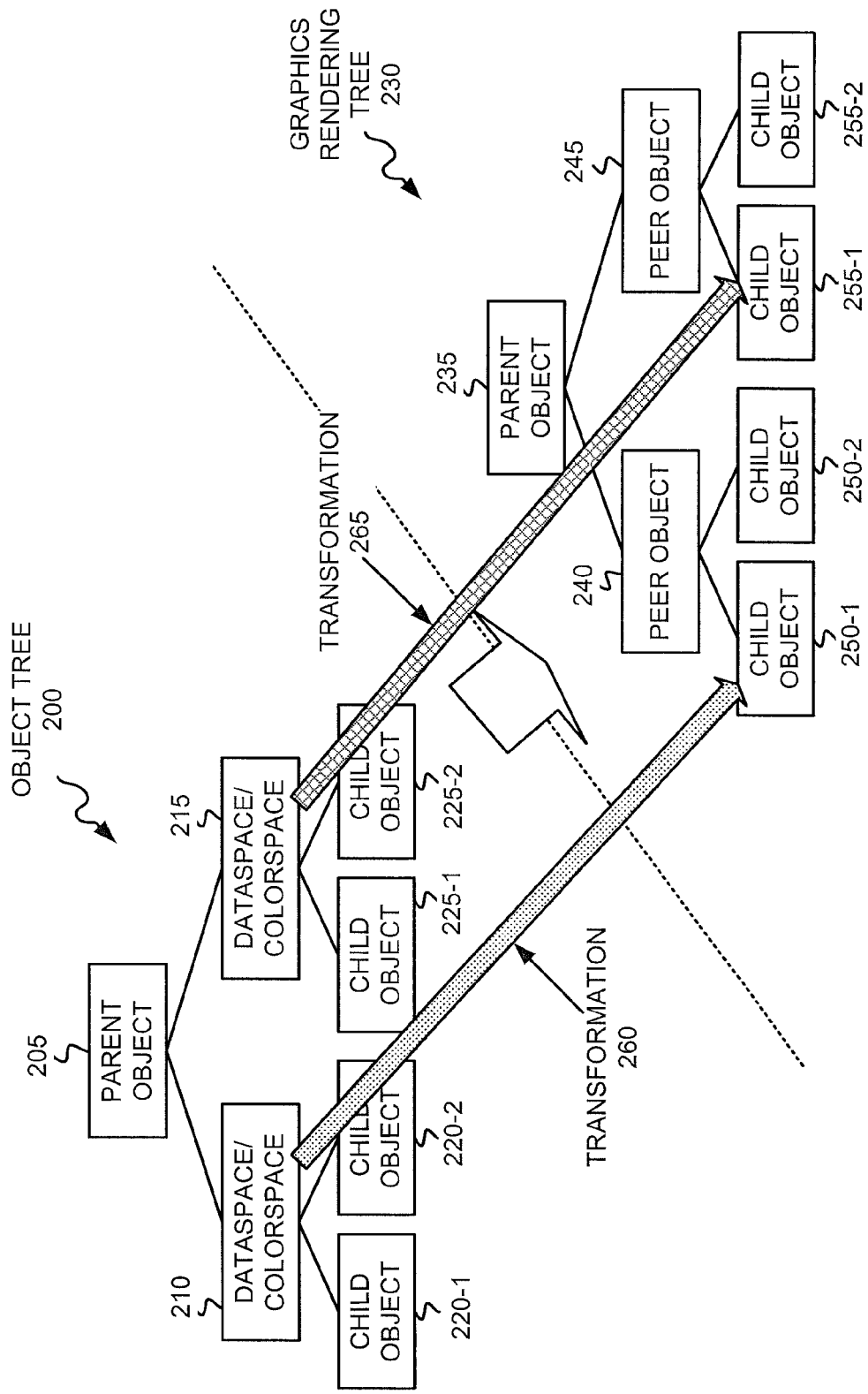

FIGS. 2A and 2B illustrate an overview of the use of dataspace or colorspace objects for transforming object tree coordinates, colors and/or data types/formats from a first coordinate system(s), color space(s) and/or data type/format(s) to a different coordinate system(s), color space(s) and/or data type/format(s) for use with the graphics rendering tree of FIG. 1B. As shown in FIG. 2A, an object tree 200 (corresponding to object tree 100 in FIG. 1A), or a portion of an object tree 200, may include a parent object 205 connected to multiple dataspace or colorspace objects. For purposes of illustration, FIG. 2A depicts dataspace/colorspace object 210 and dataspace/colorspace 215 connected to parent object 205. Dataspace/colorspace objects 210 and 215 may each include either a dataspace object or a colorspace object. A dataspace object may transform object tree coordinates and/or data types/formats from a first coordinate system and/or data type/format to a different coordinate system and/or data type/format for use with the graphics rendering tree. A colorspace object may transform object tree colors from a first color space to another color space for use with the graphics rendering tree. Dataspace/colorspace objects 210 and 215, each shown as a single object, may include two separate objects (e.g., a colorspace object connected to a dataspace object).

As further shown in FIG. 2A, each colorspace/dataspace object of object tree 200 may have one or more connected child objects. For purposes of illustration, FIG. 2A depicts child objects 220-1 and 220-2 connected to dataspace/colorspace object 210 and child objects 225-1 and 225-2 connected to dataspace/colorspace object 215. Fewer or additional child objects may be connected to objects 210 and 215. Each dataspace/colorspace object of object tree 200 transforms coordinates, colors and/or data types/formats of its child objects from a first coordinate system, color space and/or data type/format to a different coordinate system, color space and/or data type/format. For example, dataspace/colorspace object 210 transforms coordinates, colors and/or data types/formats of child objects 220-1 and 220-2 and dataspace/colorspace object 215 transforms coordinates, colors and/or data types/formats of child objects 225-1 and 225-2.

Dataspace/colorspace object 210 and dataspace/colorspace object 215 may transform the coordinates, colors and/or data types/formats of their child objects from a first coordinate system, color space and/or data type/format associated with object tree 200 to a second coordinate system, color space and/or data type/format associated with the graphics rendering tree. For example, coordinate data values in object tree 200 may represent positions in a three-dimensional coordinate system and color data values may represent positions in some color space. The three dimensional coordinate system may include, for example, a polar coordinate system or a Cartesian coordinate system. In the same way, the color-space may include an RGB color-space with values for each of the three color components, or a color mapped space where the data values are indices into the color map. Assume for sake of an example, that coordinates relating to one or more objects in object tree 200 may be in a three-dimensional Cartesian coordinate system and the colors may be in a true color colorspace. Additionally, the coordinate and color values relating to one or more objects in object tree 200 may be stored in various different data types and formats. In the example, the coordinates, color values and data types/formats of data associated with objects in the graphics rendering tree, however, should be in the specific coordinate systems, color spaces and/or data types/formats that provide a certain performance (e.g., best performance) out of the GPU. Dataspace/colorspace object 210 and dataspace/colorspace object 215 may transform the coordinates, colors and/or data types/formats of their child objects using the same or different transformations. As shown in FIG. 2B, dataspace/colorspace object 210 may use a first transformation 260, while dataspace/colorspace object 215 may use a second transformation that is different than the first transformation. For example, dataspace/colorspace object 210 may perform a linear transformation on its child objects, whereas dataspace/colorspace object 215 may perform a nonlinear transformation (e.g., logarithmic) on its child objects.

If dataspace/colorspace object 210 or 215 includes a dataspace object, then object 210 or 215 includes a transform method that takes coordinate values in a first coordinate system as an input and generates coordinate values in a second coordinate system in a correct data type/format for the graphics rendering tree. If dataspace/colorspace object 210 or 215 includes a colorspace object, then object 210 or 215 includes a transform method that takes color values in a first color space as an input and generates color values in a second color space. For example, the colorspace object may perform a color mapping transformation that converts color values from scalar values to RGB color values. As another example, the colorspace object may perform a color mapping transformation that converts color values of the object tree in LAB or HSV colorspace to RGB colors of the graphics rendering tree.

FIG. 2B illustrates the transformation of coordinates, color values and/or data types/formats associated with object tree 200 from a first coordinate system, color space and/or data type/format associated with object tree 200 to a second coordinate system, color space and/or data type/format associated with the graphics rendering tree. As shown in FIG. 2B, dataspace/colorspace object 210 may perform a transformation of the coordinates, color values and/or data types/formats associated with child objects 220-1 and 220-2 and may provide those transformed coordinates, color values and/or data types/formats to child objects 250-1 and 250-2 of graphics rendering tree 230. As further shown in FIG. 2B, dataspace/colorspace object 215 may perform a transformation of the coordinates, color values and/or data types/formats associated with child objects 225-1 and 225-2 and may provide those transformed coordinates, color values and/or data types/formats to child objects 255-1 and 255-2. In one implementation, the converted data types/formats or transformed coordinates or color values may be set as data types/formats, coordinates and/or color values of appropriate child objects of object tree 200 and then, during update traversal (described further below), the converted data types/formats or transformed coordinates or color values may be shared with corresponding child objects in graphics rendering tree 230.

Exemplary Network

FIG. 3 is an exemplary diagram of a network 300 in which systems and methods described herein may be implemented. Network 300 may include clients 310-1 through 310-N (referred to collectively as clients 310 and individually as client 310) that may connect to a server 320 via one or more network(s) 330 using browsers 315-1 through 315-N (referred to collectively as browsers 315 and individually as browser 315). Multiple clients 310 and one server 320 have been illustrated as connected to network(s) 330 for simplicity. In practice, there may be more or fewer clients and servers. Also, in some instances, a client may perform one or more functions of a server and a server may perform one or more functions of a client.

Clients 310 may include devices, such as a personal computer, a wireless telephone, a personal digital assistant (PDA), a lap top, or another type of computation or communication device, a thread or process running on one of these devices, and/or an object executable by one of these devices. Clients 310 may each receive input from respective users, create object trees and corresponding graphics rendering trees, and render graphics based on the graphics rendering trees. Server 320 may include a server device that may, in some implementations, perform various aspects of object tree creation and graphics rendering. For example, in one implementation, client 310 may receive input from a user and send, via browser 315, the input to server 320. Server 320 may receive the input, create the object tree and corresponding graphics rendering tree, and send the object tree and corresponding graphics rendering tree to browser 315. Client 310 may then render, via browser 315, the graphics based on the graphics rendering tree created at server 320.

Network(s) 330 may include one or more networks of any type, including a local area network (LAN); a wide area network (WAN); a metropolitan area network (MAN); a satellite network; a telephone network, such as the Public Switched Telephone Network (PSTN) or a Public Land Mobile Network (PLMN); an intranet, the Internet; or a combination of networks. The PLMN(s) may further include a packet-switched sub-network, such as, for example, General Packet Radio Service (GPRS), Cellular Digital Packet Data (CDPD), or Mobile IP sub-network.

Exemplary Architecture

Figure 4:
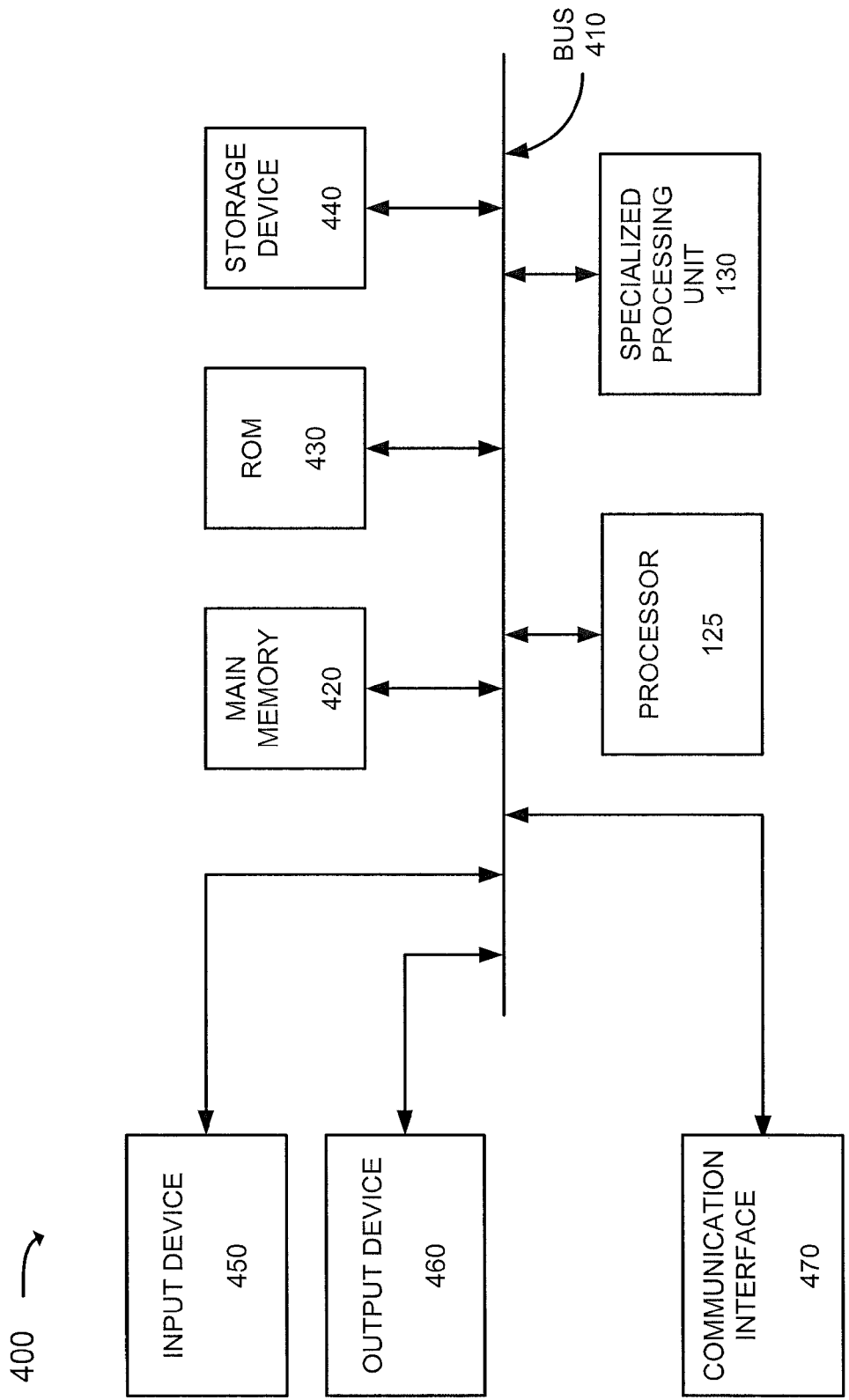
FIG. 4 is a block diagram of a device according to an exemplary implementation.

FIG. 4 is an exemplary diagram of a device 400 that may correspond to client 310 or server 320. Device 400 may include a bus 410, a processor 125, a specialized processing unit 130, a main memory 420, a read only memory (ROM) 430, a storage device 440, an input device 450, an output device 460, and a communication interface 470. Bus 410 may include a path that permits communication among the elements of device 400.

Processor 125 may include a processor, microprocessor, or processing logic that may interpret and execute instructions. Processor 125 may include, for example, a general purpose processor or microprocessor (e.g., a CPU). Specialized processing unit 130 may include a dedicated processing unit designed to perform a specific function, such as, for example, a graphics processing unit (GPU), a physics processing unit (PPU), a digital signal processor (DSP), or another type of specialized processing unit. Main memory 420 may include a random access memory (RAM) or another type of dynamic storage device that may store information and instructions for execution by processor 125 and/or specialized processing unit 130. ROM 430 may include a ROM device or another type of static storage device that may store static information and instructions for use by processor 125 and/or specialized processing unit 130. Storage device 440 may include a magnetic and/or optical recording medium and its corresponding drive.

Input device 450 may include a mechanism that permits an operator to input information to device 400, such as a keyboard, a mouse, a pen, voice recognition and/or biometric mechanisms, etc. Output device 460 may include a mechanism that outputs information to the operator, including a display, a printer, a speaker, etc. Communication interface 470 may include any transceiver-like mechanism that enables device 400 to communicate with other devices and/or systems. For example, communication interface 470 may include mechanisms for communicating with another device or system via a network, such as network(s) 330.

Device 400, consistent with the embodiments described herein, may perform certain operations or processes, as will be described in detail below. Device 400 may perform these operations in response to processor 125 and/or specialized processing unit 130 executing software instructions contained in a computer-readable medium, such as memory 420. A computer-readable medium may be defined as a physical or logical memory device.

The software instructions may be read into memory 420 from another computer-readable medium, such as data storage device 440, or from another device via communication interface 470. The software instructions contained in memory 420 may cause processor 125 and/or specialized processing unit 130 to perform operations or processes that will be described later. Alternatively, hardwired circuitry may be used in place of or in combination with software instructions to implement embodiments described herein. Thus, implementations described herein are not limited to any specific combination of hardware circuitry and software.

Although FIG. 4 shows example components of device 400, in some implementations, device 400 may include fewer, different, or additional components than those depicted in FIG. 4.

Exemplary Client Functional Diagram

Figure 5:
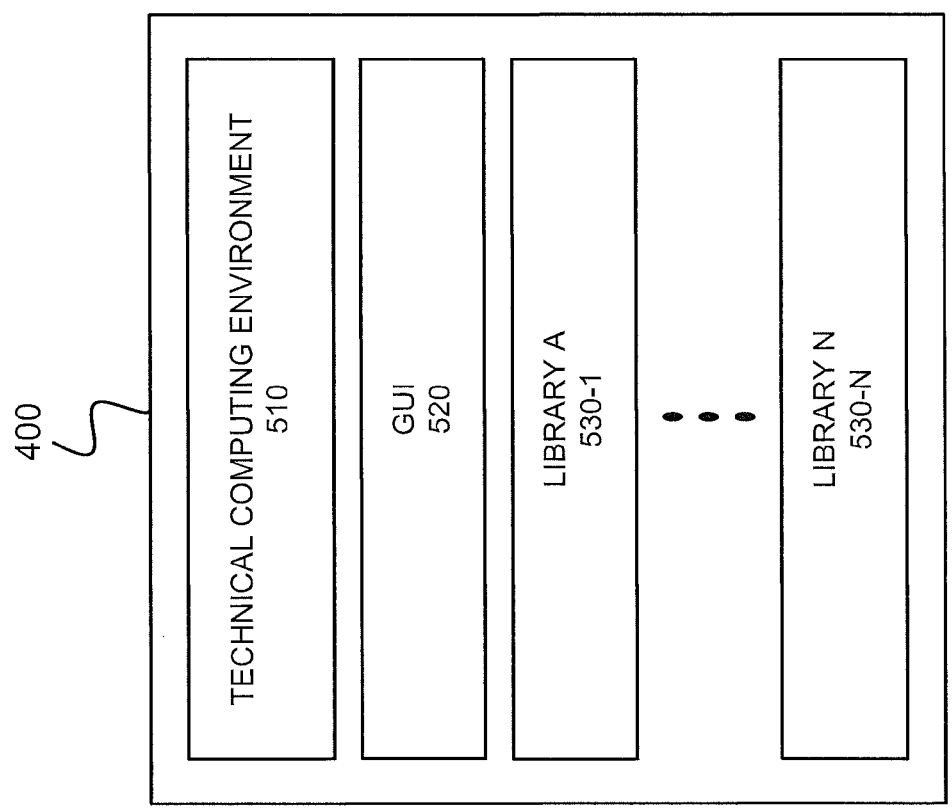
FIG. 5 is an exemplary functional block diagram of the device.

FIG. 5 is an exemplary functional diagram of device 400. The diagram of FIG. 5 depicts functional components that may be implemented by processor 125, or in the case of data or objects, implemented in memory 420, ROM 430 or storage device 440. As depicted in FIG. 5, at a functional level, device 400 may include a technical computing environment (TCE) 510, a graphical user interface (GUI) 520, and libraries A 530-1 through N 530-N.

TCE 510 may include any hardware and/or software based logic that provides a computing environment that allows users to perform tasks related to disciplines, such as, but not limited to, mathematics, science, engineering, medicine, business, etc. In one implementation, TCE 510 may include a dynamically-typed programming language (e.g., the M language) that can be used to express problems and/or solutions in mathematical notations. For example, one or more languages provided in TCE 510 may use an array as a basic element, where the array may not require dimensioning. TCE 510 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 510 may further provide mathematical functions and/or graphical tools (e.g., for creating plots, surfaces, images, volumetric representations, etc.). In one implementation, TCE 510 may provide these functions and/or tools using toolboxes (e.g., toolboxes for signal processing, image processing, data plotting, parallel programming, etc.). In another implementation, TCE 510 may provide these functions as block sets. In still another implementation, TCE 510 may provide these functions in another way, such as via a library, etc.

TCE 510 may be implemented as a text-based environment (e.g., MATLAB® (from "The Mathworks"); Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; Ptolemy from the University of California at Berkeley; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; aspects of a Unified Modeling Language (UML) or SysML environment; etc.), or another type of environment, such as a hybrid environment that includes one or more of the above-referenced text-based environments and one or more of the above-referenced graphically-based environments.

GUI 520 may include any type of graphical interface that may receive user input and/or may cause one or more graphics to be rendered for display. For example, GUI 520 may receive user input that selects a type of graphics to be displayed, and the parameters of the graphics, and subsequently cause the graphics to be displayed.

Library A 530-1 may include a library of objects, and associated data, that may be used for constructing an object tree or acyclic graph that, for example, describes a graphical scene. In other implementations, a toolbox may be used instead of, or in addition to, library A 530-1. Library A 530-1 may be accessed to retrieve appropriate objects which can be assembled in the object tree for describing the graphical scene. For example, in one embodiment, library A 530-1 may be accessed based on user input. Various different objects may be stored in library A 530-1 depending on the type of processing algorithm 105 being implemented. If the processing algorithm (e.g., processing algorithm 105) includes a graphics processing algorithm, examples of objects that may be contained in library A 530-1 include (but are not limited to) an "axes" object, a "dataspace" object, a "colorspace" object, a "surface" object, a "ruler" object, a "line" object, a "quadrilateral" object and a "text" object.

The "axes" object may include a composite object that groups together a number of simpler objects to provide a better user interface. When an "axes" object is created, one or more additional simpler objects are created including (but not limited to), for example, a "dataspace" object, a "colorspace" object, one or more "ruler" objects, a "box" object and/or a "clipnode" object. These simpler objects may be called "child objects" and the "axes" object may set at least a portion of the properties of these child objects. The properties of the "axes" object, thus, may "pass through" to the properties of the child objects. The "dataspace" object and the "color space" object has been described above with respect to FIGS. 2A and 2B.

The "surface" object may include properties that control how the "surface" object's peer object in the graphics rendering tree generates a visual representation of a function over a two dimensional parametric domain. The "surface" object may have three properties named "XData," "YData," and "ZData." The "XData" property may specify the X coordinates of columns of the parametric space. The "YData" may specify the Y coordinates of columns of the parametric space. The "XData" and "YData" may include one-dimensional vectors with M values in the "YData" and N values in the "XData." The "ZData" property may define the Z coordinates of the space and may include a two dimensional array with dimensions MxN.

The "ruler" object may include properties that control how the "ruler" object's peer object in the graphics rendering tree draws tick marks and labels for one axis of the "Axes" object. The "axes" object may create one ruler for the X axis, another for the Y axis, and another one for the Z axis. The "ruler" object may create two child objects. One of the two child objects may include the "line" object that may include properties that control how the "line" object's peer object in the graphics rendering tree draws the tick marks. The other of the two child objects may include the "text" object that may include properties that control how the "text" object's peer object in the graphics rendering tree draws the labels. The "line" object may include properties that control how the "line" object's peer object in the graphics rendering tree renders one or more continuous or disjoint line segments. The "quadrilateral" object may include properties that control how the "quadrilateral" object's peer object in the graphics rendering tree draws three dimensional coordinates and fills the interior of a bounding quadrilateral.

The "quadrilateral" object may also control how the "quadrilateral" object's peer object in the graphics rendering tree fills the interior of a bounding quadrilateral with a solid color, interpolates four input colors, or performs lighting calculations. The "text" object may include properties that control how the "text" object's peer object in the graphics rendering tree draws characters to the screen in the graphical scene.

Library N 530-N may include another library of objects, and associated data, that may be used for constructing a peer object tree, such as, for example, graphics rendering tree 110, that may be used by GPU 130 for rendering the graphical scene described by the object tree. In other implementations, a toolbox may be used instead of, or in addition to, library N 530-N. Library N 530-N may be accessed to retrieve appropriate objects, based on the contents of the corresponding object tree, which can be assembled in the graphics rendering object tree for use by GPU 130. Various different objects may be stored in library N 530-N depending on the type of processing algorithm 105 being implemented. The contents of library N 530-N may be changed due to, for example, changing performance characteristics of the specialized processing unit (e.g., the GPU). In other implementations, another library may be "ported" to enable the use of different objects in the peer object tree (e.g., graphics rendering tree). If the processing algorithm includes a graphics processing algorithm, examples of objects that may be contained in library N 530-N include (but are not limited to) a "viewport" object, a "camera" object, a "group" object and a "geode" object.

A "viewport" object may include functionality for controlling the size and position of the window in which the graphical scene is rendered. A "camera" object may include functionality for transforming a given coordinate system to the rendering system coordinates. For example, a "camera" object may define a mapping from three dimensional world coordinates to two dimensional coordinates within the current viewport. A "group" object may act as a placeholder so that the structure of the object tree and peer object tree match. A "geode" object may include functionality for causing aspects of the graphical scene to be drawn (e.g., points, lines, triangles or quadrilaterals).

Although FIG. 5 shows example functional components of device 400, in some implementations, device 400 may include fewer, different, or additional functional components than those depicted in FIG. 5.

Exemplary Tree Creation Process

Figure 6:
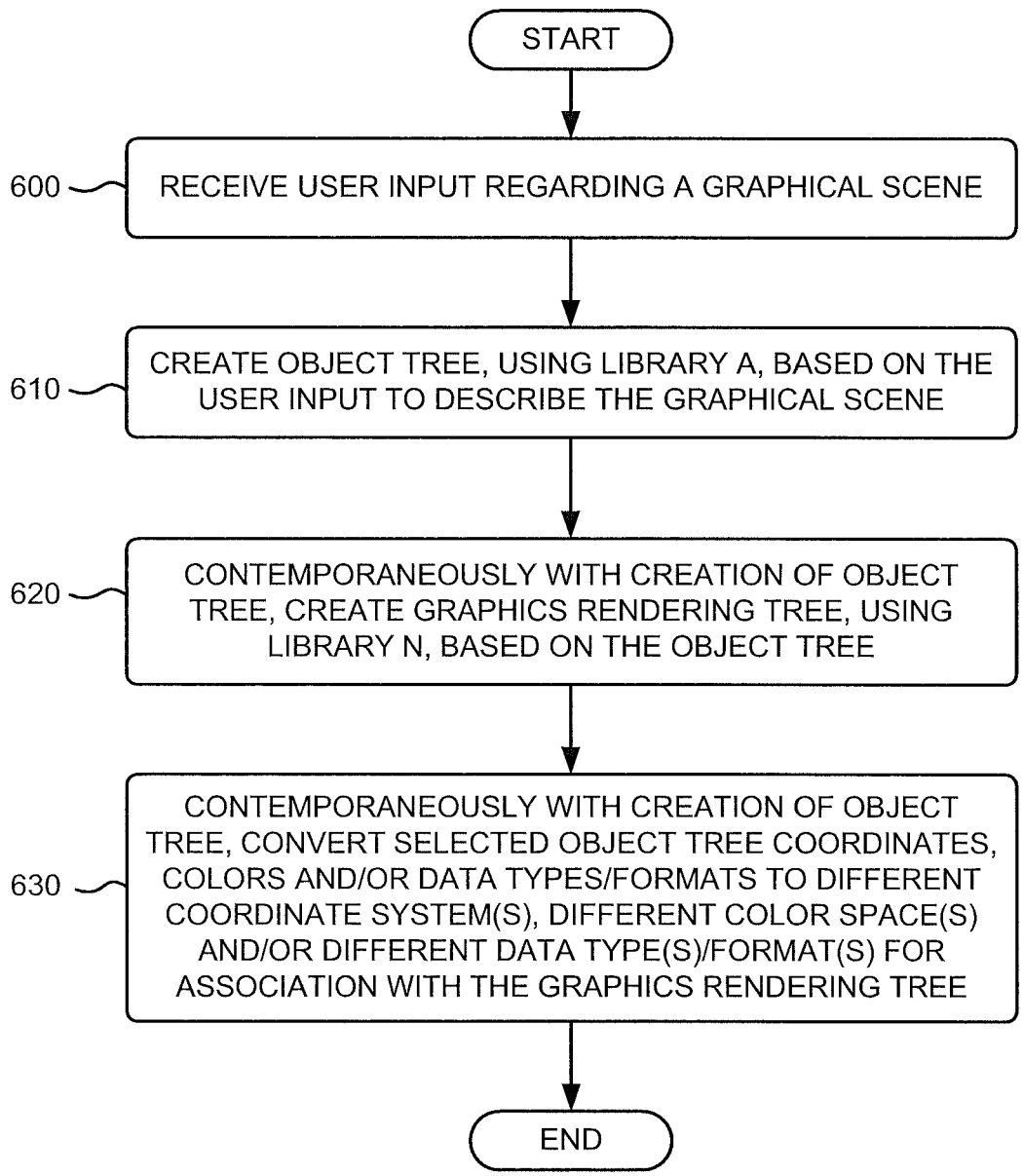
FIG. 6 is a flowchart of an exemplary process for creating object trees for use in describing a graphical scene and for rendering the graphical scene via a GPU.

FIG. 6 is a flowchart of an exemplary process for creating object trees for use in describing a graphical scene and for rendering the graphical scene via a GPU. In one implementation, the process exemplified by FIG. 6 may be performed by processor 125 of a client 310. In another implementation, the process exemplified by FIG. 6 may be performed by processor 125 of server 320. In a further implementation, blocks 600 and 610 of FIG. 6 may be performed by processor 125 of a client 310 and blocks 620 and 630 may be performed by processor 125 of server 320.

Figure 7:
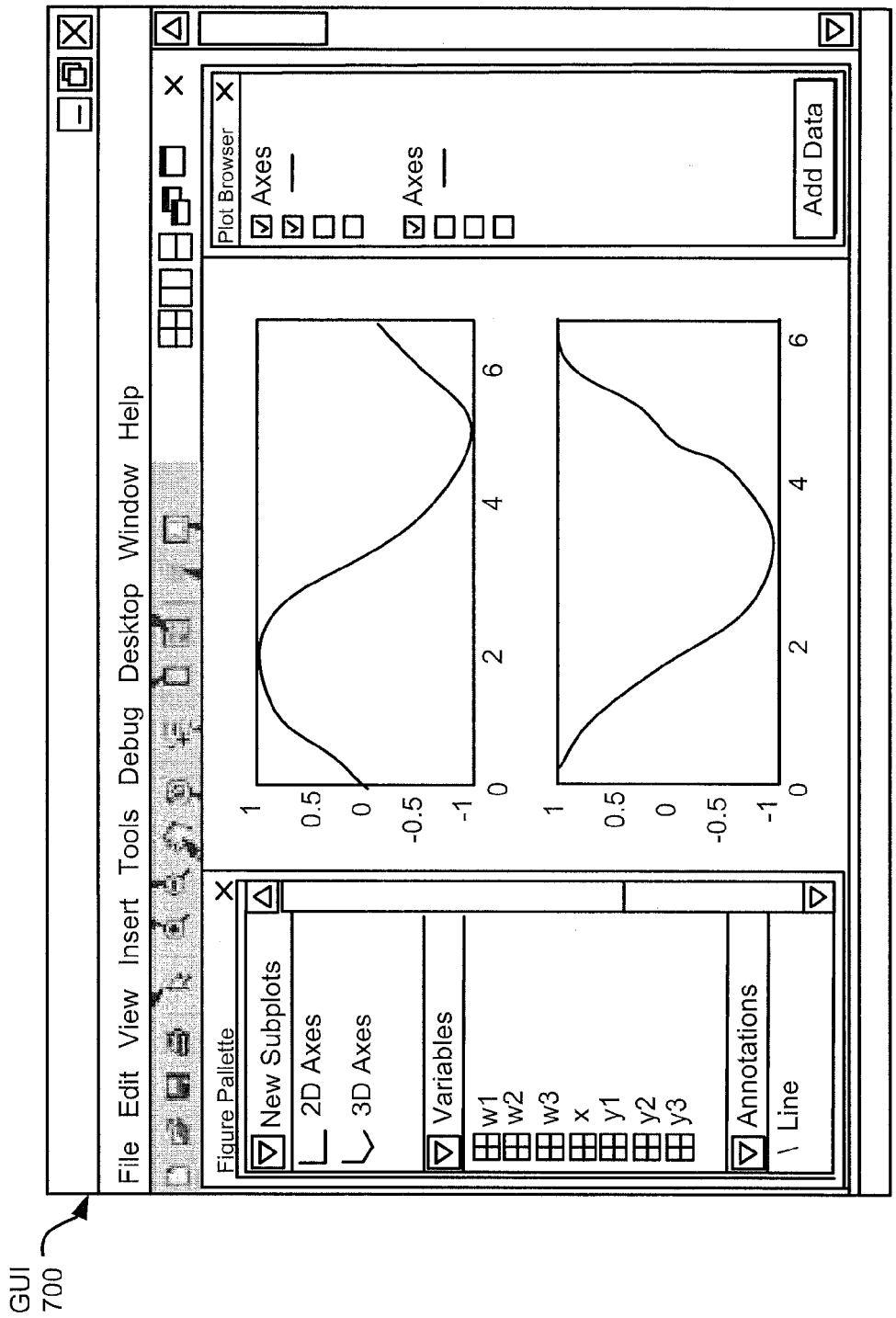
FIG. 7 is a diagram of an exemplary graphical user interface that may be implemented at a client.

The exemplary process may begin with the receipt of user input regarding a graphical scene (block 600). The user input may specify a type of graphical scene that is to be rendered, including parameters associated with the graphical scene. For example, the graphical scene may be a three dimensional graph and the parameters may include x, y and z values that are to be plotted in the three dimensional graph. The user may, for example, use a graphical user interface (GUI) at client 310 to enter the user data for specifying the graphical scene. FIG. 7 illustrates an exemplary GUI 700 that a user may use to enter data for specifying the graphical scene. GUI 700 may be displayed by browser 315. The GUI, similar to GUI 700 shown in FIG. 7, may include various fields, windows, or data entry portions that permit the user to enter the input regarding the graphical scene. The GUI may include fields, windows or data entry portions for entering or identifying graphical scene parameters, labels, etc.

Figure 8:
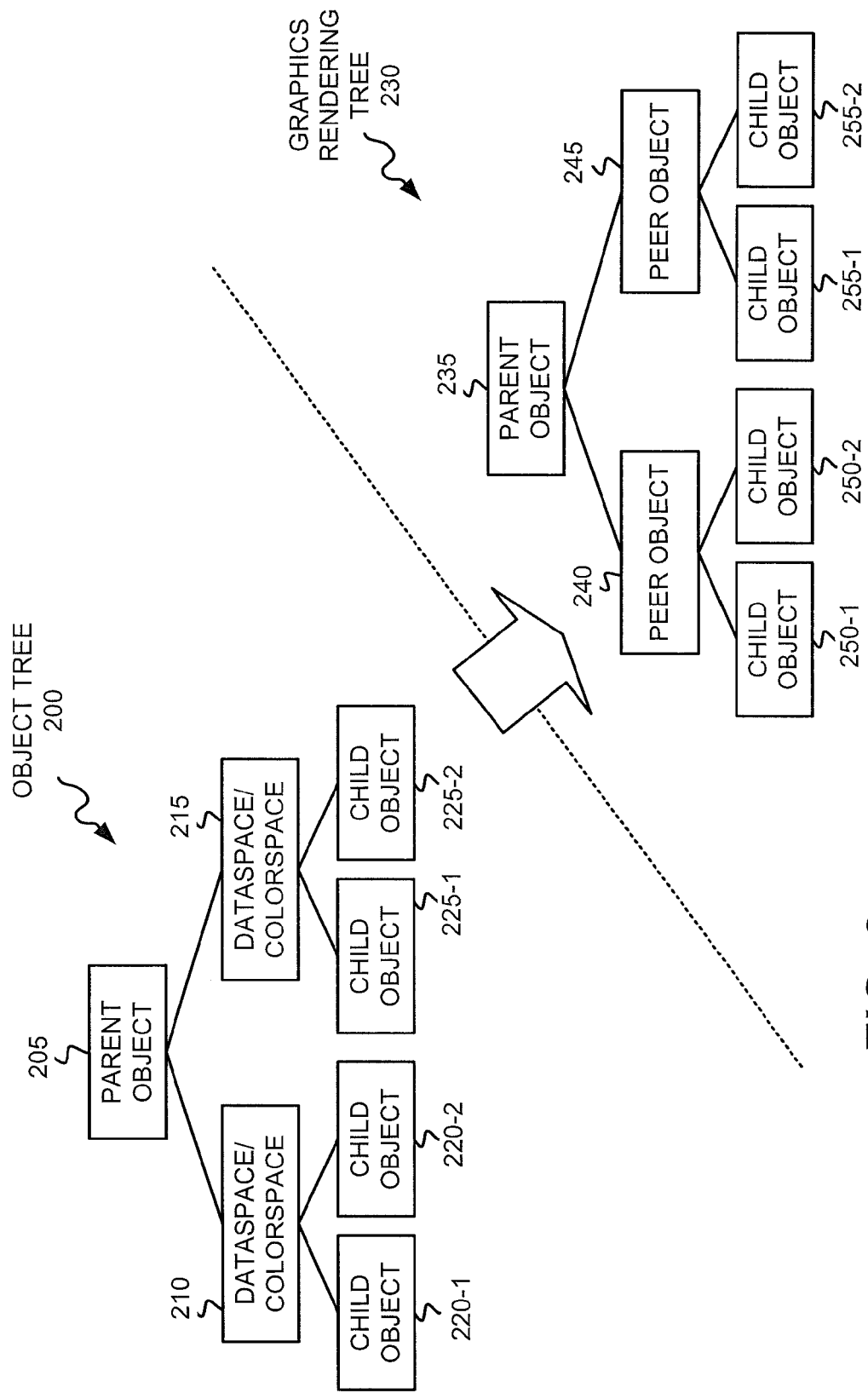
FIG. 8 is a diagram of an exemplary object tree that describes a graphical scene and the creation of a graphics rendering tree from the object tree.

An object tree may be created, using library A 530-1, based on the user input to describe the graphical scene (block 610). Library A 530-1 may be used to retrieve appropriate objects to describe the graphical scene specified by the user, with properties of the retrieved objects being set based on the parameters provided by the user. FIG. 8 illustrates object tree 200 that includes objects 210, 215, 220-1, 220-2, 225-1 and 225-2 linked together in a tree structure.

Exemplary embodiments may create another structure, e.g., a tree, contemporaneously with object tree 200, where the created structure is optimized for a certain performance (e.g., best performance) from the GPU. For example, a graphics rendering tree may be created, contemporaneously with the creation of the object tree, using library N 530-N, based on the object tree (block 620). Each object in the object tree may have one or more corresponding graphics rendering objects that may be retrieved from library N 530-N. Each corresponding graphics rendering object may be optimized to provide the certain performance (e.g., best performance) from the GPU. For example, data associated with each graphics rendering object may be converted to a type/format that provides the certain performance (e.g., best performance) from the GPU. The properties of each graphics rendering object may be set based on the user input and/or based on data associated with the object tree. Each of the graphics rendering objects may be linked together to form a graphics rendering tree. FIG. 8 illustrates the creation of an exemplary graphics rendering tree 230 based on object tree 200. As shown in FIG. 8, each object of object tree 200 has one or more corresponding objects in graphics rendering tree 230.

Contemporaneously with the creation of the object tree, selected object tree coordinates, colors and/or data types/formats may be converted to a different coordinate system(s), a different color space(s) and/or different data type(s)/format(s) for association with the graphics rendering tree (block 630). A "dataspace" object may perform the conversion/transformation of the object tree coordinates and/or data types/formats. A "colorspace" object may perform the conversion/transformation of the object tree color values. For example, types/formats of data associated with objects of object tree 200 may be converted to different types/formats of data, which are optimized for use by a GPU, for association with the graphics rendering tree.

Figure 9A:
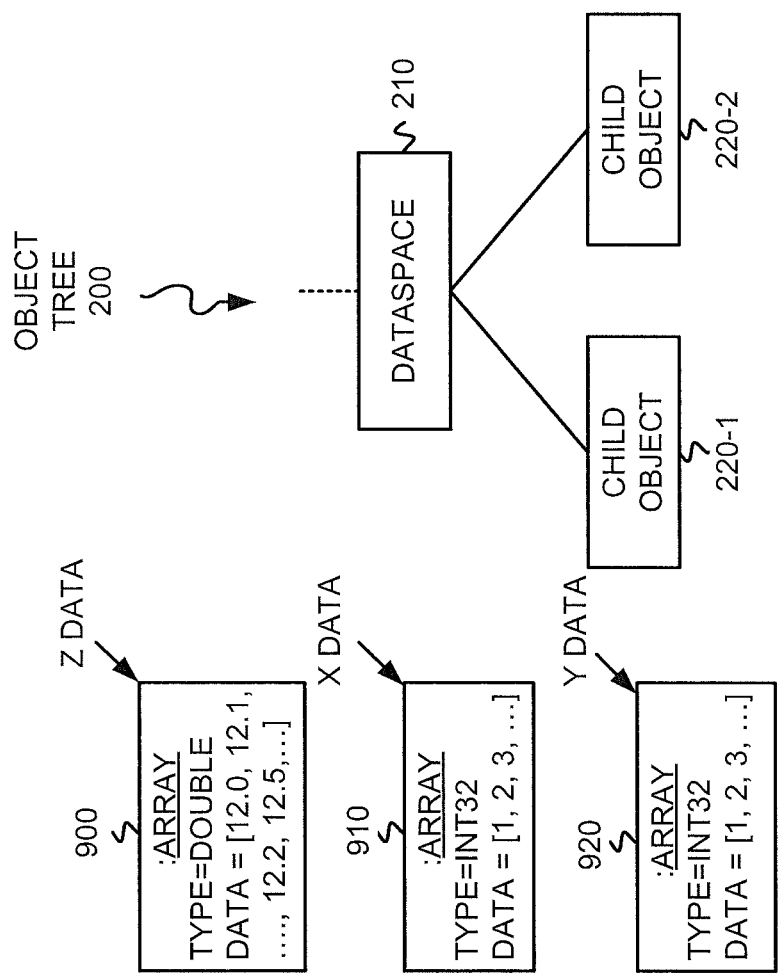
FIGS. 9A and 9B illustrate the conversion of data associated with an object from a first data type/format to a different data type/format for use by the GPU.
Figure 9B:
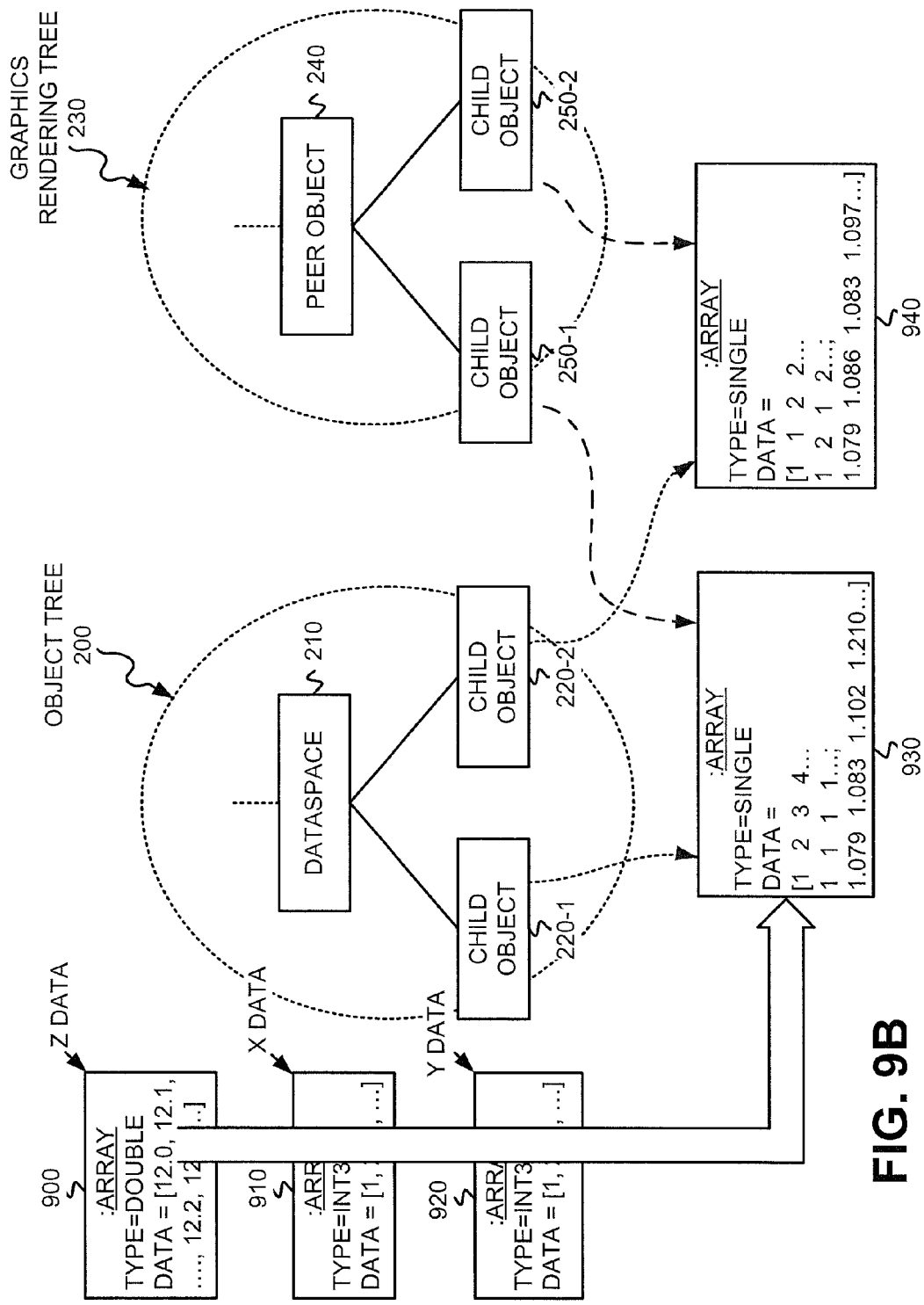

By way of example, as shown in FIGS. 9A and 9B, three arrays of data, X data 910, Y data 920, and Z data 900 associated with a child object of object tree 200 and representing object data points in Cartesian coordinate space, may be converted by dataspace object 210 from a first data type/format to a second data type/format for association with the graphics rendering tree. As depicted in FIG. 9A, Z data 900 may include an array of double precision values, X data 910 may include an array of 32 bit integer values and Y data 920 may include an array of 32 bit integer values.

In FIG. 9B, Z data 900, X data 910 and Y data 920 may be converted to an array 930 of single precision floating point numbers that may be set as values in object 220-1 and to an array 940 of single precision floating point numbers that may be set as values in object 220-2. Arrays 930 and 940 may further be set as values in objects 250-1 and 250-2 of graphics rendering tree 230. The exemplary data format conversion depicted in FIGS. 9A and 9B may be repeated for appropriate other objects of object tree 200 to convert the data associated with those objects to a type/format that provides a certain performance (e.g., best performance) from the GPU.

Figure 10:
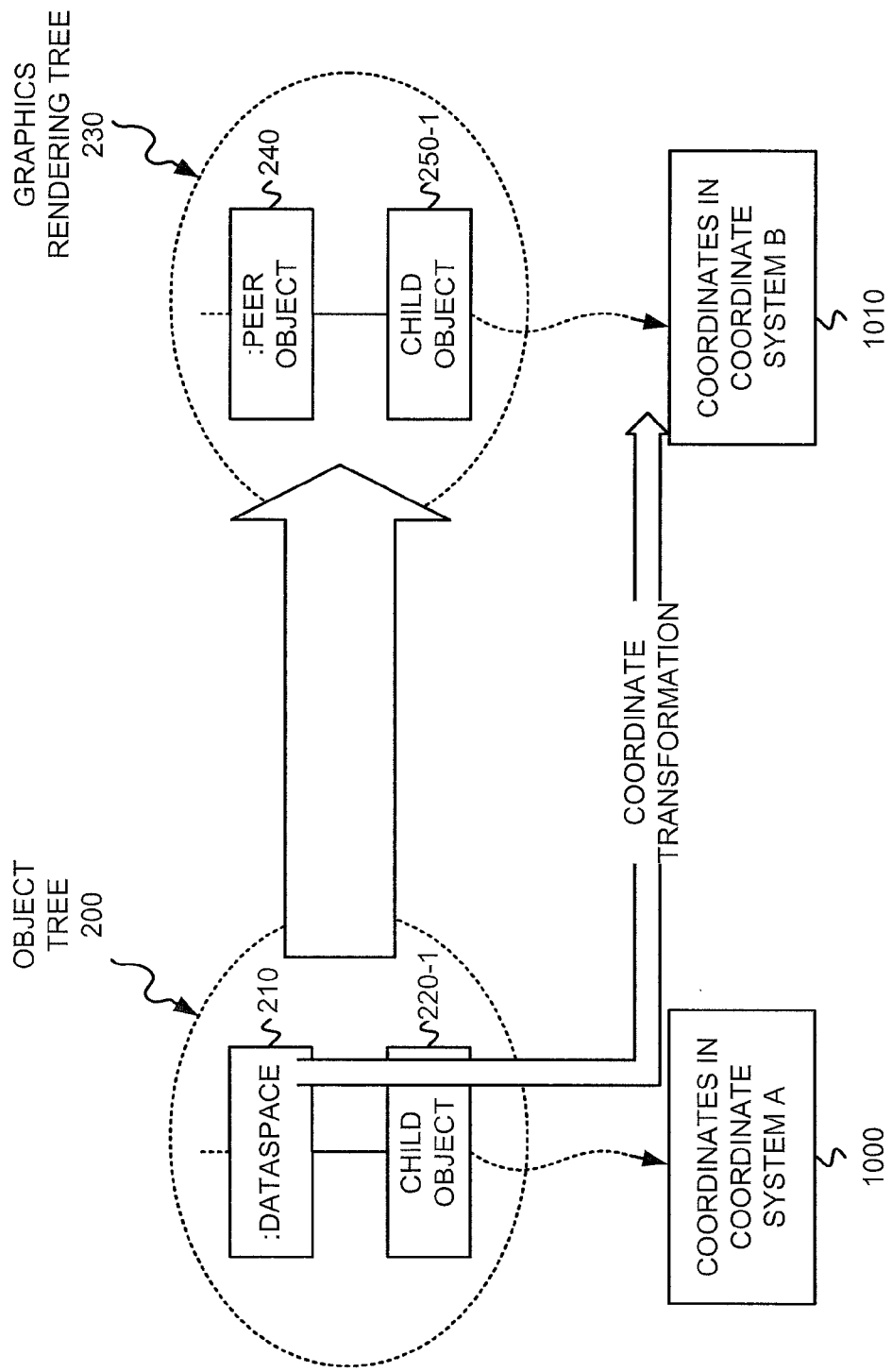
FIG. 10 illustrates the conversion of coordinates of objects in a first coordinate system associated with an object tree to a second coordinate system associated with a graphics rendering tree.

Additionally, object tree 200 coordinate values may be converted from values in a first coordinate system to coordinate values in a different coordinate system for association with the graphics rendering tree. For example, as shown in FIG. 10, coordinates 1000 in a coordinate system A associated with child object 220-1 of object tree 200 may be converted, by dataspace object 210, to coordinates 1010 in coordinate system B for association with the corresponding child object 250-1 of graphics rendering tree 230. Dataspace object 210, thus, may perform coordinate transformation to convert the coordinates of object tree 200 in a first coordinate system to coordinates of graphics rendering tree 230 in a second coordinate system. The second coordinate system may, for example, be the coordinate system used by the GPU when rendering graphics.

Figure 11:
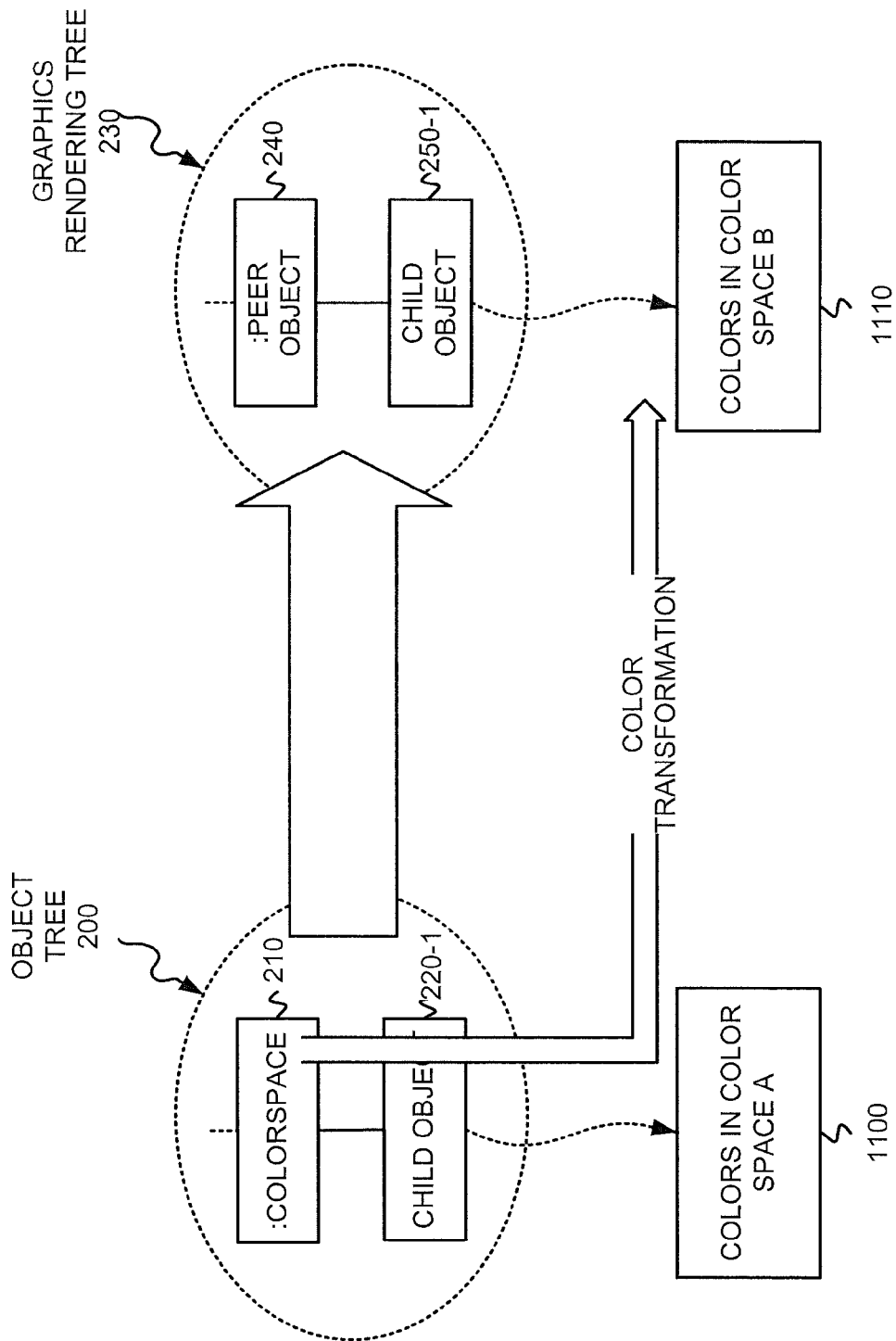
FIG. 11 illustrates the conversion of color values of objects in a first color space associated with an object tree to a second color space associated with a graphics rendering tree.

Furthermore, object tree 200 color values may be converted from values in a first color space to color values in a different color space for association with the graphics rendering tree. For example, as shown in FIG. 11, colors 1100 in color space A associated with child object 220-1 of object tree 200 may be converted, by colorspace object 210, to colors in color space B for association with the corresponding child object 250-1 of graphics rendering tree 230. Colorspace object 210, thus, may perform color transformation to convert the color values of object tree 200 in a first color space to color values of graphics rendering tree 230 in a second color space. The second color space may, for example, be the color space used by the GPU when rendering graphics.

The converted data types/formats, transformed coordinates or transformed colors shown in FIGS. 9A, 9B, 10 and 11 may be set as data types/formats, coordinates or colors of appropriate child objects of object tree 200 and then, during update traversal (described further below), the transformed coordinates may be shared with corresponding child objects in graphics rendering tree 230.

Exemplary Graphics Rendering Tree Creation Process

Figure 12:
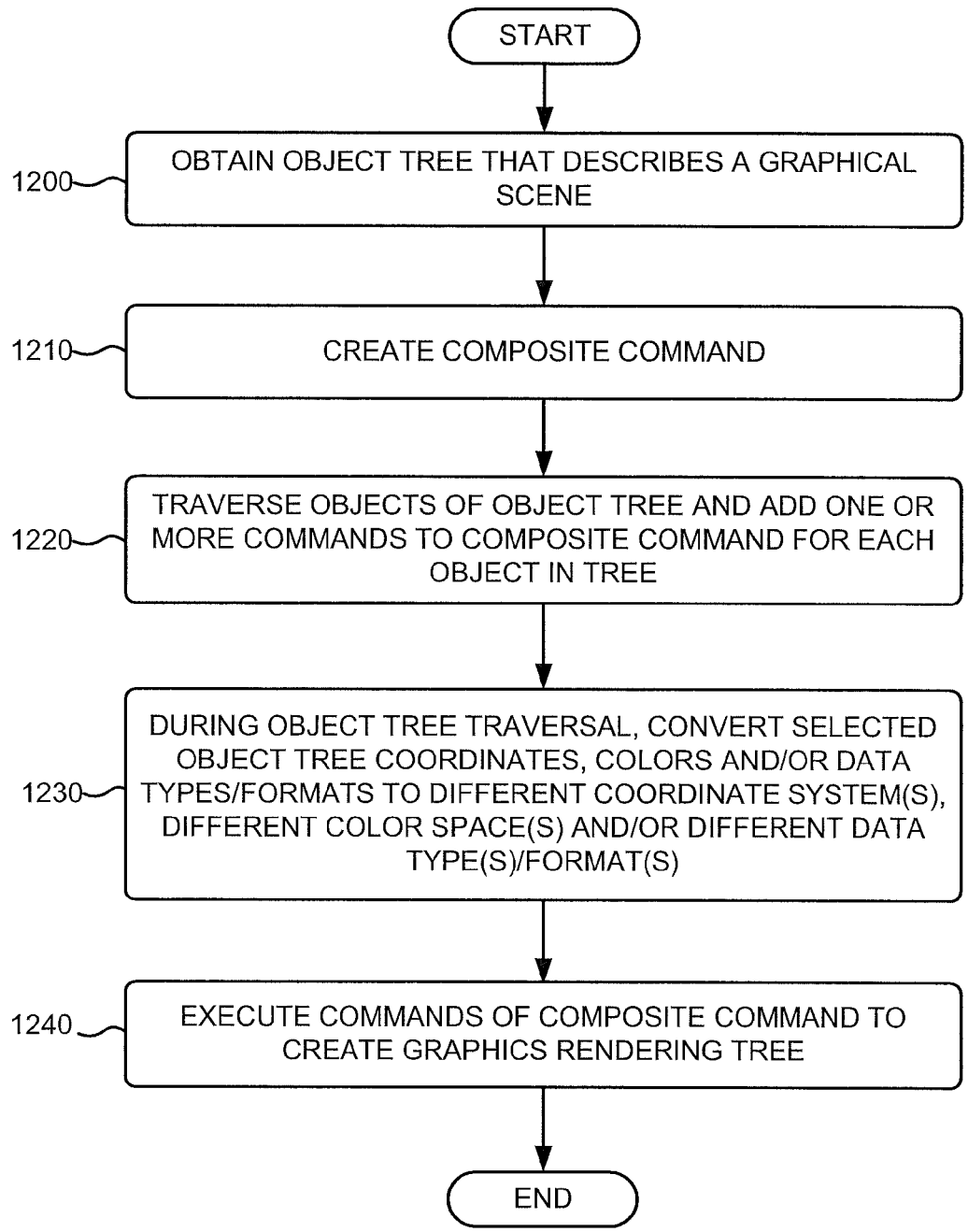
FIG. 12 is a flowchart of an exemplary process for creating a graphics rendering tree based on a corresponding object tree.
Figure 14:
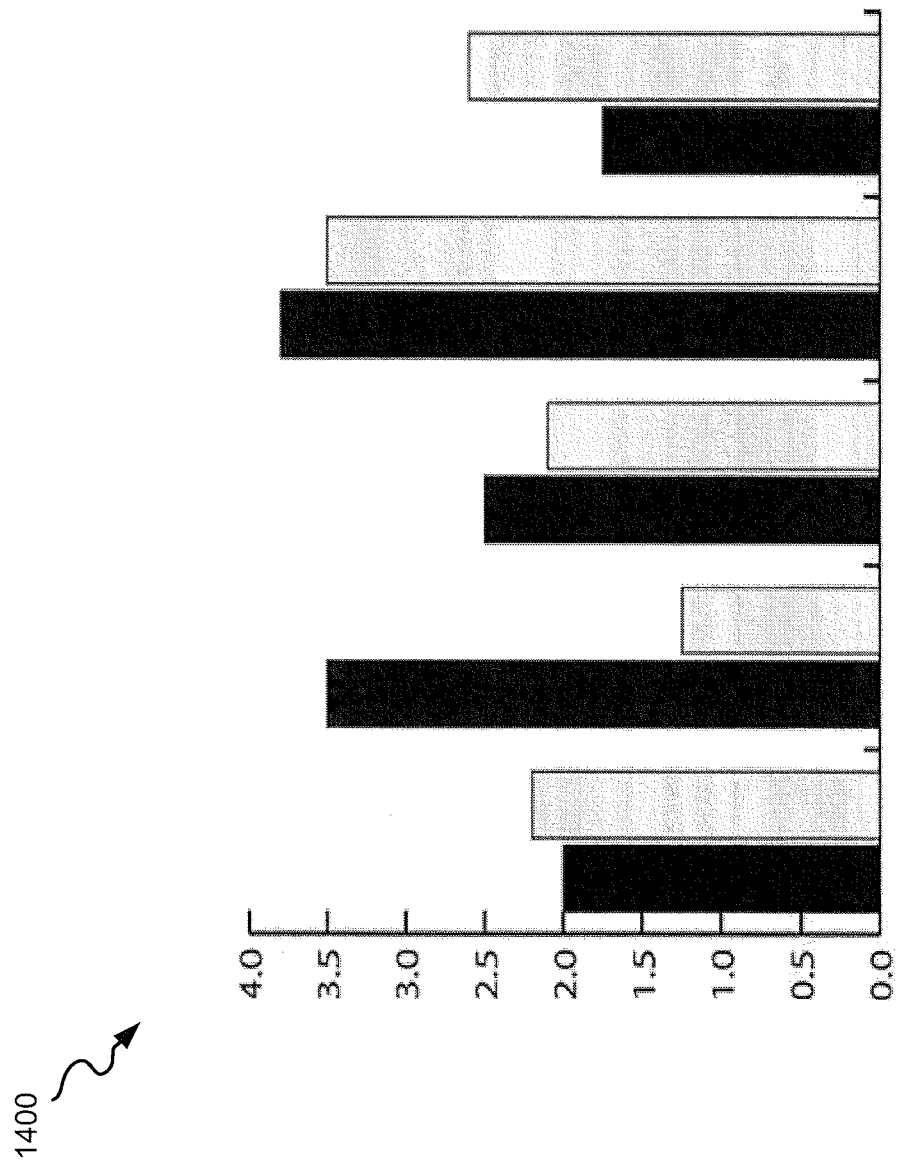
FIG. 14 is a diagram of a graphical plot that corresponds to the graphical scene described by the object tree of FIG. 13.

FIG. 12 is a flowchart of exemplary details for creating a graphics rendering tree based on a corresponding object tree. The exemplary process of FIG. 12 provides further details of the graphics rendering tree creation blocks (blocks 620 and 630) of FIG. 6. The process exemplified by FIG. 12 may be performed by either processor 125 of client 310 or processor 125 of server 320. An example bar chart 1400, shown in FIG. 14, is depicted as an example of graphics that may be rendered by the GPU based on a graphics rendering tree created by the exemplary process of FIG. 12.

Figure 13:
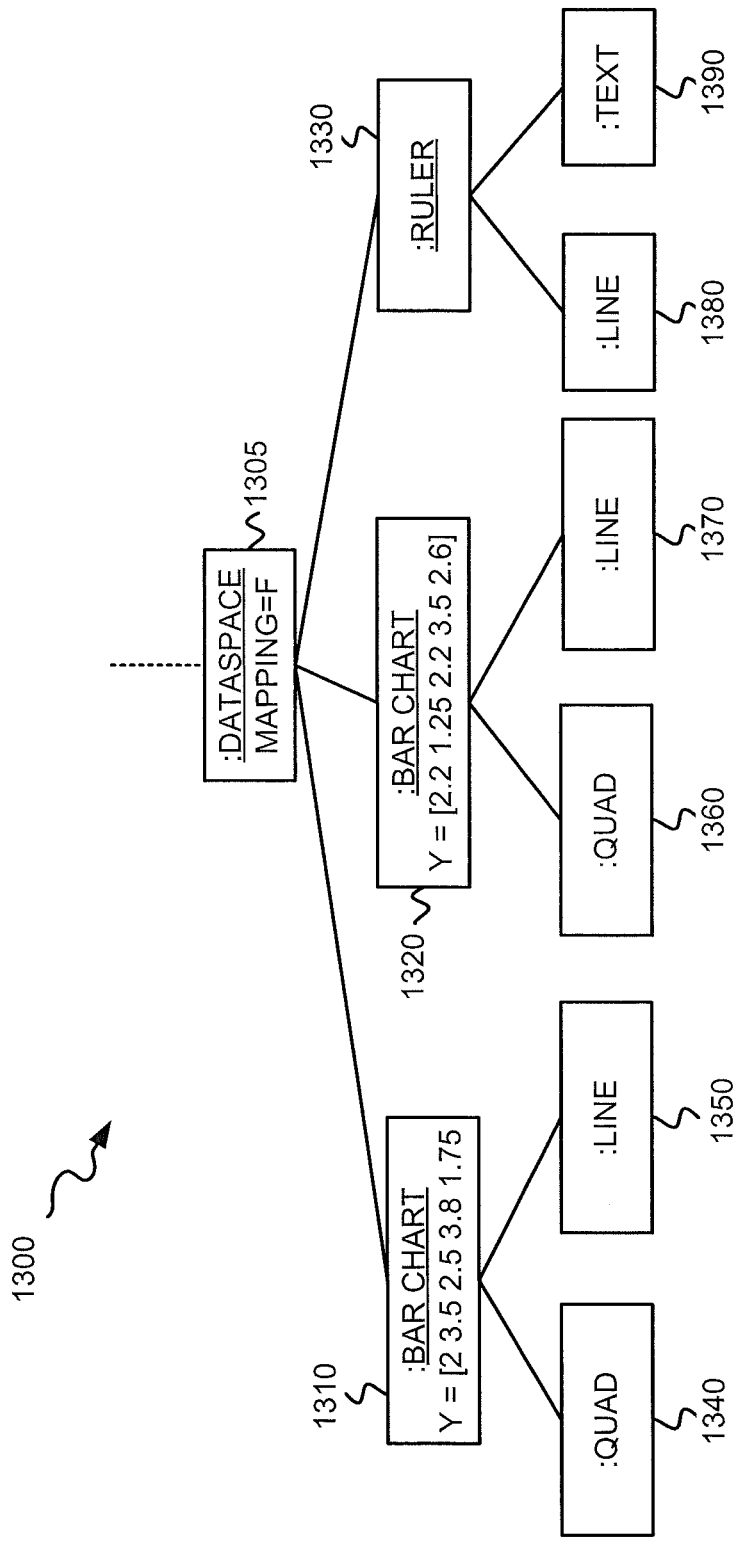
FIG. 13 is a diagram of an object tree according to one exemplary implementation.

The exemplary process may begin with obtaining an object tree that describes a graphical scene (block 1200). The object tree created in block 610 of FIG. 6 may, for example, be obtained. FIG. 13 depicts one example of an object tree 1300 that may be obtained. Object tree 1300 may include multiple objects, including a dataspace object 1305, a bar chart object 1310, a bar chart object 1320, a ruler object 1330, a quadrilateral object 1340, a line object 1350, a quadrilateral object 1360, a line object 1370, a line object 1380, and a text object 1390. The objects of object tree 1300 describe a graphical scene 1400, shown in FIG. 14, which includes a plot of two bar charts. The graphics rendering tree created by the exemplary process of FIG. 12 may be used by the GPU to render, for example, graphical scene 1400.

Figure 15:
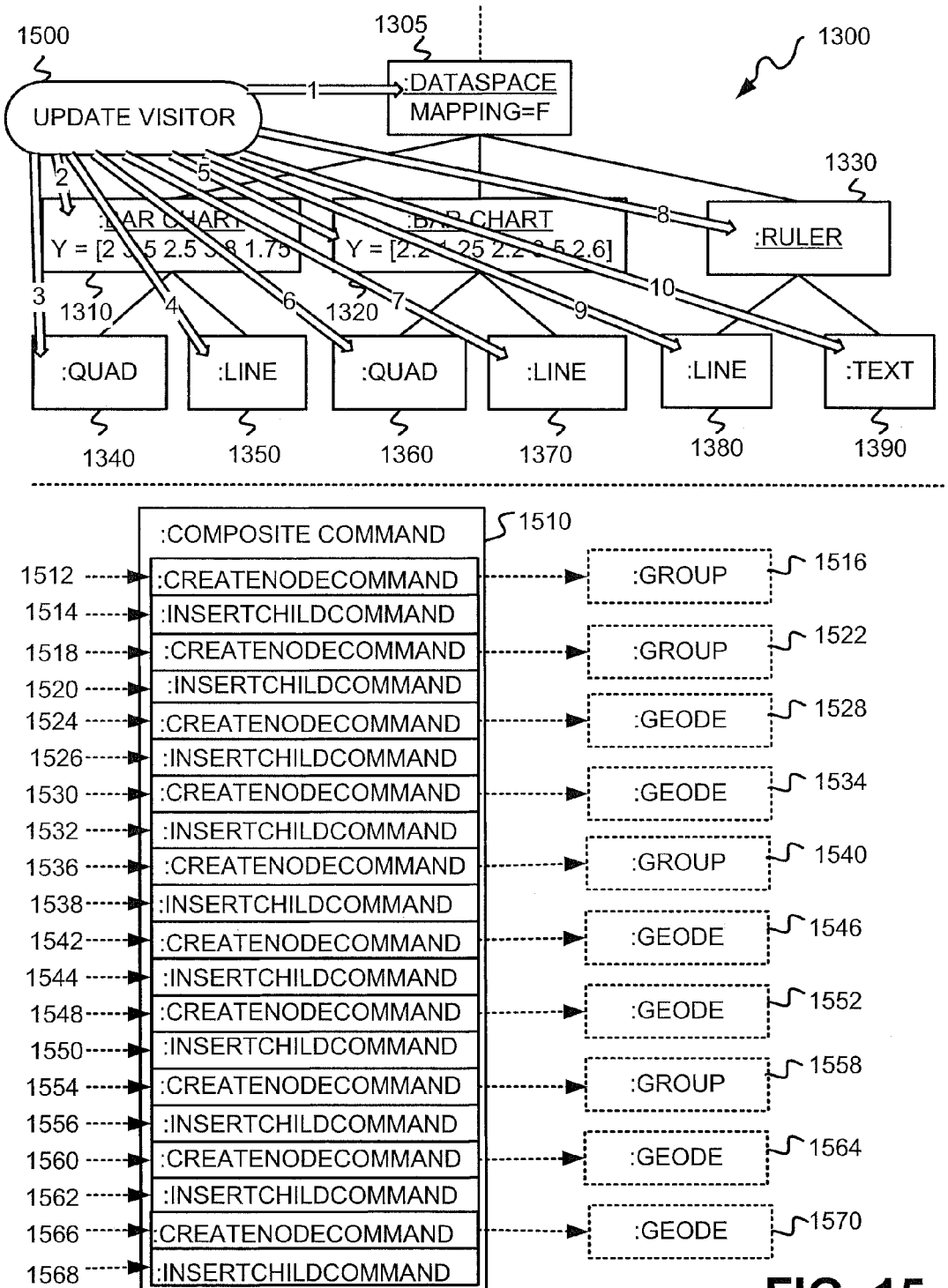
FIG. 15 graphically depicts an example of block 1220 of FIG. 12.

A composite command may be created (block 1210). As shown in FIG. 15, an update visitor 1500 may be created that further creates a composite command 1510 into which multiple commands may be inserted for creating the eventual graphics rendering tree. Update visitor 1500 may include a software entity that may traverse the object tree to add one or more commands to composite command 1510. The grouping of commands in composite command 1510 ensures that the graphics rendering tree has been completely created, and is not in an intermediate state of creation, in the case where processor 125 of client 310 or server 320 may be responding to events external to the creation of the graphics rendering tree.

During creation of the graphics rendering tree, processor 125 may respond to events from other sources (e.g., requests to repaint the window from the operating system) and these could potentially be executed between any two commands. In between some of these commands, the graphics rendering tree is in an intermediate state, and the window should not be re-painted while the tree is in such a state. Grouping all of the commands for creating the graphics rendering tree into a single composite command ensures that requests from other sources are executed only at times in which the graphics rendering tree is in a valid state. Therefore, a composite command may include all of the commands that are needed to create the graphics rendering tree. In other implementations, multiple composite commands may be used in place of the single composite command. For example, one composite command may be used for creating a first set of objects in the graphics rendering tree and another composite command may be used for creating a second set of objects in the graphics rendering tree.

The objects of the object tree may be traversed and one or more commands may be added to the composite command for each object in the object tree (block 1220). As illustrated in FIG. 15, update visitor 1500 may visit each of objects 1305 through 1390 of object tree 1300 and insert one or more appropriate commands into composite command 1510 that can be used to create the graphics rendering tree. The specific command or commands, and the content of the specific command or commands, for a given object of the object tree may be selected based on library N 530-N. As shown in FIG. 15, update visitor 1500 may visit object 1305 of object tree 1300 (visit "1" shown in FIG. 15). Based on object 1305 and library N 530-N, update visitor 1500 may insert a "create node command" 1512 and an "insert child command" 1514 into composite command 1510. The commands 1520 and 1530 may subsequently be used to create object 1516 in the graphics rendering tree. FIG. 15 further illustrates update visitor 1500 visiting object 1310 of object tree 1300 (visit "2" shown in FIG. 15). Based on object 1310, update visitor 1500 may insert another "create node command" 1518 into composite command 1510. Update visitor 1500 may additionally insert an "insert child command" 1520 into composite command 1510. The commands 1518 and 1520 may be subsequently used to create object 1522 in the graphics rendering tree.

FIG. 15 additionally illustrates update visitor 1500 visiting object 1340 of object tree 1300 (visit "3" shown in FIG. 15). Based on object 1340, update visitor 1500 may insert another "create node command" 1524 and "insert child command" 1526 into composite command 1510. The commands 1524 and 1526 may be subsequently used to create object 1528 in the graphics rendering tree. FIG. 15 also illustrates update visitor 1500 visiting object 1350 of object tree 1300 (visit "4" shown in FIG. 15). Based on object 1350, update visitor 1500 may insert another "create node command" 1530 and "insert child command" 1532 into composite command 1510. The commands 1530 and 1532 may be subsequently used to create object 1534 in the graphics rendering tree. As further shown in FIG. 15, update visitor 1500 may visit object 1320 of object tree 1300 (visit "5" shown in FIG. 15). Based on object 1320, update visitor 1500 may insert a "create node command" 1536 and "insert child command" 1538 into composite command 1510. The commands 1536 and 1538 may be subsequently used to create object 1540 in the graphics rendering tree.

FIG. 15 additionally illustrates update visitor 1500 visiting object 1360 of object tree 1300 (visit "6" shown in FIG. 15). Based on object 1360, update visitor 1500 may insert another "create node command" 1542 and "insert child command" 1544 into composite command 1510. The commands 1542 and 1544 may subsequently be used to create object 1546 in the graphics rendering tree. FIG. 15 also illustrates update visitor 1500 visiting object 1370 of object tree 1300. Based on object 1370, update visitor 1500 may insert another "create node command" 1548 and "insert child command" 1550 into composite command 1510. The commands 1548 and 1550 may be subsequently used to create object 1552 in the graphics rendering tree.

FIG. 15 further illustrates update visitor 1500 visiting object 1330 of object tree 1300 (visit "8" shown in FIG. 15). Based on object 1330, update visitor 1500 may insert another "create node command" 1554 and "insert child command" 1556 into composite command 1510. The commands 1554 and 1556 may be subsequently used to create object 1558 in the graphics rendering tree. FIG. 15 additionally illustrates update visitor 1500 visiting object 1380 of object tree 1300 (visit "9" shown in FIG. 15). Based on object 1380, update visitor 1500 may insert another "create node command" 1560 and "insert child command" 1562 into composite command 1510. The commands 1560 and 1562 may be subsequently used to create object 1564 in the graphics rendering tree. FIG. 15 also illustrates update visitor 1500 visiting object 1390 of object tree 1300 (visit "10" shown in FIG. 15). Based on object 1390, update visitor 1500 may insert another "create node command" 1566 and "insert child command" 1568 into composite command 1510. The commands 1566 and 1568 may be subsequently used to create object 1570 in the graphics rendering tree.

During object tree traversal, selected object tree coordinates, colors and/or data types/formats may be converted to a different coordinate system(s), a different color space(s) and/or to different data type(s)/format(s) (block 1230). Exemplary coordinate, color and/or data type/format conversion has been described above with respect to FIGS. 9A, 9B, 10 and 11. As an example, an update method of bar chart object 1310 may call a transform method of dataspace object 1305 to generate coordinate values for quad object 1340 and line object 1350. As a further example, an update method of bar chart object 1320 may call a transform method of dataspace object 1305 to generate coordinate values for quad object 1360 and line object 1370. Ruler 1330 may use limit values associated with dataspace object 1305 to choose placements for the "tickmarks" on the ruler and to set coordinates associated with line object 1380 and coordinates and text strings associated with text object 1390. Upon complete object tree traversal, the various constituent commands of the composite command may be executed to create the graphics rendering tree (block 1240).

Figure 16:
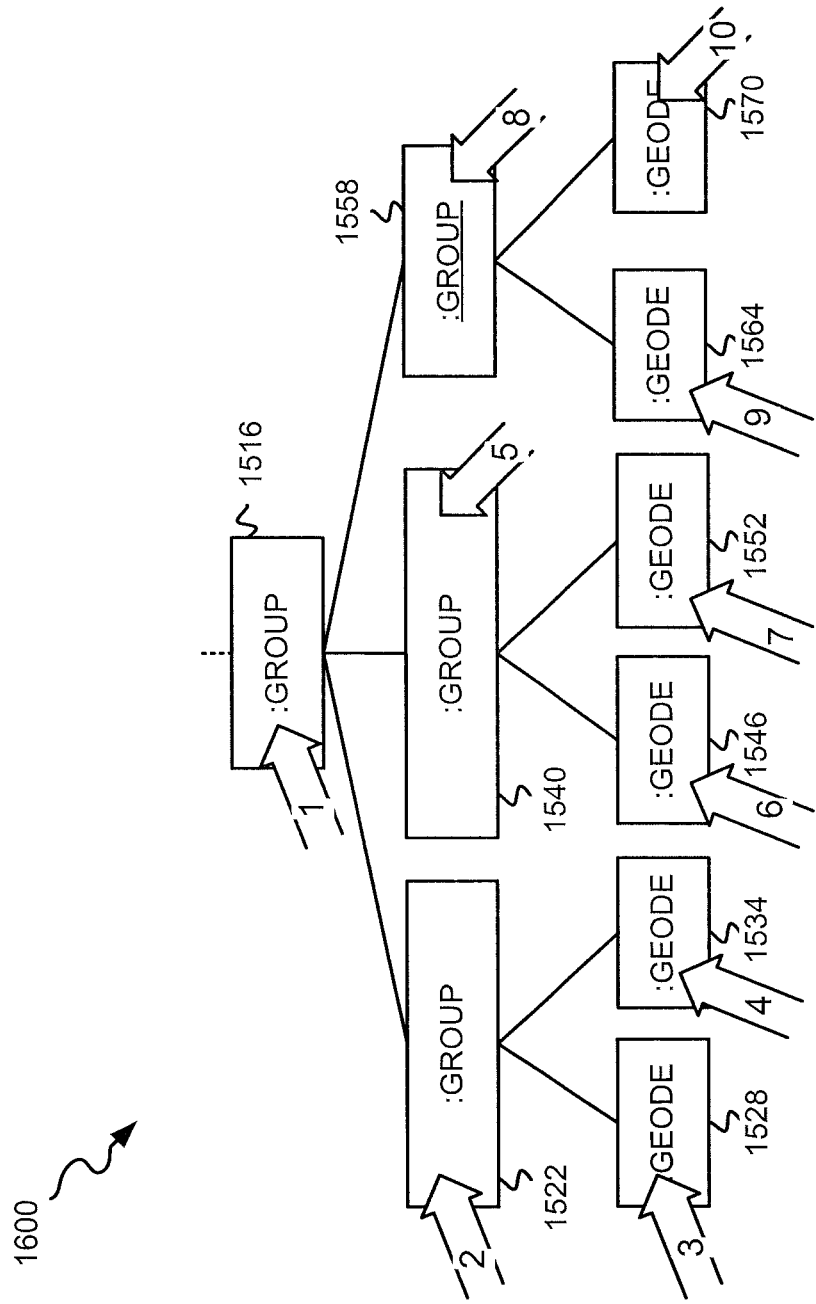
FIG. 16 graphically depicts an example of block 1240 of FIG. 12.

For example, as illustrated in FIG. 16, in conjunction with FIG. 15, each command of composite command 1510 may be executed to create a graphics rendering object tree 1600. In one implementation, the commands of composite command 1510 may be executed sequentially. "Create node command" 1512 and "insert child command" 1514 of FIG. 15 may be executed to create object 1516 in graphics rendering tree 1600 ("1" in FIG. 16). "Create node command" 1518 and "insert child command" 1520 of FIG. 15 may be executed to create object 1522 in graphics rendering tree 1600 ("2" in FIG. 16). "Create node command" 1524 and "insert child command" 1526 of FIG. 15 may be executed to create object 1528 in graphics rendering tree 1600 ("3" in FIG. 16). "Create node command" 1530 and "insert child command" 1532 of FIG. 15 may be executed to create object 1534 in graphics rendering tree 1600 ("4" in FIG. 16). "Create node command" 1536 and "insert child command" 1538 of FIG. 15 may be executed to create object 1540 in graphics rendering tree 1600 ("5" in FIG. 16). "Create node command" 1542 and "insert child command" 1544 of FIG. 15 may be executed to create object 1546 in graphics rendering tree 1600 ("6" in FIG. 16). "Create node command" 1548 and "insert child command" 1550 of FIG. 15 may be executed to create object 1552 in graphics rendering object tree 1600 ("7" in FIG. 16). "Create node command" 1554 and "insert child command" 1556 of FIG. 15 may be executed to create object 1558 in graphics rendering object tree 1600 ("8" in FIG. 16). "Create node command" 1560 and "insert child command" 1562 of FIG. 15 may be executed to create object 1564 in graphics rendering object tree 1600 ("9" in FIG. 16). "Create node command" 1566 and "insert child command" 1568 of FIG. 15 may be executed to create object 1570 in graphics rendering object tree 1600 ("10" in FIG. 16). FIG. 16, thus, illustrates the final graphics rendering tree 1600 created by composite command 1510 based on object tree 1300.

Exemplary Object Tree/Graphics Rendering Tree Update Process

Figure 17:
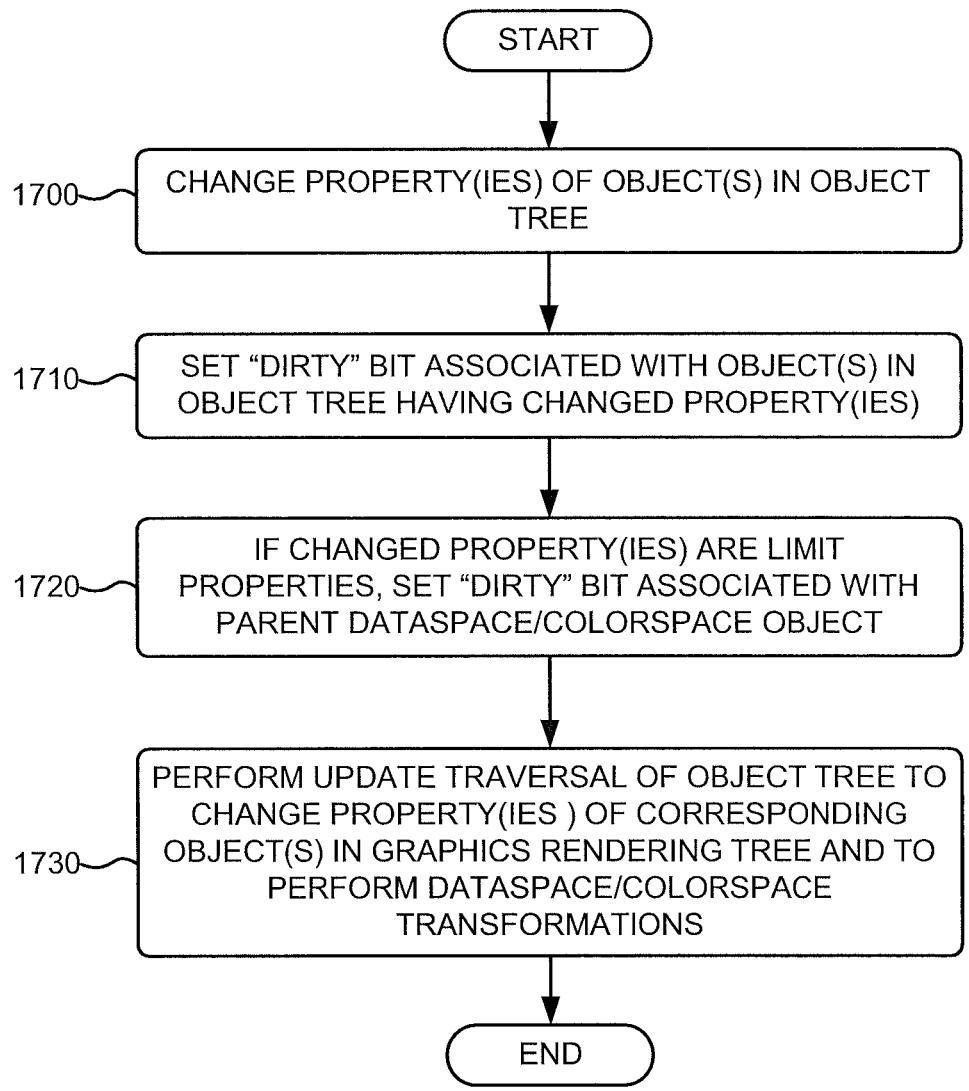
FIG. 17 is a flowchart of an exemplary process for updating the object tree and graphics rendering tree according to a first exemplary embodiment.

FIG. 17 is a flowchart of an exemplary process for updating a graphics rendering tree after changes or updates have been made to the graphics rendering tree's corresponding object tree according to a first exemplary embodiment. The exemplary process of FIG. 17 may be implemented by processor 125 of client 310 or server 320.

The exemplary process may begin when changes are made to one or more properties of one or more objects of the object tree (e.g., the objects of object tree 1300) (block 1700). For example, a user that created a graphics plot for rendering on a display device may change a parameter/property associated with the plot. As examples, the user may change a color associated with an aspect of the graphics plot, may change dimensions of one or more axes of the graphics plot, or may change labels associated with the graphics plot. The user may change any number of properties/parameters associated with the graphical scene to be rendered.

A "dirty" bit, associated with the object(s) in the object tree having one or more changed properties, may be set (block 1710). The "dirty" bit may, for example, be changed from a bit value of zero to a bit value of one (or vice-versa). For each object having one or more properties changed in block 1700, a "dirty" bit (e.g., a bit that indicates whether a change has been made to a respective object) associated with that object may be set.

Figure 18A:
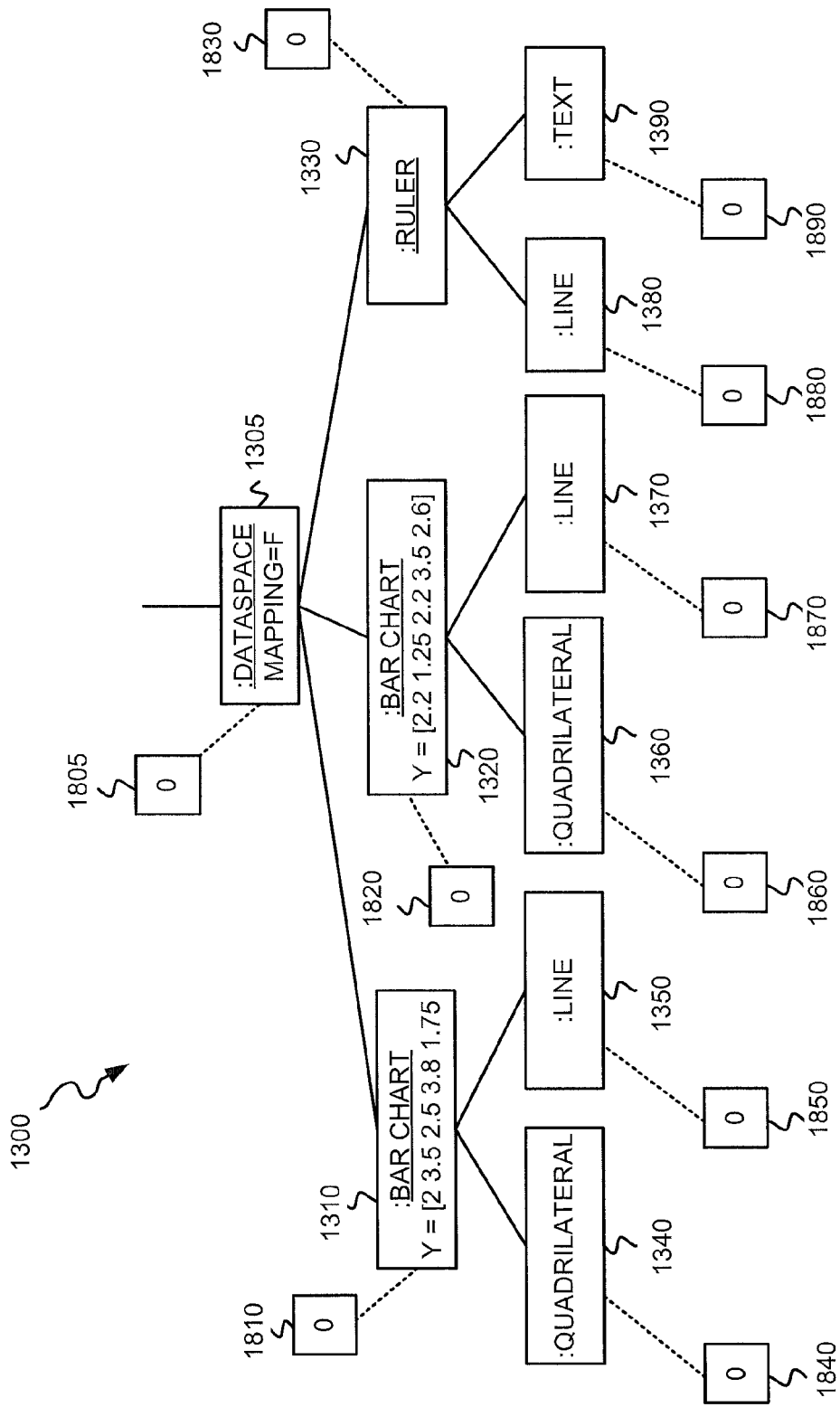
FIGS. 18A and 18B depict the use of "dirty" bits in association with each object of the object tree of FIG. 13.
Figure 18B:
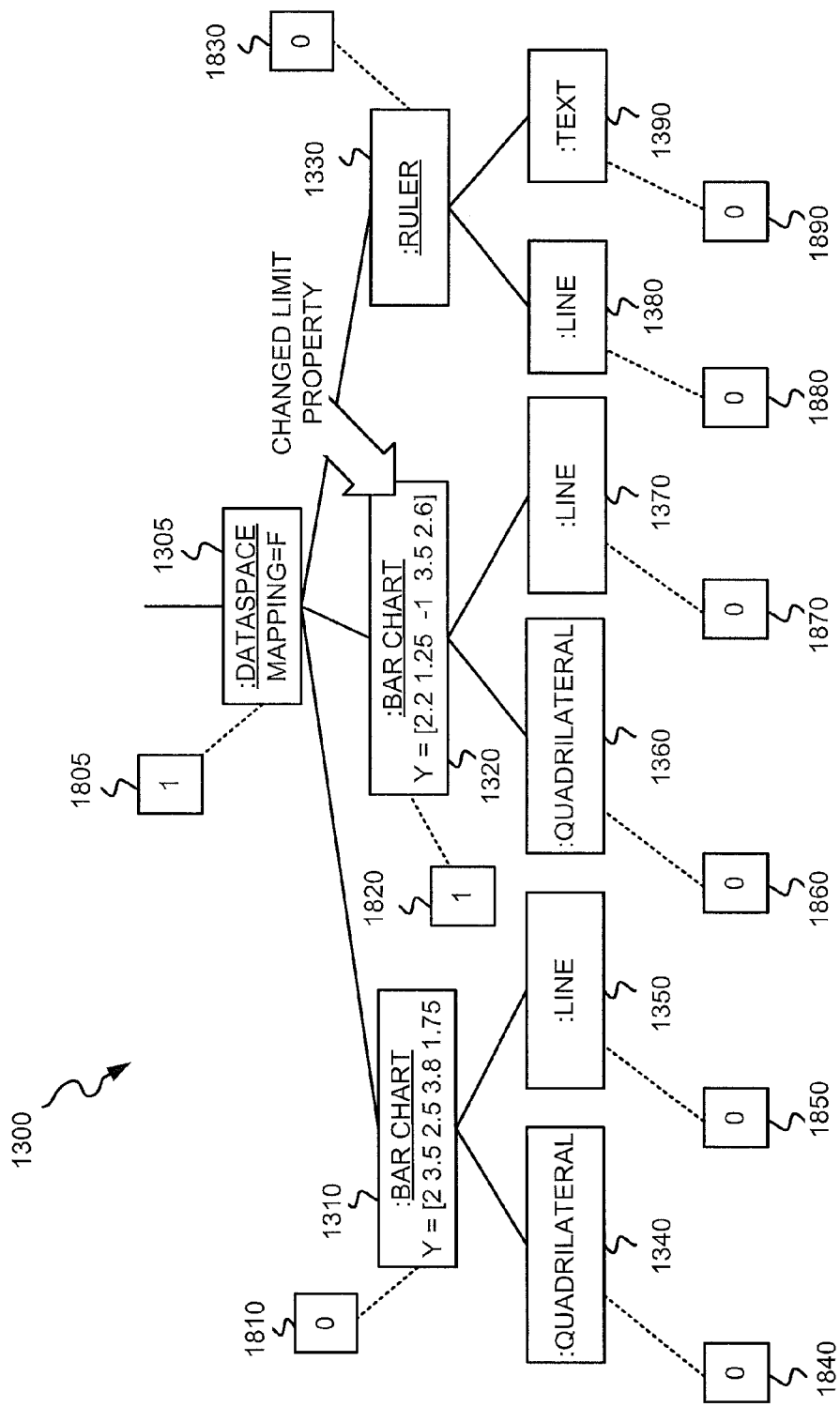

FIG. 18A depicts an exemplary object tree 1300 where each of objects 1305, 1310, 1320, 1330, 1340, 1350, 1360, 1370, 1380 and 1390 has a respective associated "dirty" bit 1805, 1810, 1820, 1830, 1840, 1850, 1860, 1870, 1880 and 1890. As shown in FIG. 18A, no changes have been made to object tree 1300, therefore, each of "dirty" bits 1805, 1810, 1820, 1830, 1840, 1850, 1860, 1870, 1880 and 1890 has been reset (e.g., zero). As further shown in FIG. 18B, a property associated with object 1320 may be changed. Due to the change in a property of object 1320, "dirty" bit 1820, associated with object 1320 may be set (e.g., changed from "0" to "1"). If the changed property(ies) is a limit property(ies), a "dirty" bit associated with a parent dataspace or colorspace object may be set (e.g., changed from "0" to "1") (block 1720). For example, as shown in FIG. 18B, the change in a limit property of object 1320 causes "dirty" bit 1805, associated with dataspace object 1305, to be set. A "limit property" may include a property of an object that may change the outer limits or extents of a plot, thus, possibly necessitating changes in other objects of the object tree to permit the new plot to be rendered. The "limit property" may also include a color property of an object.

An update traversal of the object tree may be performed to change one or more properties of corresponding objects in the graphics rendering tree (block 1730). The update traversal may include visiting each of the objects of the object tree, determining whether its associated "dirty" bit has been set and adding one or more commands to a composite command. For example, a command such as a "create node" command, which may create an object in the graphics rendering tree, or an "insert child" command, which may associate an object as a child of another object, may be added to the composite command. Executing the composite command may propagate changes in the object tree across to corresponding objects in the graphics rendering tree. By using "dirty" bits to indicate that updates or changes have been made, only commands corresponding to modified objects may be included in the composite command. Use of "dirty" bits, as described herein, thus, may allow the update traversal to be performed only for those objects whose "dirty" bit has been set. "Dirty" bits, as described herein, therefore, permit an efficient propagation of changes in the object tree to the graphics rendering tree. The exemplary process of FIG. 19 below describes further details of the update traversal of block 1730.

Exemplary Update Traversal Process

Figure 19:
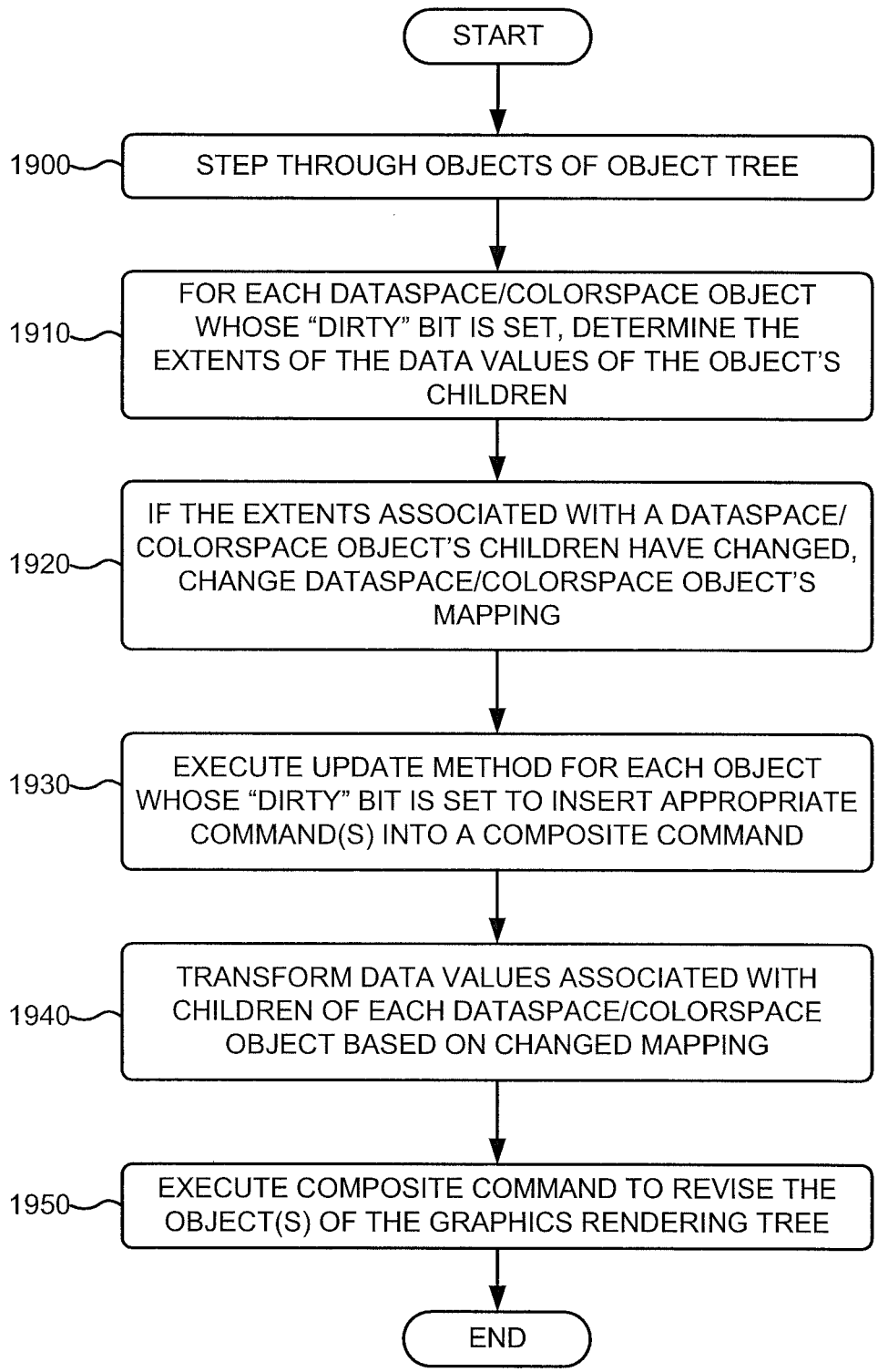
FIG. 19 is a flowchart of an exemplary process for performing an update traversal of an object tree to revise the corresponding graphics rendering tree according to a first exemplary embodiment.

FIG. 19 is a flowchart of an exemplary process of performing the update traversal of an object tree to revise the corresponding graphics rendering tree according to a first exemplary embodiment. The exemplary process of FIG. 19 describes details of block 1730 of FIG. 17. The exemplary process of FIG. 19 may be implemented by processor 125 of client 310 or server 320.

The exemplary process may begin with stepping through each object of the object tree (block 1900). For example, referring to the example object tree 1300 of FIG. 18A, object tree 1300 may be stepped through to visit each object 1305, 1310, 1320, 1330, 1340, 1350, 1360, 1370, 1380 and 1390 of the tree to examine the "dirty" bit associated with each object. Object tree 1300 may, for example, be traversed by starting at the top object in the tree and stepping downwards through each branch in the tree in order. For example, update traversal of object tree 1300 may include stepping through the objects of the tree in the following order: object 1305, object 1310, object 1340, object 1350, object 1320, object 1360, object 1370, object 1330, object 1380 and object 1390. For each dataspace object/colorspace object of the object tree whose "dirty" bit has been set, the extents of the data values of the object's children may be determined (block 1910). The extents of the data values of the object's children may include those data values that determine the size and scale of the rendering of the graphical scene described by the object tree. For example, a change in a Y value of a plot in x, y and z coordinate space may affect the size and scale of the y axis, thus, causing a change in the three dimensional graphical plot. Returning to FIG. 18B, this figures depicts a representative example where the Y values of the bar chart of object 1320 have been changed from Y=[2.2 1.25 2.2 3.5 2.6] to Y=[2.2 1.25 −1 3.5 2.6].

Figure 20A:
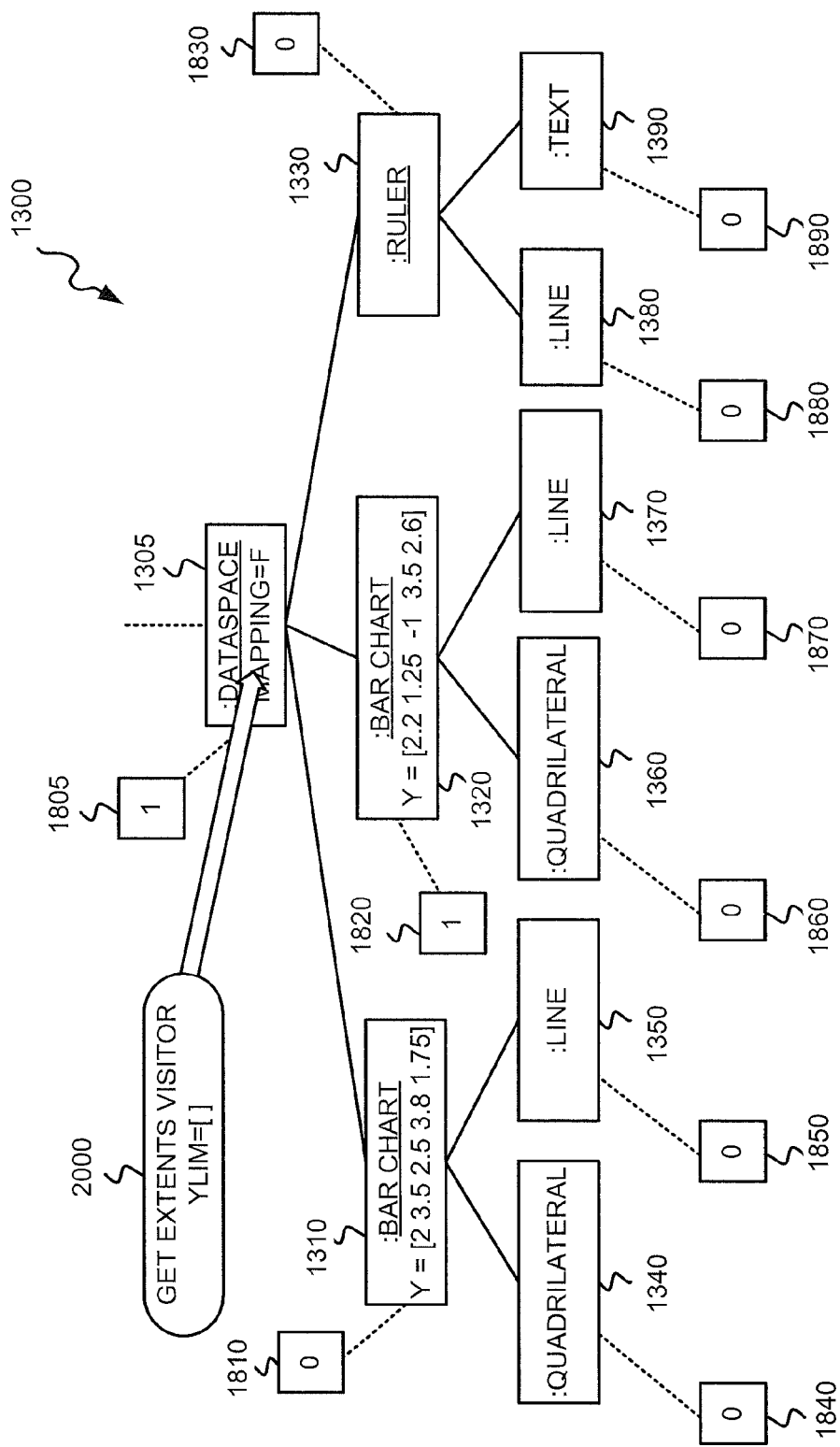
FIGS. 20A-20E depict the determination of data value extents, corresponding to block 1910 of FIG. 19, according to one exemplary implementation.

FIGS. 20A through 20E illustrate an example of the determination of the extents of data values associated with the child objects of dataspace object 1305. For example, FIG. 20A illustrates the creation of a "get extents" visitor 2000 that may subsequently visit child objects 1310, 1320 and 1330 of dataspace object 1305. "Get extents" visitor 2000 may include a software entity that may traverse the children of dataspace object 1305 to determine the extents of the data values of those children. As shown in FIG. 20A, "get extents" visitor 2000 may first visit dataspace object 1305 before traversing to child objects 1310, 1320 and 1330.

Figure 20B:
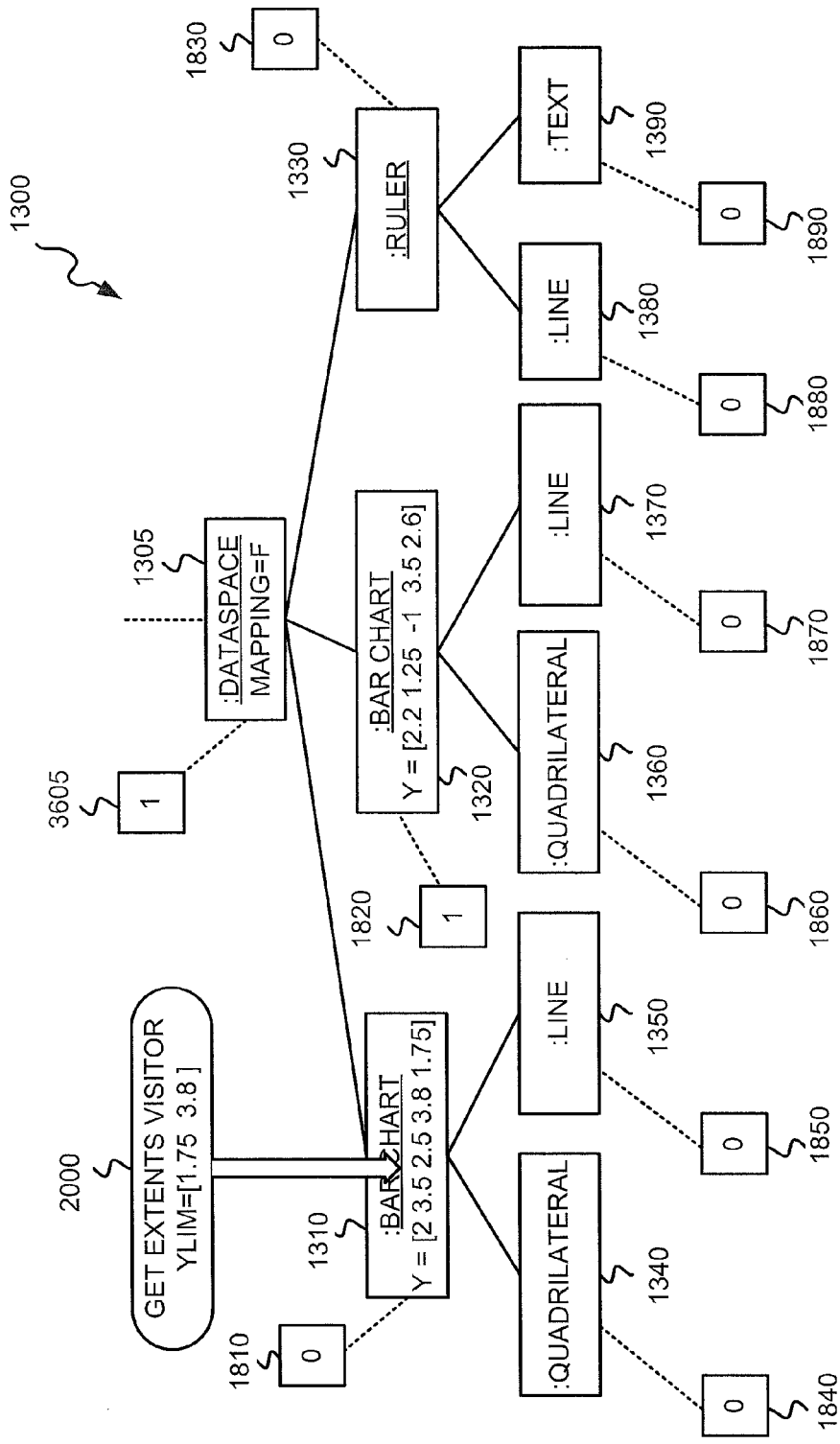
Figure 20C:
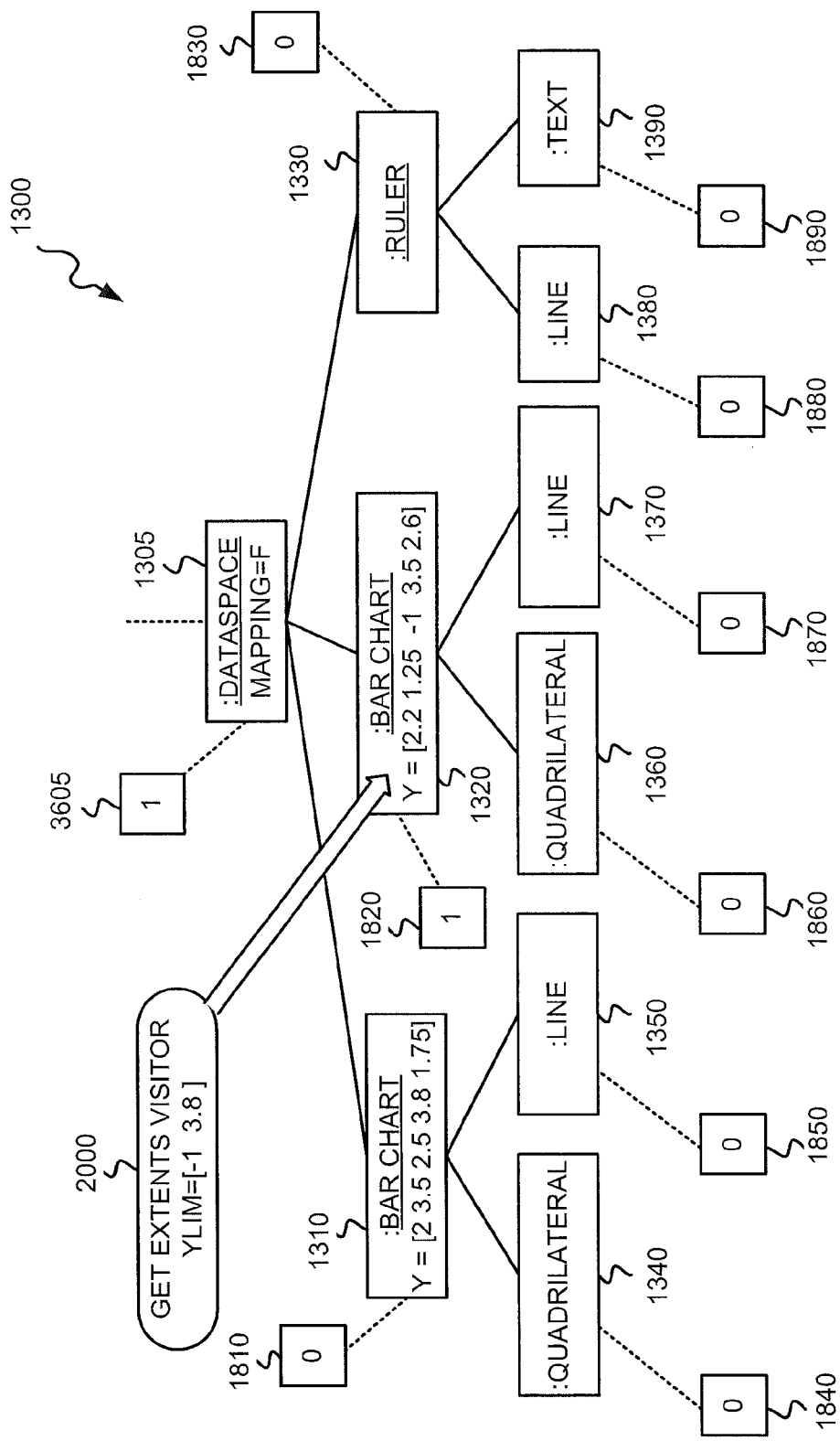
Figure 20D:
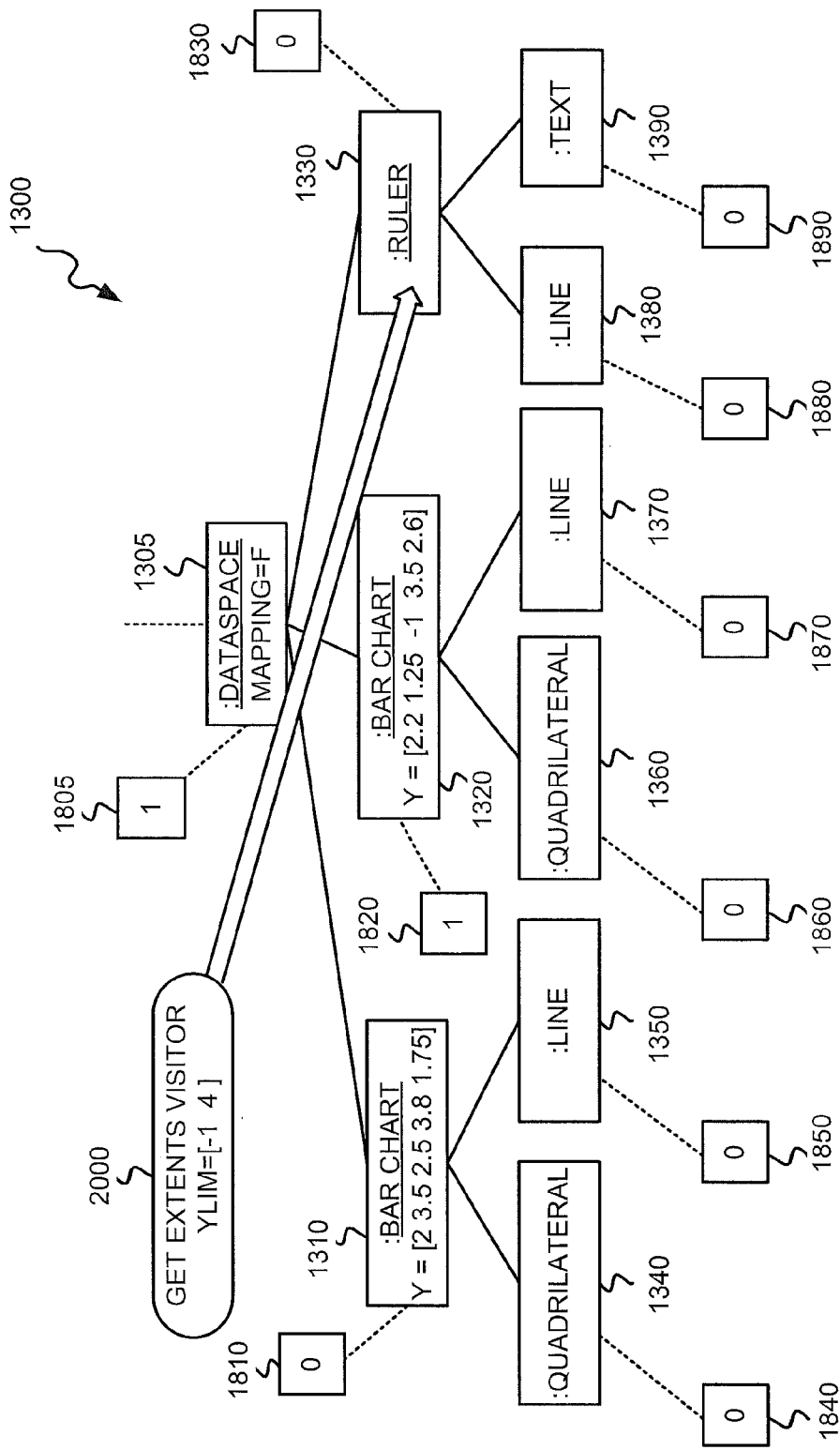

As further shown in FIG. 20B, "get extents" visitor 2000 may visit object 1310 to determine that the limits on the extents of the Y values of object 1310 are 1.75 to 3.8 (i.e., the range of Y values run from 1.75 to 3.8). As additionally shown in FIG. 20C, "get extents" visitor 2000 may visit object 1320 to determine the limits on the extents of the Y values of object 1320 are −1 to 3.5. Since the upper extent of the Y values for object 1310 was 3.8, "get extents" visitor 2000 retains that upper extent, but changes the lower extent to −1. The Y extents after visiting objects 1310 and 1320, thus, are Ylim= [−1 3.8]. As further depicted in FIG. 20D, "get extents" visitor 2000 may visit object 1330. The "ruler" object 1330 may change the upper limit of the Y values to 4.0 from 3.8. Ruler object 1330 may analyze the determined limits for the Y values and may change the limits to improve the view of the eventually rendered graphics (e.g., in this example, change the upper limit of the Y values from 3.8 to 4.0). For the sake of simplification, FIGS. 20A through 20D depict "get extents" visitor 2000 visiting objects 1310, 1320 and 1330 to determine the limits on only the extents of the Y values. However, "get extents" visitor 2000 may, similarly, determine the limits on the extents of the X and Z values (or other dimensions or properties) of the various objects of object tree 1300.

Figure 20E:
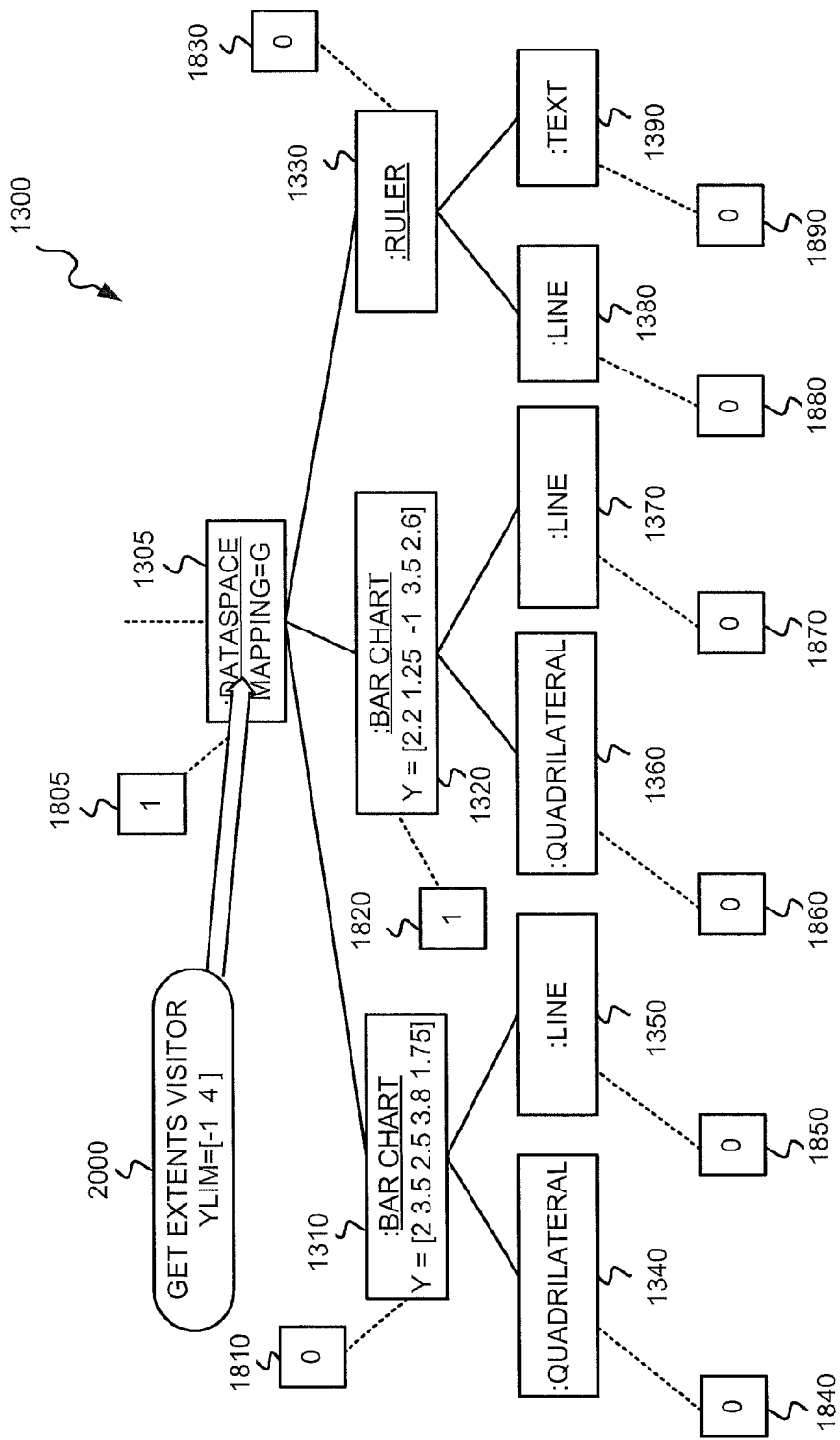

If the extents associated with a dataspace or colorspace object's children have changed, then the dataspace or colorspace object's mapping may be changed (block 1920). The mapping may be changed to reflect the different size and scale of the graphical scene that may be rendered based on, for example, object tree 1300. FIG. 20E depicts "get extents" visitor 2000 visiting dataspace object 1305 to change the object's mapping (e.g., from mapping=F to mapping=G).

An update method may be executed for each object of the object tree whose "dirty" bit has been set to insert appropriate commands into a composite command (block 1930). As each object of the object tree is traversed, one or more appropriate commands may be inserted into the composite command for revising that object's counterpart object in the graphics rendering tree. Execution of an update method for a given object of object tree (e.g., object tree 100 or object tree 1300) whose "dirty" bit has been set may also set the properties of child objects that are below that given object in the object tree, thus, causing the "dirty" bits associated with those child objects to be set.

Data values associated with children of the dataspace/colorspace object may be transformed based on the dataspace/colorspace object's changed mapping (block 1940). This transformation may include converting coordinates, colors and/or data types/formats to a different coordinate system(s), a different color space(s) and/or different data type(s)/format(s) for association with the graphics rendering tree, as already described above.

Figure 26:
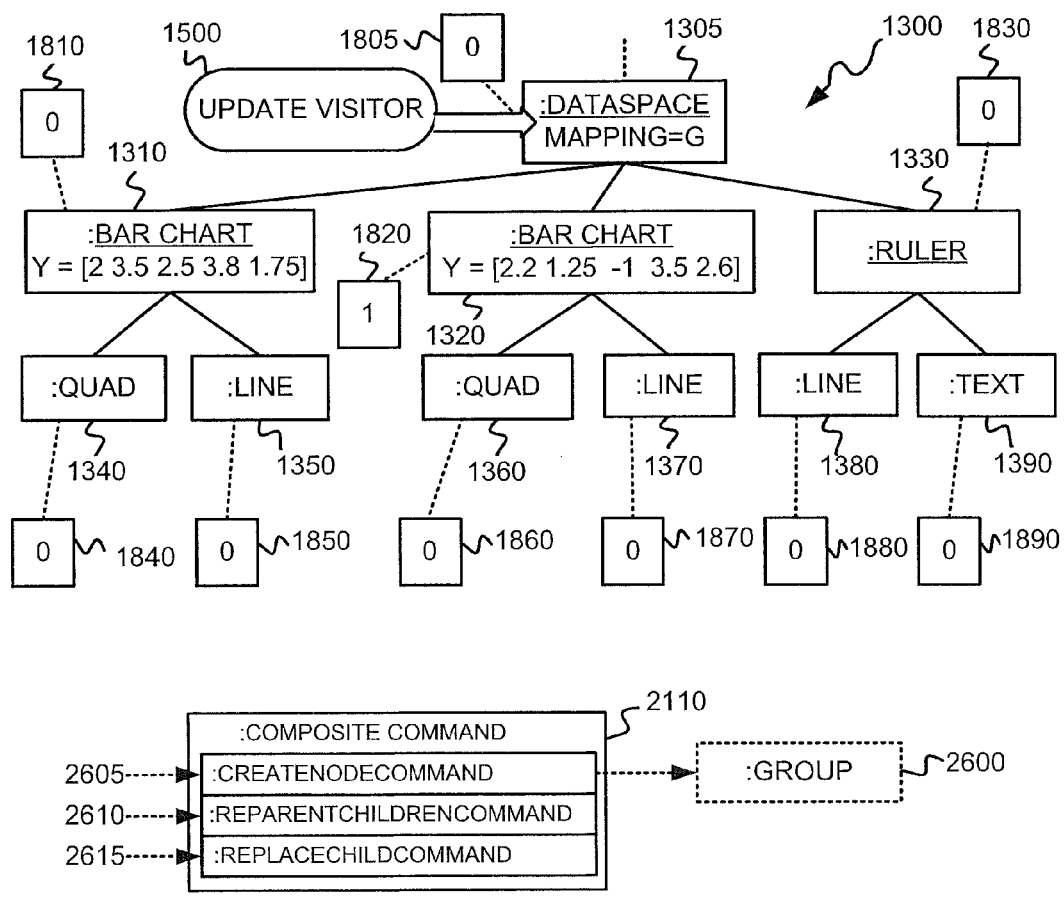
Figure 27:
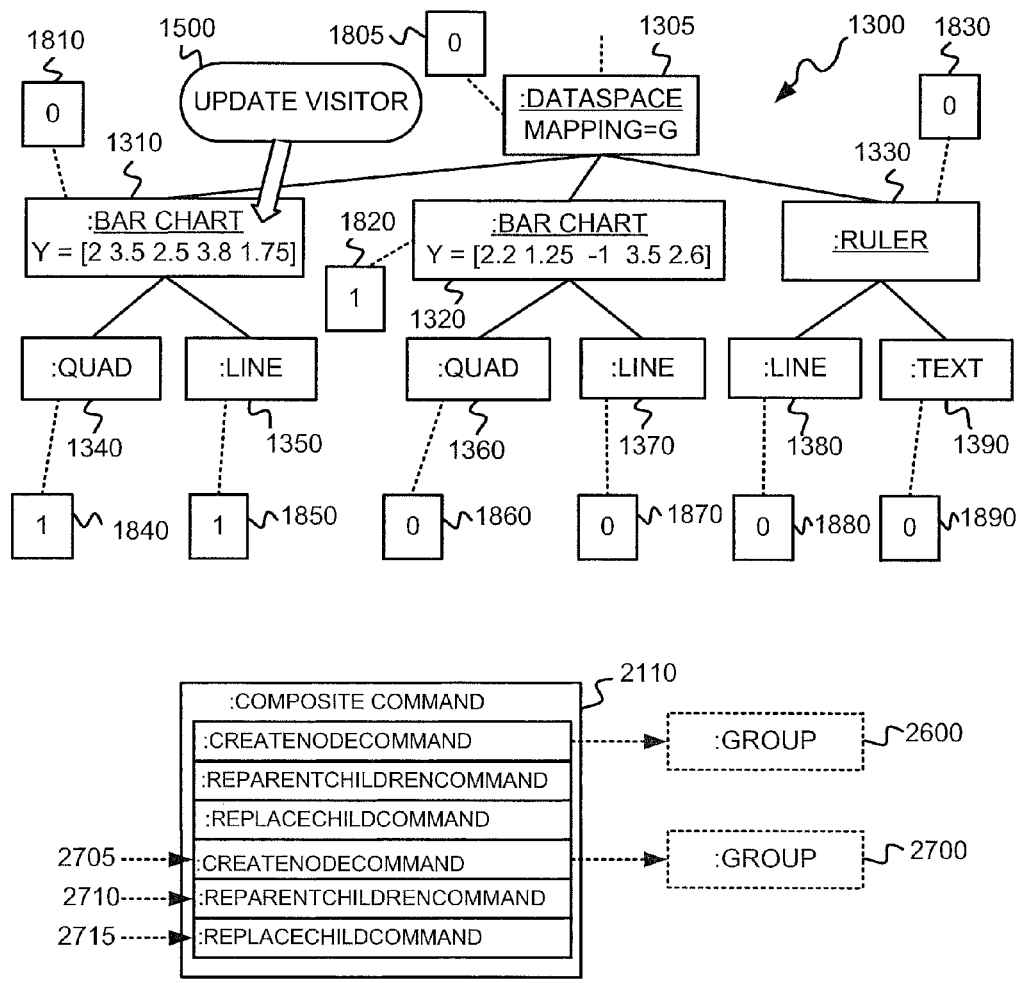

The implementation of blocks 1930 and 1940 may occur differently in different embodiments based on whether the dataspace/colorspace object's (e.g., dataspace object 1305 in FIG. 13) mapping can be represented as a linear or non-linear combination of its inputs. In the linear case, the dataspace/colorspace's mapping can be implemented using a transformation matrix in the graphics rendering tree. In this implementation, the transformation can be implemented in GPU 130 and the coordinate and/or color values do not have to be changed whenever the dataspace/colorspace's mapping changes. In the non-linear case (e.g., logarithmic plots or polar coordinates), the dataspace/colorspace object's transform method may convert the coordinate and/or color values when the dataspace/colorspace object's mapping changes. FIGS. 21-25 below depict an example of the linear case and FIGS. 26 and 27 depict the non-linear case.

Figure 21:
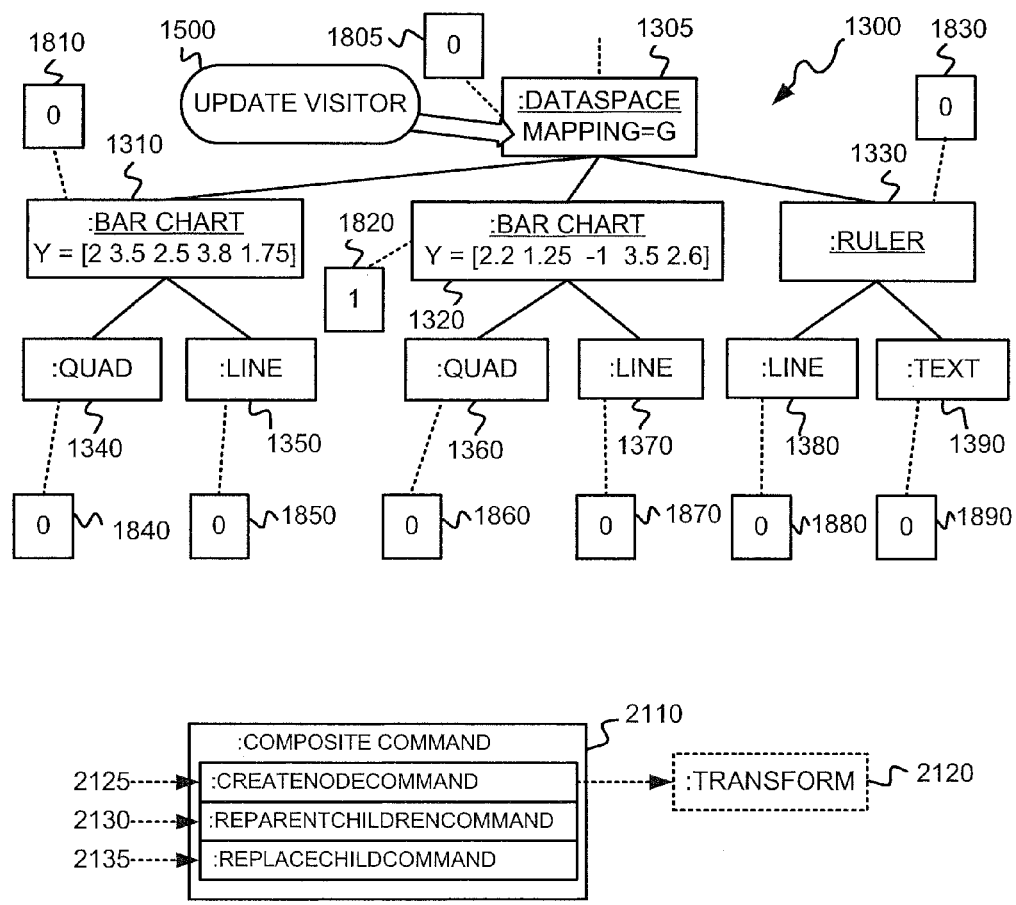
Figure 22:
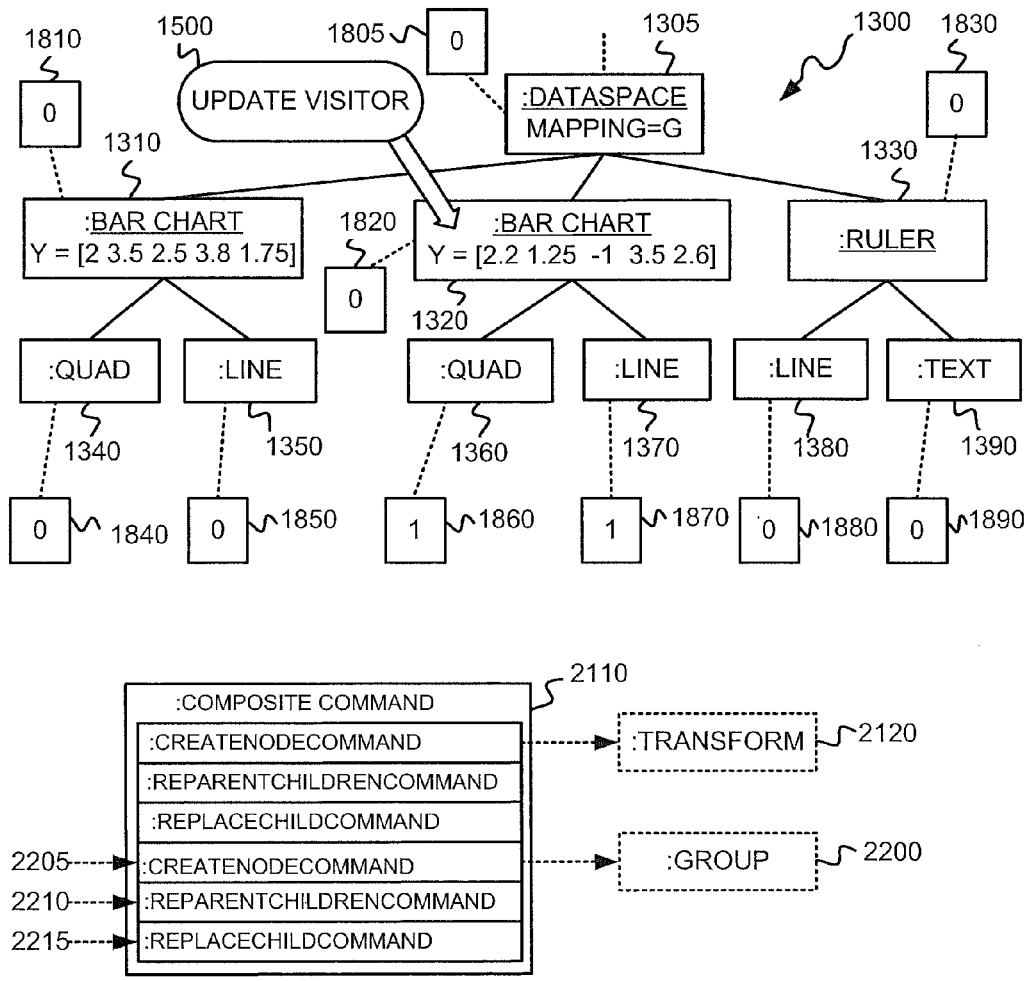
Figure 23:
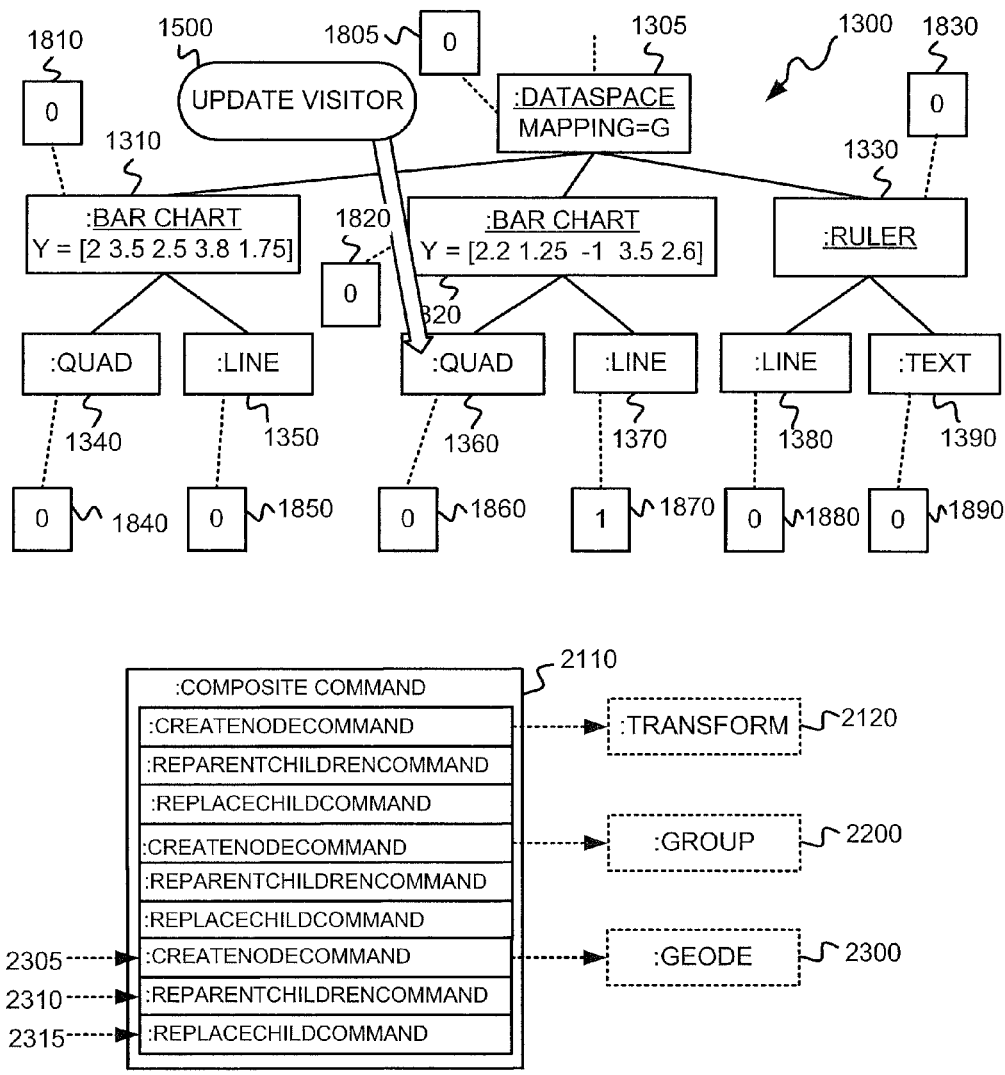
Figure 25:
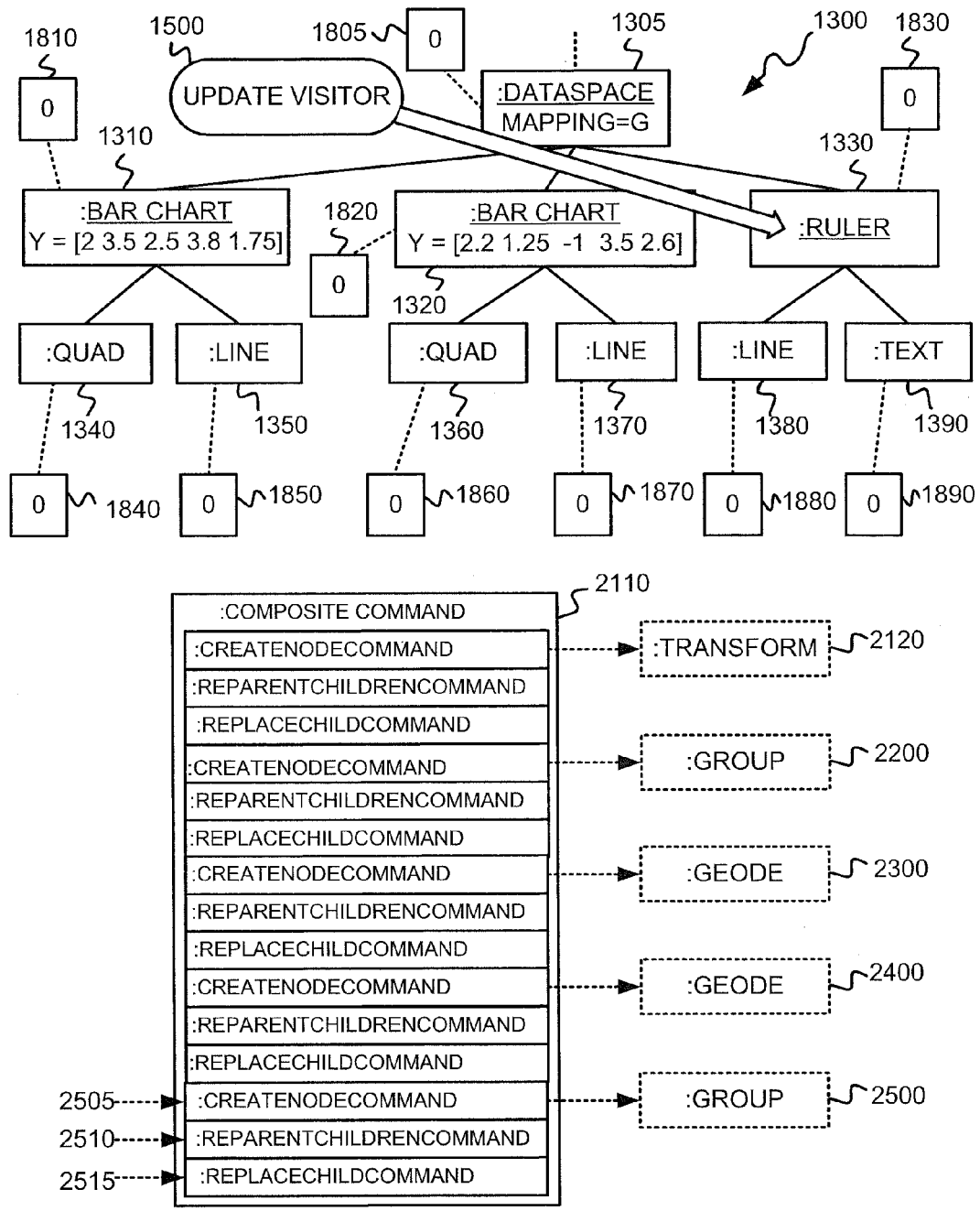

In the linear case depicted starting with FIG. 21, update visitor 1500 may visit dataspace object 1305 and an executed update method associated with object 1305 may insert commands 2125, 2130 and 2135 into a composite command 2110 which, when executed in block 1950, may create a peer object 2120 in the graphics rendering tree. After inserting the commands into composite command 2110, update visitor 1500 may reset dirty bit 1805 to zero. Update visitor 1500 may then step through the objects of object tree 1300 until the next dirty bit marked as "dirty" (e.g., set to 1) is located. In the example, update visitor 1500 steps through the objects of object tree 1300 until set dirty bit 1820 associated with object 1320 is located. As shown in FIG. 22, an executed update method associated with object 1320 may insert commands 2205, 2210 and 2215 into composite command 2110 which, when executed in block 1950, may create a peer object 2200 in the graphics rendering tree. The executed update method associated with object 1320 may further pass object's 1320 coordinate values to dataspace object 1305 to generate coordinates and then uses those coordinates to set coordinate properties on objects 1360 and 1370. Update visitor 1500 may then mark dirty bit 1820 as "clean" (e.g., reset to zero), may mark dirty bits 1860 and 1870 as "dirty" (e.g., set to one) and then may continue on to child object 1360. As further shown in FIG. 23, an executed update method associated with object 1360 may insert commands 2305, 2310 and 2315 into composite command 2110 which, when executed in block 1950, may create peer object 2300. The executed update method associated with object 1360 may further pass object 1360's coordinate properties to peer object 2300. Update visitor 1500 may then mark dirty bit 1860 as "clean" (e.g., reset to zero) and continue on to child object 1370.

As shown in FIG. 24, an executed update method associated with object 1370 may insert commands 2405, 2410 and 2415 into composite command 2110 which, when executed in block 1950, may create peer object 2400. The executed update method associated with object 1370 may further pass object 1370's coordinate properties to peer object 2400. Update visitor 1500 may then mark dirty bit 1870 as "clean" (e.g., reset to zero) and continue on to "ruler" object 1330. If dataspace object 1305's limits have changed, then update visitor 1500 may treat object 1330 as if its dirty bit 1830 has been marked as "dirty" (e.g., set to one). As a result, shown in FIG. 25, an executed update method associated with object 1330 may insert commands 2505, 2510 and 2515 into composite command 2110 which, when executed in block 1950, may create peer object 2500 in the graphics rendering tree. The executed update method associated with object 1330 may further generate new coordinates and text strings for peer object 2500.

The linear case may be completed with update visitor 1500 further visiting each of objects 1380 and 1390, causing corresponding update methods to be executed (not shown) in a similar fashion to that described with respect to objects 1360 and 1370.

In the non-linear case (i.e., the dataspace object's mapping can't be represented as a linear combination of its inputs) depicted starting with FIG. 26, update visitor 1500 may visit dataspace object 1305 and an executed update method associated with object 1305 may insert commands 2605, 2610 and 2615 into composite command 2110 which, when executed in block 1950, may create a peer object 2600 in the graphics rendering tree. After inserting the commands into composite command 2110, update visitor 1500 may reset dirty bit 1805 to zero. Update visitor 1500 may then step through the objects of object tree 1300. However, unlike in the linear case described above with respect to FIGS. 21-25, an update method is additionally executed for object 1310 when visited by update visitor 1500. As shown in FIG. 27, the executed update method associated with object 1310 may insert commands 2705, 2710 and 2715 into composite command 2110 which, when executed in block 1950, may create a peer object 2700 in the graphics rendering tree. The executed update method associated with object 1310 may further pass object 1310's coordinate values to dataspace object 1305 to generate coordinates and then uses those coordinates to set coordinate properties on objects 1340 and 1350. Update visitor 1500 may mark dirty bits 1840 and 1850 as "dirty" (e.g., set to one) and then may continue on to child object 1340. As further shown in FIG. 28, an executed update method associated with object 1340 may insert commands 2805, 2810 and 2815 into composite command 2110 which, when executed in block 1950, may create peer object 2800. The executed update method associated with object 1340 may further pass object 1340's coordinate properties to peer object 2800. Update visitor 1500 may then mark dirty bit 1840 as "clean" (e.g., reset to zero) and continue on to child object 1350.

As further shown in FIG. 29, an executed update method associated with object 1350 may insert commands 2905, 2910 and 2915 into composite command 2110 which, when executed in block 1950, may create peer object 2900. The executed update method associated with object 1350 may further pass object 1350's coordinate properties to peer object 2900. Update visitor 1500 may then mark dirty bit 1850 as "clean" (e.g., reset to zero). The visitation of the remaining objects in object tree 1300 by update visitor 1500 may continue in a similar fashion as described above with respect to FIGS. 22-25.

Once each object in the object tree has been traversed, the composite command may be executed to revise the appropriate object(s) of the graphics rendering tree (block 1950). For each object in the object tree that has had at least one property changed, the composite command, which may include one or more commands related to each object in the graphics rendering tree, may be executed to revise the counterpart objects in the graphics rendering tree. After being revised, the graphics rendering tree, when used by the GPU, may be rendered as bar chart 3000, shown in FIG. 30.

The exemplary processes of FIGS. 17 and 19 have been described with respect to examples that include an update traversal associated with a dataspace object. However, the example may be equally valid if dataspace object 1305 is instead a colorspace object. In such an example, the Y properties associated with object 1320 may instead be color properties, such as, for example, a color array containing red, green, blue and alpha (where alpha is a measure of transparency). In one example, the red, green, blue and alpha values of the color array may change from [0; 0; 0; 255] to [0; 255; 0; 127].

Exemplary Object Tree/Graphics Rendering Tree Update Process

Figure 31:
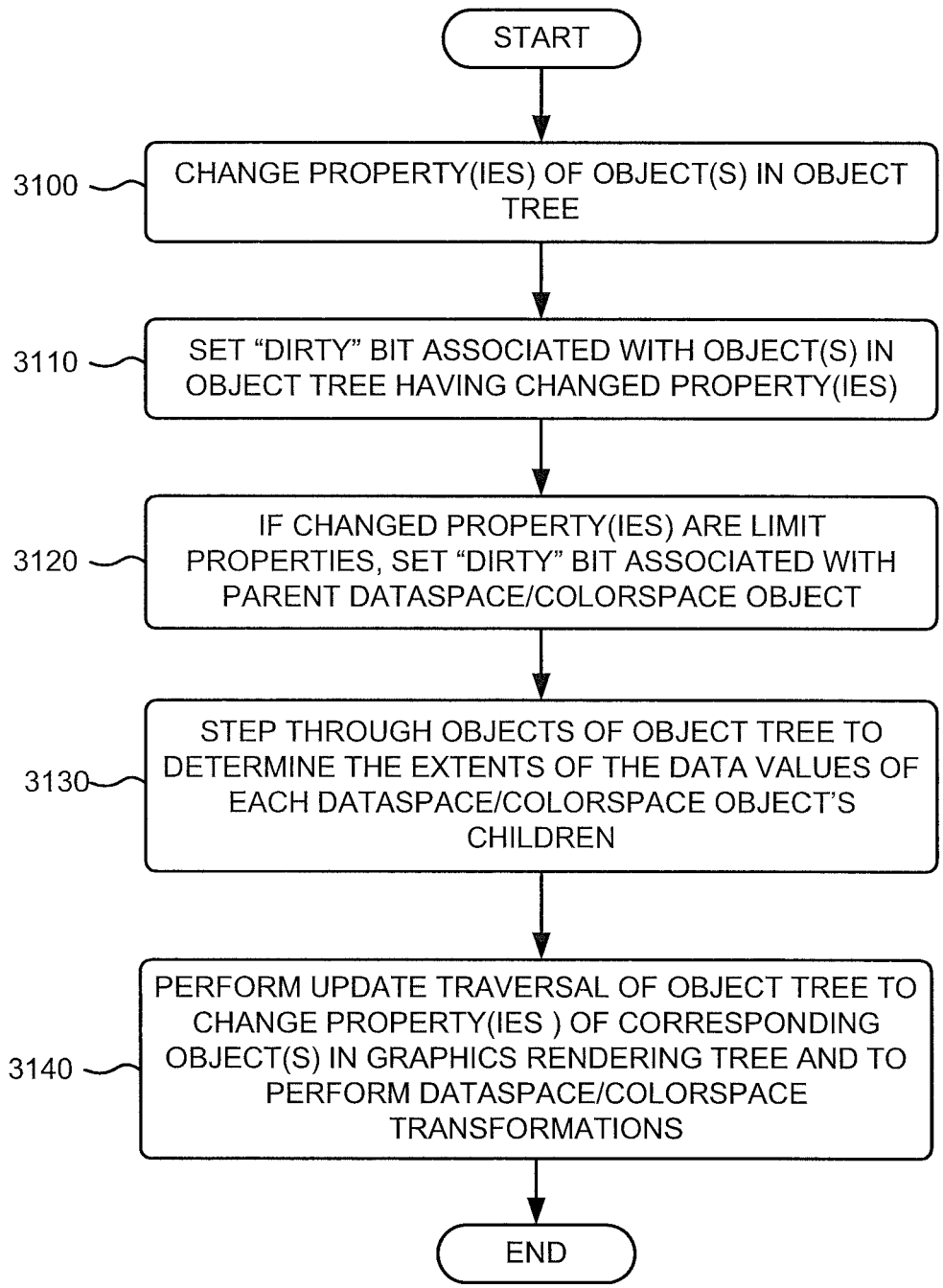
FIG. 31 is a flowchart of another exemplary process for updating the object tree and graphics rendering tree according to a second exemplary embodiment.

FIG. 31 is a flowchart of an exemplary process for updating a graphics rendering tree after changes or updates have been made to the graphics rendering tree's corresponding object tree according to a second exemplary embodiment. The exemplary process of FIG. 31 may be implemented by processor 125 of client 310 or server 320. The exemplary embodiments of FIG. 31, and FIG. 33 below, may be alternative embodiments to the exemplary embodiments of FIGS. 17 and 19 described above. In the exemplary embodiments of FIGS. 31 and 33, as opposed to the embodiments described with respect to FIGS. 17 and 19, the extents of the children of the dataspace/colorspace objects may be determined prior to the update traversal.

The exemplary process may begin when changes are made to one or more properties of one or more objects of the object tree (e.g., the objects of object tree 1300) (block 3100). For example, a user that created a graphics plot for rendering on a display device may change a parameter/property associated with the plot. As examples, the user may change a color associated with an aspect of the graphics plot, may change dimensions of one or more axes of the graphics plot, or may change labels associated with the graphics plot. The user may change any number of properties/parameters associated with the graphical scene to be rendered.

A "dirty" bit, associated with the object(s) in the object tree having one or more changed properties, may be set (block 3110). The "dirty" bit may, for example, be changed from a bit value of zero to a bit value of one (or vice-versa). For each object having one or more properties changed in block 3100, a "dirty" bit (e.g., a bit that indicates whether a change has been made to a respective object) associated with that object may be set. Referring back to FIG. 18A, this figure, as previously described, depicts an exemplary object tree 1300 where each of objects 1305, 1310, 1320, 1330, 1340, 1350, 1360, 1370, 1380 and 1390 has a respective associated "dirty" bit 1805, 1810, 1820, 1830, 1840, 1850, 1860, 1870, 1880 and 1890. As shown in FIG. 18A, no changes have been made to object tree 1300, therefore, each of "dirty" bits 1805, 1810, 1820, 1830, 1840, 1850, 1860, 1870, 1880 and 1890 has been reset (e.g., zero). As further shown in FIG. 18B, a property associated with object 1320 may be changed. Due to the change in a property of object 1320, "dirty" bit 1820, associated with object 1320 may be set (e.g., changed from "0" to "1").

If the changed property(ies) is a limit property(ies), a "dirty" bit associated with a parent dataspace or colorspace object may be set (e.g., changed from "0" to "1") (block 3120). For example, as shown in FIG. 18B, the change in a limit property of object 1320 causes "dirty" bit 1805, associated with dataspace object 1305, to be set. A "limit property" may include a property of an object that may change the outer limits or extents of a plot, thus, possibly necessitating changes in other objects of the object tree to permit the new plot to be rendered. The "limit property" may also include a color property of an object.

The objects of the object tree may be stepped through to determine the extents of the data values of each dataspace/colorspace object's children (block 3130). The extents of the data values of the object's children may include those data values that determine the size and scale of the rendering of the graphical scene described by the object tree. For example, a change in a Y value of a plot in x, y and z coordinate space may affect the size and scale of the y axis, thus, causing a change in the three dimensional graphical plot. As a specific example, the Y values of the bar chart of object 1320, shown in FIG. 32A, may have been changed from Y=[2.2 1.25 2.2 3.5 2.6] to Y=[2.2 1.25 −1 3.5 2.6].

Figure 32A:
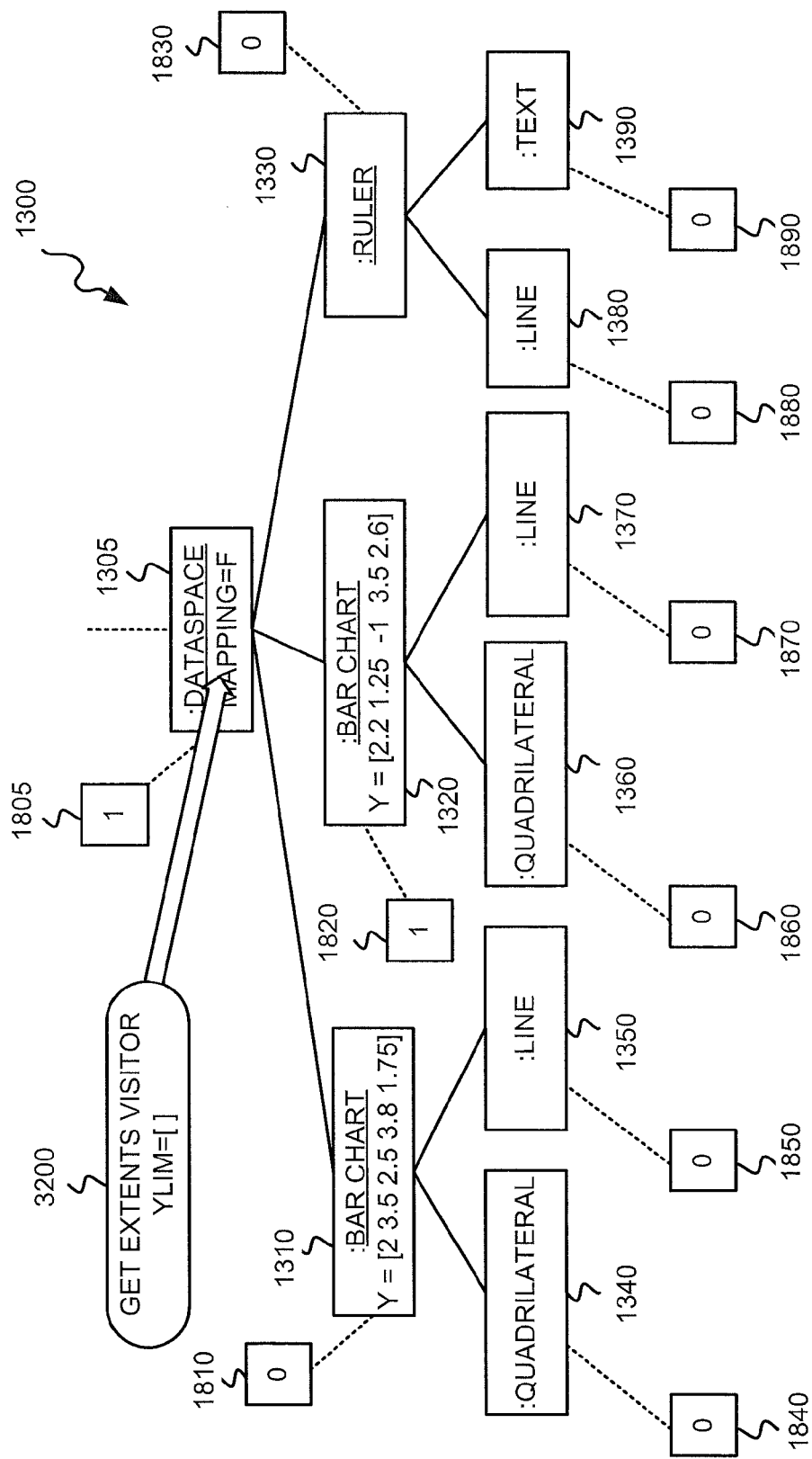
FIGS. 32A-32C depict the determination of data values extents, corresponding to block 3130 of FIG. 31, according to an exemplary implementation.
Figure 32B:
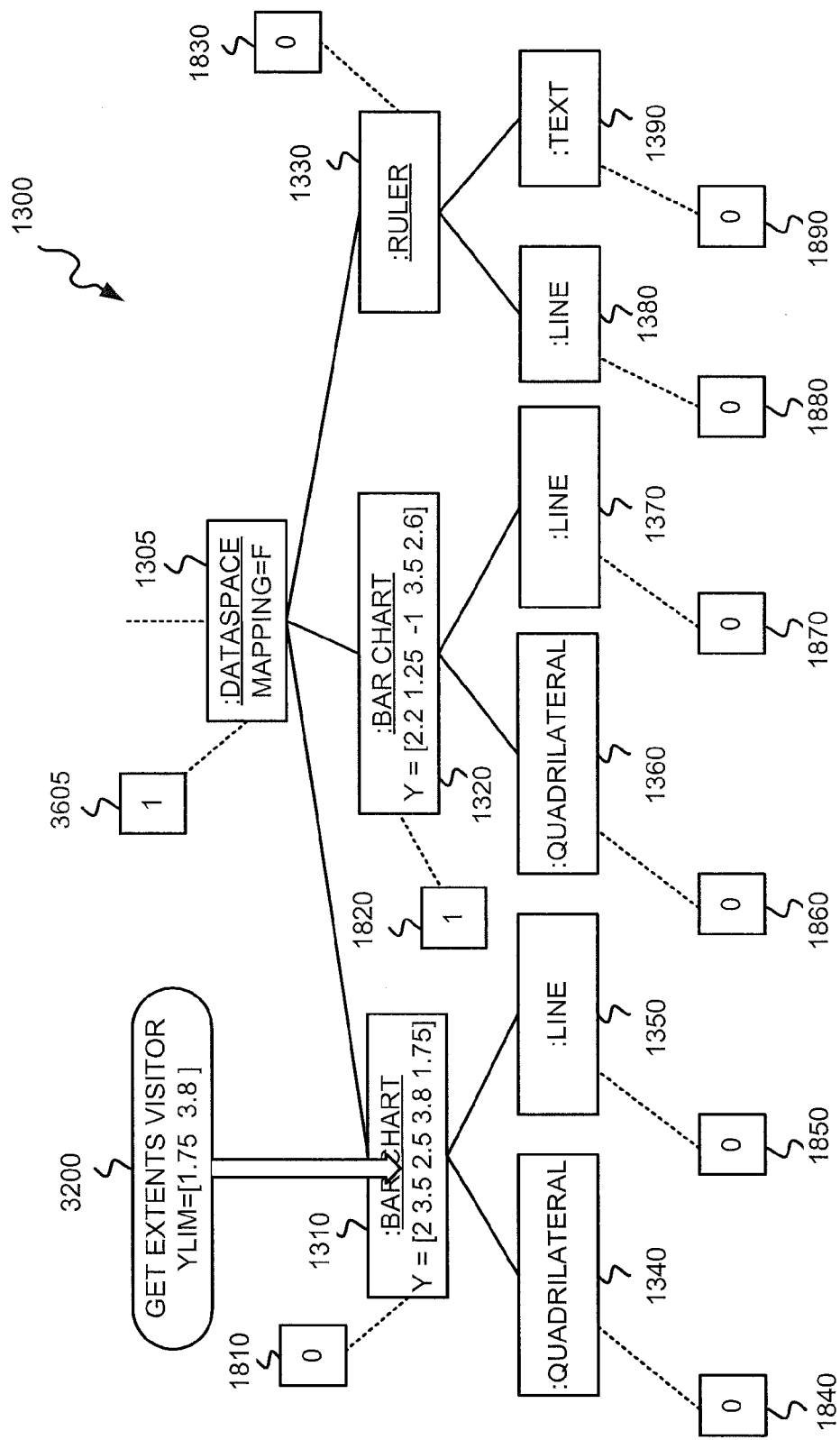
Figure 32C:
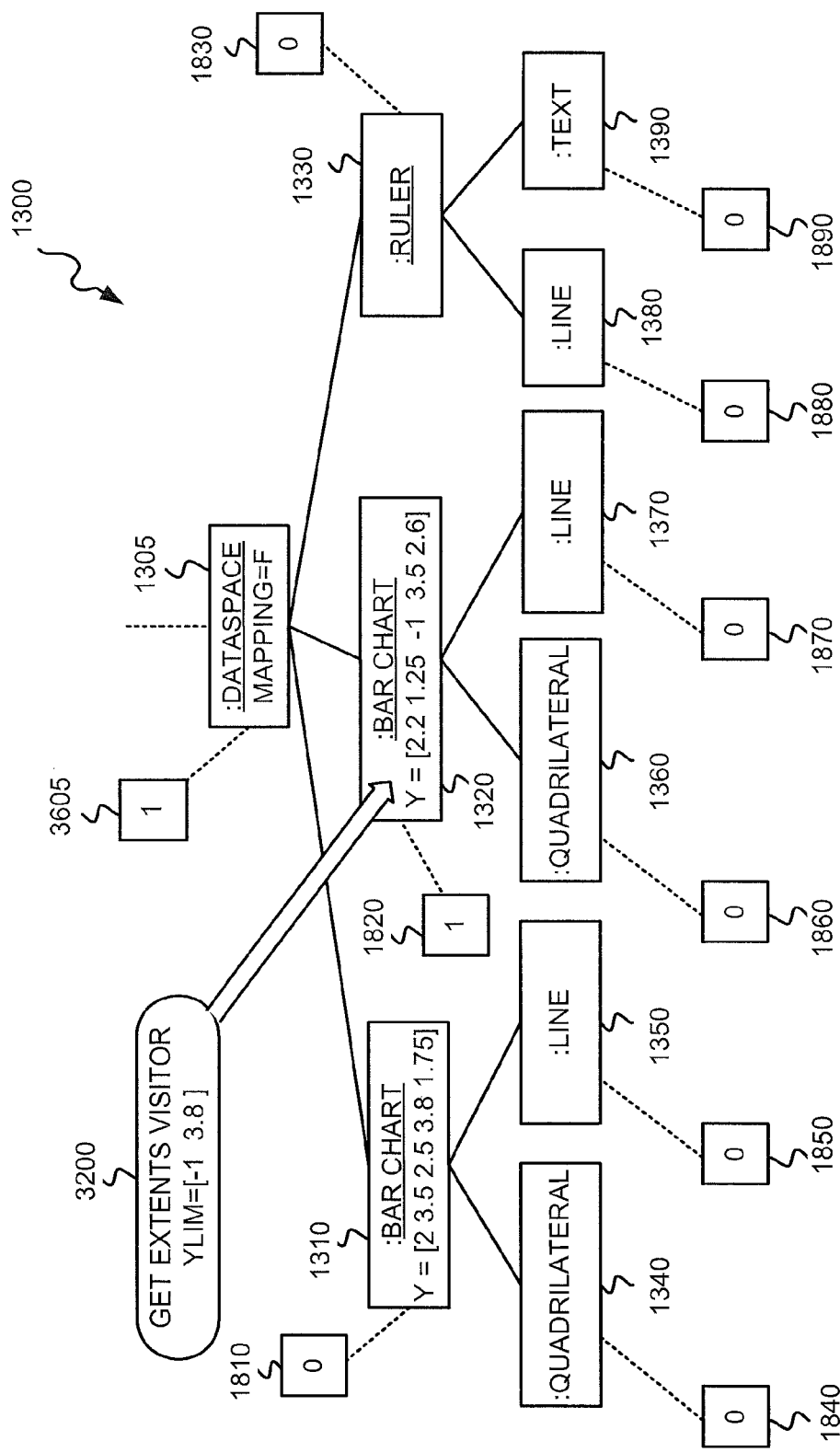

FIGS. 32A through 32C illustrate an example of the determination of the extents of data values associated with the child objects of dataspace object 1305. For example, FIG. 32A illustrates the creation of a "get extents" visitor 3200 that may subsequently visit child objects 1310 and 1320 of dataspace object 1305. "Get extents" visitor 3200 may include a software entity that may traverse the children of dataspace object 1305 to determine the extents of the data values of those children. As shown in FIG. 32A, "get extents" visitor 3200 may first visit dataspace object 1305 before traversing to child objects 1310 and 1320.

As further shown in FIG. 32B, "get extents" visitor 3200 may visit object 1310 to determine that the limits on the extents of the Y values of object 1310 are 1.75 to 3.8 (i.e., the range of Y values run from 1.75 to 3.8). As additionally shown in FIG. 32C, "get extents" visitor 3200 may visit object 1320 to determine the limits on the extents of the Y values of object 1320 are −1 to 3.5. Since the upper extent of the Y values for object 1310 was 3.8, "get extents" visitor 3200 retains that upper extent, but changes the lower extent to −1. The Y extents after visiting objects 1310 and 1320, thus, are Ylim= [−1 3.8]. For the sake of simplification, FIGS. 32A through 32C depict "get extents" visitor 3200 visiting objects 1310 and 1320 to determine the limits on only the extents of the Y values. However, "get extents" visitor 3200 may, similarly, determine the limits on the extents of the X and Z values (or other dimensions or properties) of the various objects of object tree 1300.

An update traversal of the object tree may be performed to change one or more properties of corresponding objects in the graphics rendering tree (block 3130). The update traversal may include visiting each of the objects of the object tree, determining whether its associated "dirty" bit has been set and adding one or more commands to a composite command.

For example, a command such as a "create node" command, which may create an object in the graphics rendering tree, or an "insert child" command, which may associate an object as a child of another object, may be added to the composite command. Executing the composite command may propagate changes in the object tree across to corresponding objects in the graphics rendering tree. By using "dirty" bits to indicate that updates or changes have been made, only commands corresponding to modified objects may be included in the composite command. Use of "dirty" bits, as described herein, thus, may allow the update traversal to be performed only for those objects whose "dirty" bit has been set. "Dirty" bits, as described herein, therefore, permit an efficient propagation of changes in the object tree to the graphics rendering tree. The exemplary process of FIG. 33 below describes further details of the update traversal of block 3140.

Exemplary Update Traversal Process

Figure 33:
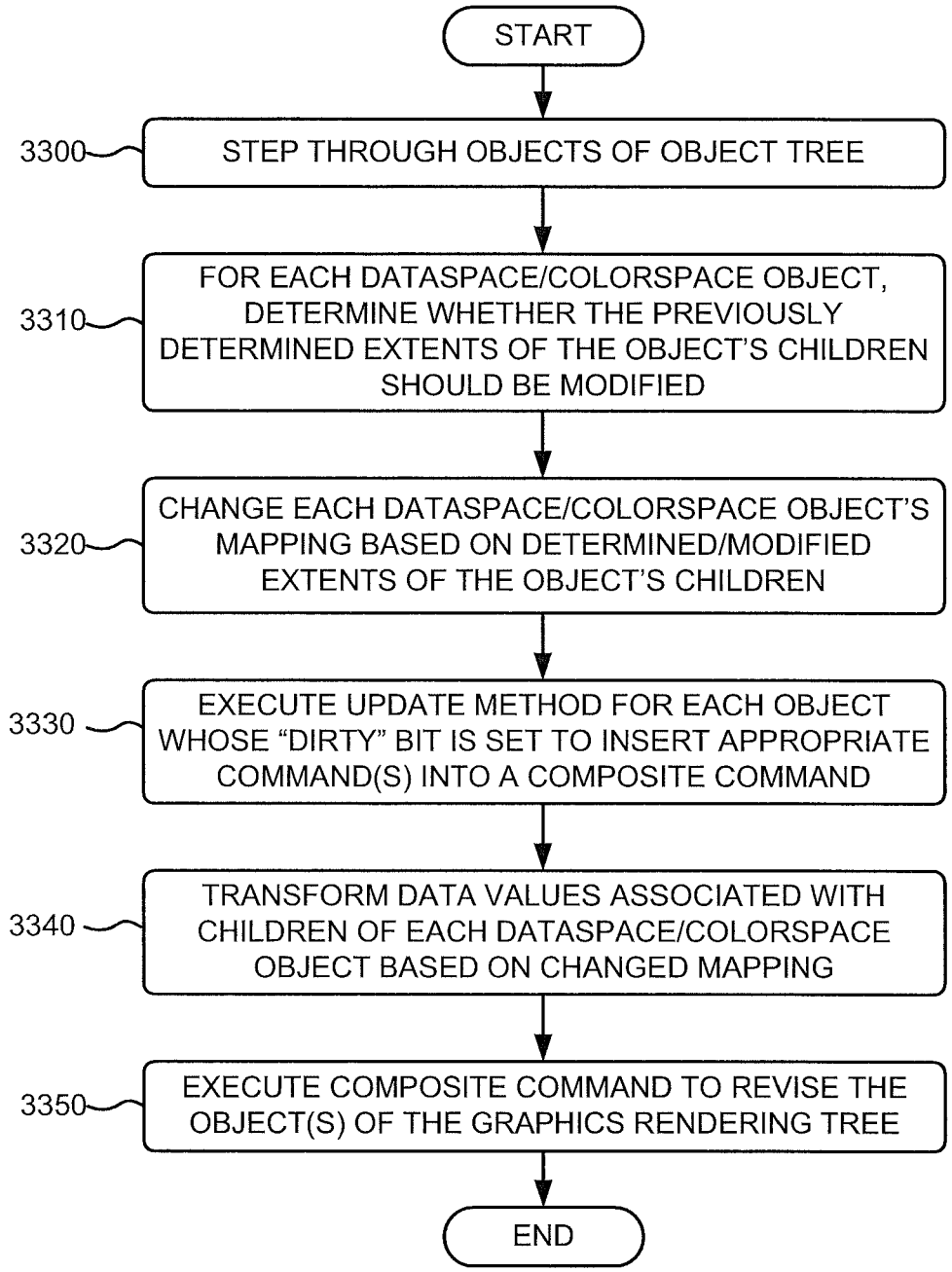
FIG. 33 is a flowchart of an exemplary process for performing an update traversal of an object tree to revise the corresponding graphics rendering tree according to a second exemplary embodiment.

FIG. 33 is a flowchart of an exemplary process of performing the update traversal of an object tree to revise the corresponding graphics rendering tree according to a second exemplary embodiment. The exemplary process of FIG. 33 describes details of block 3140 of FIG. 31. The exemplary process of FIG. 33 may be implemented by processor 125 of client 310 or server 320.

The exemplary process may begin with stepping through each object of the object tree (block 3300). For example, referring to the example object tree 1300 of FIG. 18A, object tree 1300 may be stepped through to visit each object of the tree to examine the "dirty" bit associated with each object. Object tree 1300 may, for example, be traversed by starting at the top object in the tree and stepping downwards through each branch in the tree in order. For example, update traversal of object tree 1300 may include stepping through the objects of the tree in the following order: object 1305, object 1310, object 1340, object 1350, object 1320, object 1360, object 1370, object 1330, object 1380 and object 1390.

Figure 34A:
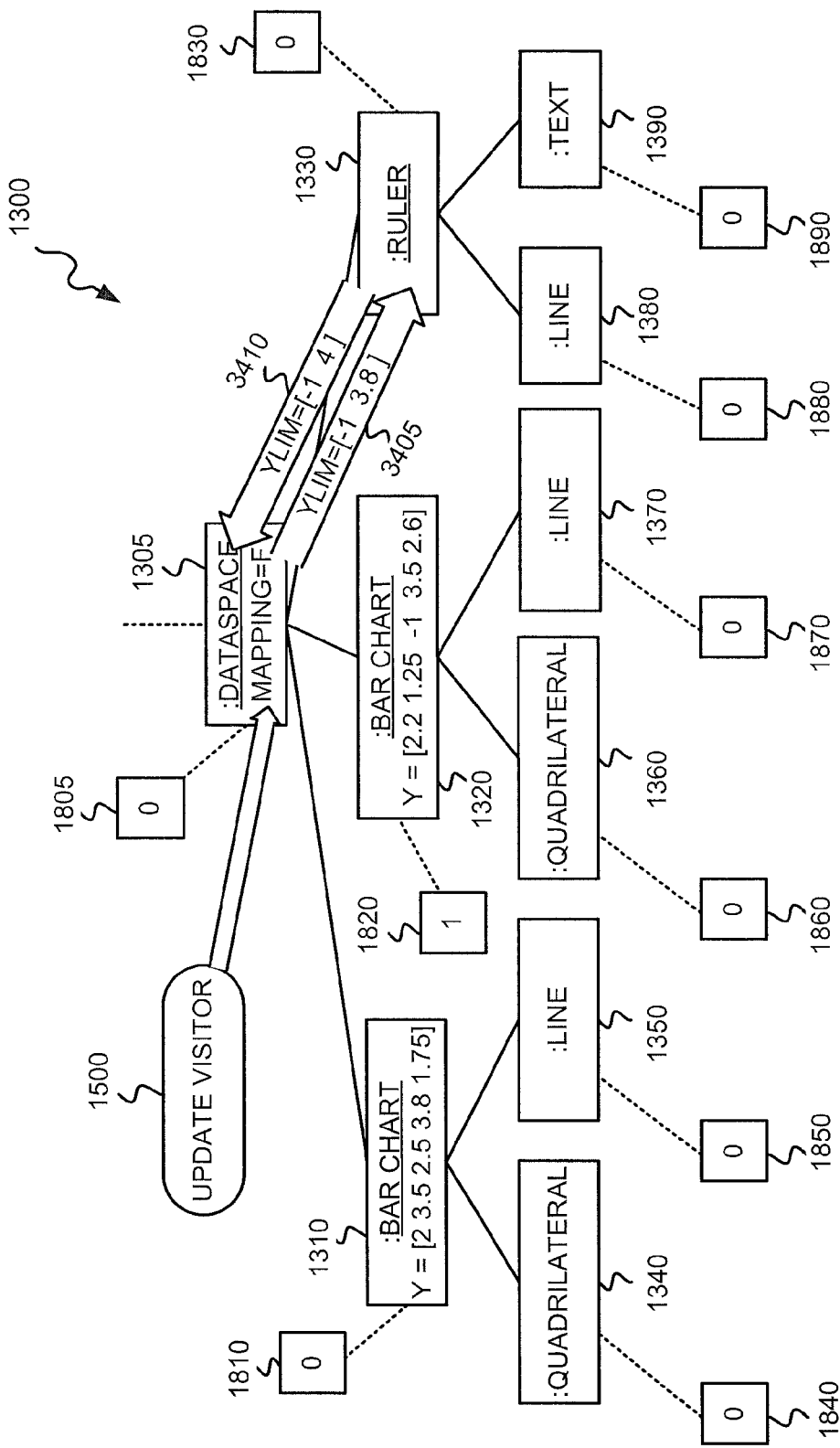
FIG. 34A graphically depicts an example of block 3310 of FIG. 33.

For each dataspace/colorspace object, a determination may be made whether the previously determined extents of the object's children should be modified (block 3310). To make this determination, the dataspace/colorspace object may pass the previously determined extents to, for example, a ruler object and the ruler object may determine if the limits of the extents need to be modified to improve the view of the view of the eventually rendered graphics. As one example, as shown in FIG. 34A, upon being visited by update visitor 1500, dataspace object 1305 may pass the previously determined Y extents of Ylim=[−1 3.8] to ruler object 1330. Ruler object 1330 may change the upper limit of the Y values to 4.0 from 3.8 and pass the next Y extents Ylim=[−1 4.0] back to dataspace object 1305.

Figure 34B:
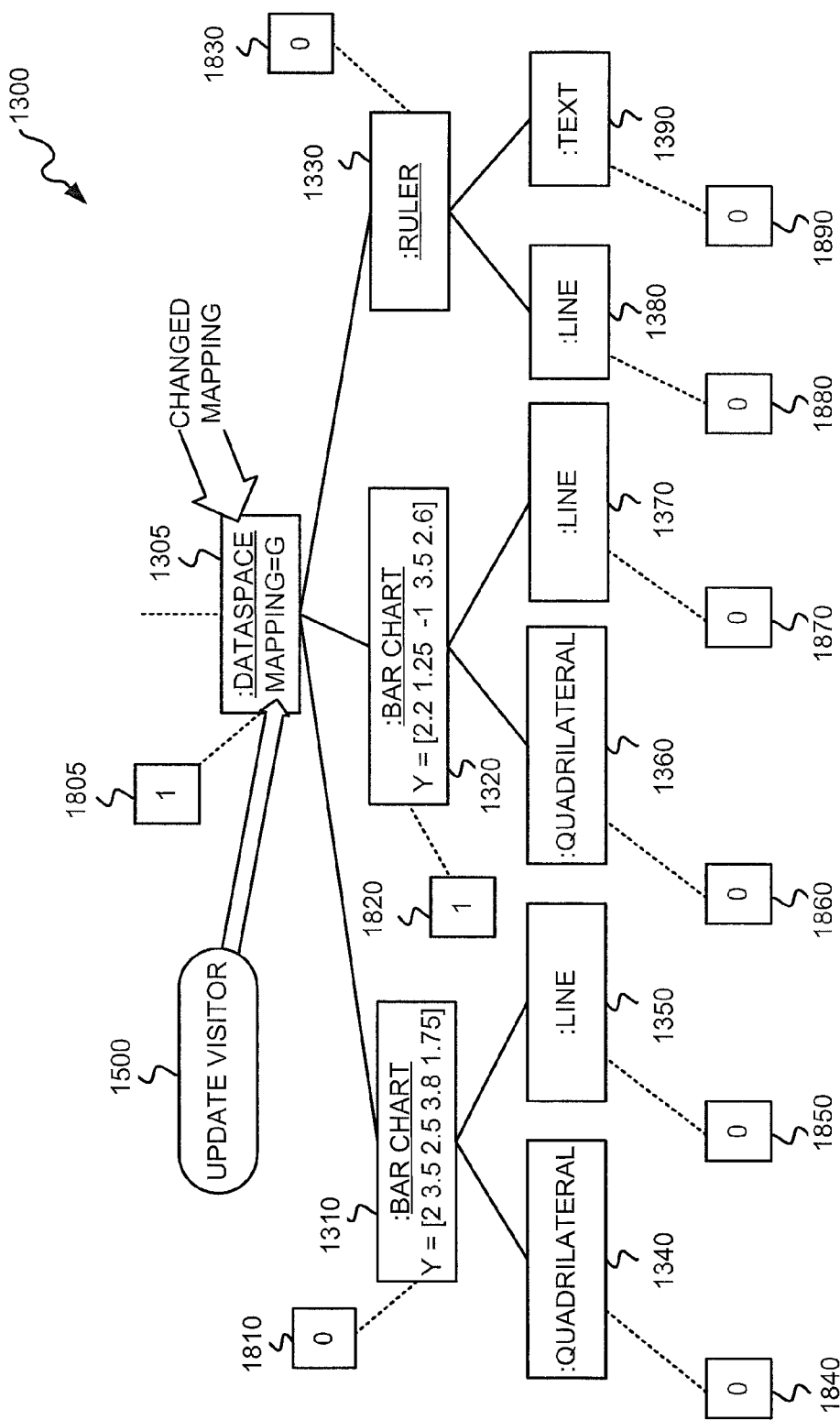
FIG. 34B graphically depicts an example of block 3320 of FIG. 33.

Each dataspace/colorspace object's mapping may then be changed based on the previously determined and/or modified extents of the object's children (block 3320). In the example of FIG. 34A, since dataspace object 1305's Y extents have been modified by ruler object 1330, the mapping of dataspace object 1305 may be changed (i.e., the final extents may be used to define a new transform associated with dataspace object 1305). For example, as shown in FIG. 34B, dataspace object 1305's mapping may be changed from "F" (FIG. 34A) to "G".

An update method may be executed for each object of the object tree whose "dirty" bit has been set to insert appropriate commands into a composite command (block 1930). As each object of the object tree is traversed, one or more appropriate commands may be inserted into the composite command for revising that object's counterpart object in the graphics rendering tree. Execution of an update method for a given object of object tree (e.g., object tree 100 or object tree 1300) whose "dirty" bit has been set may also set the properties of child objects that are below that given object in the object tree, thus, causing the "dirty" bits associated with those child objects to be set.

Data values associated with children of the dataspace/colorspace object may be transformed based on the dataspace/colorspace object's changed mapping (block 1940). This transformation may include converting coordinates, colors and/or data types/formats to a different coordinate system(s), a different color space(s) and/or different data type(s)/format(s) for association with the graphics rendering tree, as already described above.

The implementation of blocks 3330 and 3340 may occur differently in different embodiments based on whether the dataspace/colorspace object's (e.g., dataspace object 1305) mapping can be represented as a linear or non-linear combination of its inputs. In the linear case, the dataspace/colorspace's mapping can be implemented using a transformation matrix in the graphics rendering tree. In this implementation, the transformation can be implemented in GPU 130 and the coordinate and/or color values do not have to be changed whenever the dataspace/colorspace's mapping changes. In the non-linear case (e.g., logarithmic plots or polar coordinates), the dataspace/colorspace object's transform method may convert the coordinate and/or color values when the dataspace/colorspace object's mapping changes. FIGS. 21-25, already described above, depict examples of the linear case and FIGS. 26 and 27 depict the non-linear case (see above for the descriptions of the examples of FIGS. 21-27).

Figure 30:
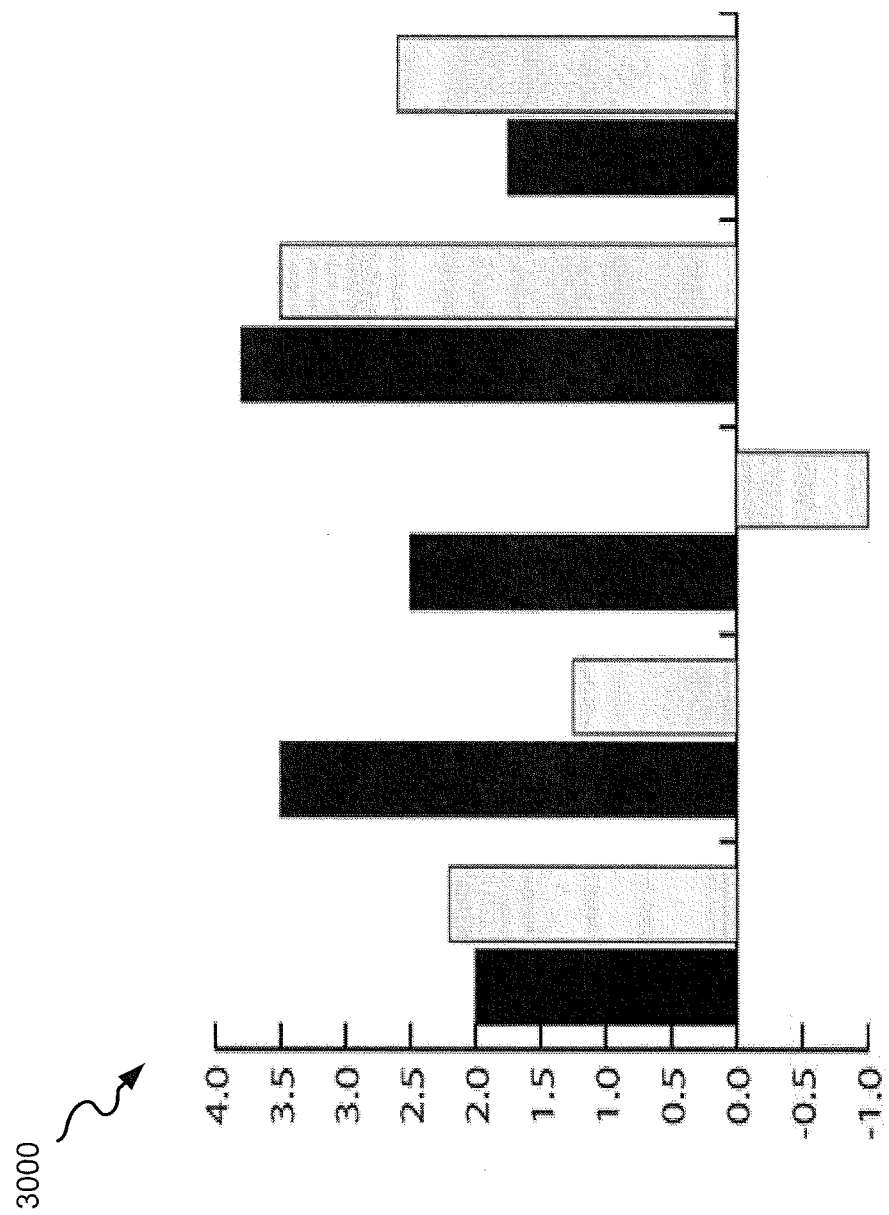
FIG. 30 is a diagram of a graphical plot that corresponds to the graphical scene described by the object tree of FIG. 18B.

Once each object in the object tree has been traversed, the composite command may be executed to revise the appropriate object(s) of the graphics rendering tree (block 3350). For each object in the object tree that has had at least one property changed, the composite command, which may include one or more commands related to each object in the graphics rendering tree, may be executed to revise the counterpart objects in the graphics rendering tree. After being revised, the graphics rendering tree, when used by the GPU, may be rendered as bar chart 3000, as shown in FIG. 30.

The exemplary processes of FIGS. 31 and 33 have been described with respect to examples that include an update traversal associated with a dataspace object. However, the example may be equally valid if dataspace object 1305 is instead a colorspace object. In such an example, the Y properties associated with object 1320 may instead be color properties, such as, for example, a color array containing red, green, blue and alpha (where alpha is a measure of transparency). In one example, the red, green, blue and alpha values of the color array may change from [0; 0; 0; 255] to [0; 255; 0; 127].

Exemplary Graphics Rendering Process

Figure 35:
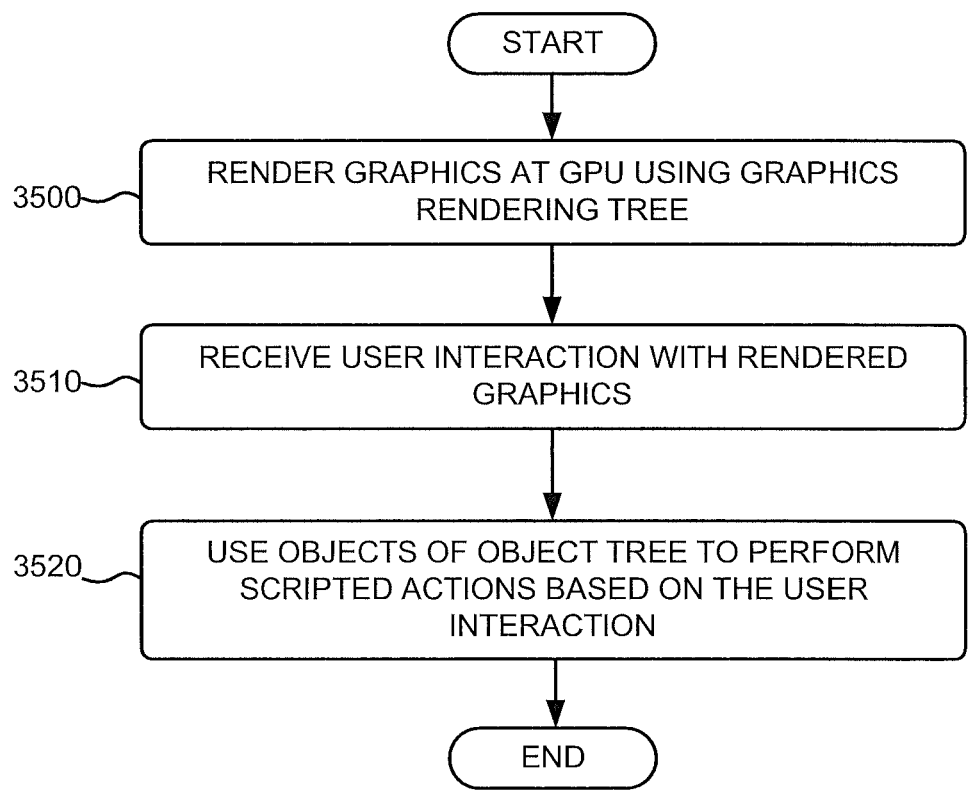
FIG. 35 is a flowchart of an exemplary process for rendering graphics based on a previously created graphics rendering tree.

FIG. 35 is a flowchart of an exemplary process for rendering graphics based on a previously created graphics rendering tree. Block 3500 of FIG. 35 may be implemented by specialized processing unit 130 (e.g., a GPU) of a client 310 or server 320, and blocks 3510 and 3520 of FIG. 35 may be implemented by processor 125 of client 310 or server 320.

Figure 36:
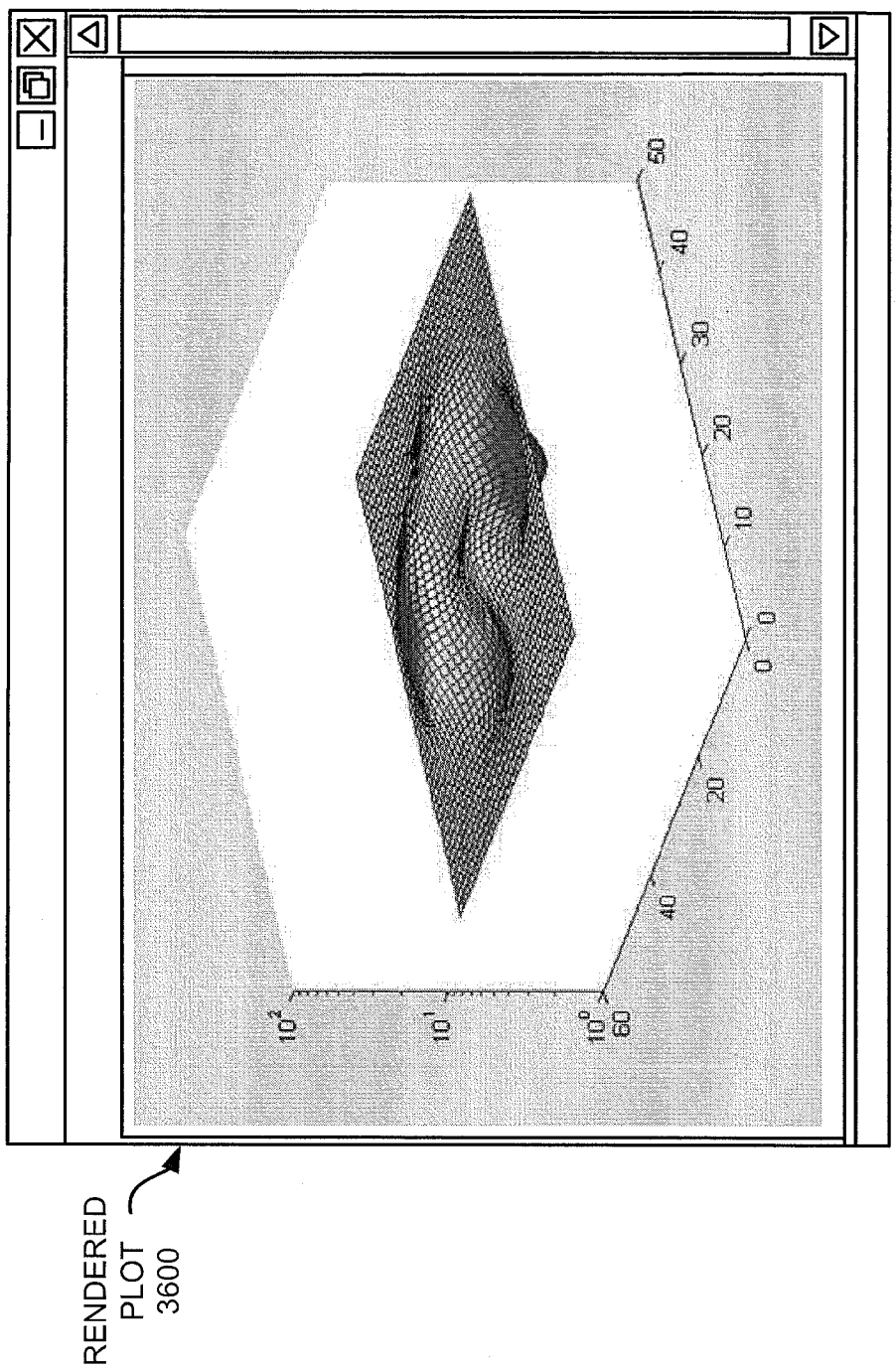
FIG. 36 illustrates an example of a graphics plot rendered using a graphics rendering tree.

The exemplary process may begin with the GPU rendering the graphics using the previously created, or revised, graphics rendering tree (block 3500). For example, as shown in FIG. 36, the GPU may render a plot 3600 based on a graphics rendering tree. In some implementations, plot 3600 may be displayed by browser 315, as shown in FIG. 37. Plot 3600 is shown for purposes of illustration. Many different plots may be rendered by the GPU based on the graphics rendering tree. Prior to the GPU rendering the graphics using the previously created, or revised, graphics rendering tree, the contents of the graphics rendering tree may be re-ordered so that state changes can be minimized. For example, state attribute sorting may be used to re-order the contents of the graphics rendering tree prior to the GPU rendering the graphics. Because the GPU typically is deeply "pipelined," the speed of the graphics rendering may be significantly slowed when there are many changes in state. Therefore, improvements in performance (e.g., graphics rendering speed) may be obtained by rendering objects that have the same state together. For example, if a graphics scene uses many objects that have a same state (e.g., a same texture map), better performance may be obtained from the GPU if all of these objects are rendered together instead of switching between these and other objects.

User interaction with the rendered graphics may be subsequently received (block 3610). For example, the user may select a different view of the plot 3600. As another example, "mouse" motion events (i.e., movement of the mouse by the user) may change view parameters of a graphical scene. Objects of the object tree may be used to perform scripted actions based on the user interaction (block 3520). For example, in response to the above-described "mouse" motion events, the graphical scene may be redrawn and updated view parameters may be sent back to an object in the object tree.

CONCLUSION

Implementations described herein provide illustration and description, but are not intended to be exhaustive or to limit the invention to the precise form disclosed. Modifications and variations are possible in light of the above teachings, or may be acquired from practice of the invention. For example, while a series of blocks have been described with regard to FIGS. 6, 12, 17, 19, 31 and 33, the order of the blocks may be modified in other implementations. Further, non-dependent blocks may be performed in parallel. Some implementations have been described herein with respect to a graphics rendering tree being organized and optimized for use by a GPU. However, it will be appreciated that the embodiments described herein may be equivalently applied to peer object trees organized and optimized for use with other specialized processing units, such as, for example, PPUs or DSPs. Additionally, implementations have been described herein with respect to a general purpose CPU and a specialized processing unit. In other implementations, a first object tree may be associated with a first type of CPU and a second object tree may be associated with a second type of CPU, where the second type of CPU may be faster and/or have additional capabilities as compared to the first type of CPU. Furthermore, in other implementations, the first object tree and the second object tree may be associated with a single CPU, where the single CPU may utilize both of the first and second object trees. Update traversal has been described herein as setting "dirty" bits associated with each object whose properties have been changed, and then visiting each object in the object tree, checking each object's "dirty" bit to determine if the object's properties have been changed, and adding one or more commands to the composite command for each object whose "dirty" bit has been set. However, in other implementations, only a subset of objects of the set of objects that have had their properties changed may have their associated "dirty" bits set. Additionally, in other implementations, a subset of objects of the set of objects whose "dirty" bit has been set may only be visited during update traversal (i.e., not all of the objects whose "dirty" bit has been set are visited).

Logic for practicing object data conversion/transformation, and other aspects described herein, may be provided to a client via a license. This license may, in some implementations, be tiered so that users have varying degrees of flexibility and/or speed based on the licenses that they have purchased or otherwise acquired.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, block or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
    one or more instructions, executable by at least one processor, to cause the at least one processor to:
        store a first set of objects in a first data structure,
            the first set of objects describing a graphical scene;
        create a group of commands;
        add a command for at least one object, of the first set of objects, to the group of commands;
        combine the group of commands into a composite command,
            the group of commands including the added command;
        create a second set of objects in a second data structure based on the first set of objects in the first data structure and the composite command;
        modify the second set of objects; and
        provide the modified second set of objects to a browser for rendering the graphical scene.

2. The computer-readable medium of claim 1, where the one or more instructions include:
    one or more instructions to associate a flag with each object of the first set of objects; and
    one or more instructions to set the flag associated with each object of the first set of objects to indicate each of the objects in the first set of objects that have been changed.

3. The computer-readable medium of claim 1, where the one or more instructions include:
    one or more instructions to add a command for each object of the first set of objects to the group of commands.

4. The computer-readable medium of claim 1, where a type of command for the at least one object, of the first set of objects, is selected using a library.

5. The computer-readable medium of claim 1, where the one or more instructions include:
one or more instructions to convert data associated with the second set of objects from a first format to a second format.

6. The computer-readable medium of claim 1, where
the first set of objects is created at a client,
the second set of objects is created at a server that is remote from the client, and
the browser is to render the graphical scene at the client.

7. The computer-readable medium of claim 1, where
the first set of objects and second set of objects are created at a server, and
the browser is to render the graphical scene at a client that is remote from the server.

8. A system comprising:
a memory including instructions;
a processor to execute the instructions to:
  store a first set of objects in a first data structure,
    the first set of objects describing a graphical scene;
  create a group of commands;
  add a command for at least one object, of the first set of objects, to the group of commands;
  combine the group of commands into a composite command,
    the group of commands including the added command;
  create a second set of objects in a second data structure based on the first set of objects in the first data structure and the composite command;
  modify the second set of objects; and
  provide the modified second set of objects to a browser for rendering the graphical scene.

9. The system of claim 8, where the processor is further to:
associate a flag with each object of the first set of objects; and
set the flag associated with each object of the first set of objects to indicate each of the objects in the first set of objects that have been changed.

10. The system of claim 8, where the processor is further to:
add a command for each object of the first set of objects to the group of commands.

11. The system of claim 8, where a type of command for the at least one object, of the first set of objects, is selected using a library.

12. The system of claim 8, where the processor is further to:
convert data associated with the second set of objects from a first format to a second format.

13. The system of claim 8, where
the first set of objects is created at a client,
the second set of objects is created at a server that is remote from the client, and
the browser is to render the graphical scene at the client.

14. The system of claim 8, where
the first set of objects and second set of objects are created at a server, and
the browser is to render the graphical scene at a client that is remote from the server.

15. A method comprising:
storing a first set of objects in a first data structure,
  the first set of objects describing a graphical scene,
  the storing the first set of objects being performed by a computing device;
creating a group of commands,
  the creating the group of commands being performed by the computing device;
adding a command for at least one object, of the first set of objects, to the group of commands,
  the adding the command being performed by the computing device;
combining the group of commands into a composite command,
  the group of commands including the added command, and
  the combining the group of commands being performed by the computing device;
creating a second set of objects in a second data structure based on the first set of objects in the first data structure and the composite command,
  the creating the second set of objects being performed by the computing device;
modifying the second set of objects,
  the modifying the second set of objects being performed by the computing device; and
providing the modified second set of objects to a browser for rendering the graphical scene,
  the providing the second set of objects being performed by the computing device.

16. The method of claim 15, further comprising:
associating a flag with each object of the first set of objects; and
setting the flag associated with each object of the first set of objects to indicate each of the objects in the first set of objects that have been changed.

17. The method of claim 15, further comprising:
adding a command for each object of the first set of objects to the group of commands.

18. The method of claim 15, further comprising:
converting data associated with the second set of objects from a first format to a second format.

19. The method of claim 15, where
the first set of objects is created at a client,
the second set of objects is created at a server that is remote from the client, and
the browser is to render the graphical scene at the client.

20. The method of claim 15, where
the first set of objects and second set of objects are created at a server, and
the browser is to render the graphical scene at a client that is remote from the server.

* * * * *